(12) United States Patent
Tinney

(10) Patent No.: US 11,451,108 B2
(45) Date of Patent: Sep. 20, 2022

(54) SYSTEMS AND METHODS FOR AXIAL IMPACT RESISTANCE IN ELECTRIC MOTORS

(71) Applicant: ICON Health & Fitness, Inc., Logan, UT (US)

(72) Inventor: Evan Charles Tinney, Providence, UT (US)

(73) Assignee: iFIT Inc., Logan, UT (US)

( * ) Notice: Subject to any disclaimer, the term of this patent is extended or adjusted under 35 U.S.C. 154(b) by 489 days.

(21) Appl. No.: 16/102,015

(22) Filed: Aug. 13, 2018

(65) Prior Publication Data

US 2019/0058370 A1 Feb. 21, 2019

Related U.S. Application Data

(60) Provisional application No. 62/546,547, filed on Aug. 16, 2017, provisional application No. 62/553,591, filed on Sep. 1, 2017.

(51) Int. Cl.
*H02K 5/16* (2006.01)
*F16F 1/32* (2006.01)
(Continued)

(52) U.S. Cl.
CPC ............... *H02K 5/16* (2013.01); *F16F 1/445* (2013.01); *F16F 15/04* (2013.01); *H02K 11/20* (2016.01);
(Continued)

(58) Field of Classification Search
CPC .......... F16F 15/04; F16F 15/315; F16F 1/328; F16F 1/445; F16F 2236/04;
(Continued)

(56) References Cited

U.S. PATENT DOCUMENTS 232,022 A 9/1880 Gifford
284,294 A 9/1883 Graves
(Continued)

FOREIGN PATENT DOCUMENTS

CN 1862917 11/2006
CN 101420154 4/2009
(Continued)

OTHER PUBLICATIONS

U.S. Appl. No. 16/742,762, filed Jan. 14, 2020, Eric W. Watterson.
(Continued)

*Primary Examiner* — Alex W Mok
(74) *Attorney, Agent, or Firm* — Ray Quinney & Nebeker; Paul N. Taylor

(57) ABSTRACT

A system for providing torque includes a stator, a rotor, an axle, an endcap, an endbell, and a compliant member. The stator has a first end and a second end opposite the first end with a chamber therein. The rotor is at least partially positioned in the chamber and rotatable relative to the stator about a longitudinal axis. The axle has a first end, a second end opposite the first end, and supports the rotor. The endcap is located at a first end of the stator and adjacent to the first end of the axle, and the endbell is located at the second end of the stator and adjacent to the second end of the axle. The compliant member is positioned relative to the axle between a portion of the rotor and one of the endbell and the endcap.

18 Claims, 5 Drawing Sheets

(51) Int. Cl.
*F16F 1/44* (2006.01)
*H02K 11/20* (2016.01)
*F16F 15/04* (2006.01)
*F16F 15/315* (2006.01)

(52) U.S. Cl.
CPC .............. *F16F 1/328* (2013.01); *F16F 15/315* (2013.01); *F16F 2236/04* (2013.01); *F16F 2238/02* (2013.01); *H02K 2205/00* (2013.01); *H02K 2205/03* (2013.01)

(58) Field of Classification Search
CPC . F16F 2238/02; H02K 11/20; H02K 2205/00; H02K 2205/03; H02K 5/16; H02K 2213/06; H02K 5/24
USPC .......................................................... 310/85
See application file for complete search history.

(56) References Cited

U.S. PATENT DOCUMENTS

| | | |
|---|---|---|
| 321,388 A | 6/1885 | Ruebsam |
| 339,638 A | 4/1886 | Goldie |
| 421,779 A | 2/1890 | Steven |
| 447,780 A | 3/1891 | Luge |
| 450,792 A | 4/1891 | Dodd |
| 659,216 A | 10/1900 | Dowling |
| 663,486 A | 12/1900 | Boren |
| 674,391 A | 5/1901 | Baker |
| 683,284 A | 9/1901 | Honey |
| 766,930 A | 8/1904 | Clemons |
| 881,521 A | 3/1908 | Wilson |
| 897,722 A | 9/1908 | Day |
| 931,394 A | 8/1909 | Day |
| 937,795 A | 10/1909 | Hackney |
| 1,016,729 A | 2/1912 | Barrett |
| 1,020,777 A | 3/1912 | Peterson |
| 1,064,968 A | 6/1913 | Hagen |
| 1,082,940 A | 12/1913 | Flora |
| 1,211,765 A | 1/1917 | Schmidt |
| 1,570,482 A | 1/1926 | Hale |
| 1,580,530 A | 4/1926 | Rambo |
| 1,585,748 A | 5/1926 | Wendelken |
| 1,715,870 A | 6/1929 | Augustine |
| 1,766,089 A | 6/1930 | Wood |
| 1,778,635 A | 10/1930 | Heisler |
| 1,824,406 A | 9/1931 | Petersime |
| 1,850,530 A | 3/1932 | Brown |
| 1,893,728 A | 1/1933 | Bullis |
| 1,902,694 A | 3/1933 | Edwards |
| 1,919,627 A | 7/1933 | Fitz Gerald |
| 1,928,089 A | 9/1933 | Blickman |
| 1,973,945 A | 9/1934 | Chavin |
| 1,978,579 A | 10/1934 | Hooks |
| 1,982,843 A | 12/1934 | Traver |
| 2,067,136 A | 1/1937 | Bridenbaugh |
| 2,117,957 A | 5/1938 | Ritter |
| 2,165,700 A | 7/1939 | Henry |
| 2,177,957 A | 10/1939 | Stewart |
| 2,219,219 A | 10/1940 | Boger |
| 2,247,946 A | 7/1941 | Hein et al. |
| 2,255,864 A | 9/1941 | Stephens |
| 2,315,485 A | 4/1943 | Jones |
| 2,399,915 A | 5/1946 | Drake |
| 2,440,644 A | 4/1948 | Powell |
| 2,569,007 A | 9/1951 | Klyce |
| 2,607,816 A | 8/1952 | Ryder |
| 2,632,645 A | 3/1953 | Barkschat |
| 2,645,539 A | 7/1953 | Thompson |
| 2,646,282 A | 7/1953 | Ringman |
| 2,648,540 A | 8/1953 | Hunter |
| 2,674,453 A | 4/1954 | Hummert |
| 2,743,623 A | 5/1956 | Wells |
| 2,746,822 A | 5/1956 | Copenhaver |
| 2,842,365 A | 7/1958 | Kelley |
| 2,855,200 A | 10/1958 | Blickman |
| 2,874,971 A | 2/1959 | Devery |
| 2,969,060 A | 1/1961 | Swanda |
| 2,984,594 A | 5/1961 | Runton |
| 3,035,671 A | 5/1962 | Sicherman |
| 3,059,312 A | 10/1962 | Jamieson |
| 3,068,950 A | 12/1962 | Davidson |
| 3,072,426 A | 1/1963 | Gilbert |
| 3,112,108 A | 11/1963 | Hanke |
| 3,123,646 A | 3/1964 | Easton |
| 3,127,171 A | 3/1964 | Noland et al. |
| 3,179,071 A | 4/1965 | Johnston |
| 3,193,287 A | 7/1965 | Robinson |
| 3,205,888 A | 9/1965 | Stroop |
| 3,316,898 A | 5/1967 | Brown |
| 3,319,273 A | 5/1967 | Solin |
| 3,342,485 A | 9/1967 | Gaul |
| 3,345,067 A | 10/1967 | Smith |
| 3,358,813 A | 12/1967 | Kohlhagen |
| 3,368,746 A | 2/1968 | Zelinski |
| 3,378,259 A | 4/1968 | Kupchinski |
| 3,408,067 A | 10/1968 | Armstrong |
| 3,408,069 A | 10/1968 | Lewis |
| 3,411,497 A | 11/1968 | Rickey et al. |
| 3,416,174 A | 12/1968 | Novitske |
| 3,430,084 A | 2/1969 | Hall |
| 3,430,507 A | 3/1969 | Hurst et al. |
| 3,438,627 A | 4/1969 | La Lanne |
| 3,444,830 A | 5/1969 | Doetsch |
| 3,446,503 A | 5/1969 | Lawton |
| 3,501,140 A | 3/1970 | Eichorn |
| 3,511,500 A | 5/1970 | Dunn |
| 3,514,110 A | 5/1970 | Thomander |
| 3,518,985 A | 7/1970 | Quinton |
| 3,522,947 A | 8/1970 | Anderson |
| 3,547,435 A | 12/1970 | Scott |
| 3,554,541 A | 1/1971 | Spoth |
| 3,563,541 A | 2/1971 | Sanquist |
| 3,566,861 A | 3/1971 | Weiss |
| 3,567,219 A | 3/1971 | Foster |
| 3,568,669 A | 3/1971 | Stites |
| 3,572,700 A | 3/1971 | Mastropaolo |
| 3,579,339 A | 5/1971 | Teh-lin et al. |
| 3,583,465 A | 6/1971 | Youngs et al. |
| 3,586,322 A | 6/1971 | Kverneland |
| 3,589,715 A | 6/1971 | Mark |
| 3,592,466 A | 7/1971 | Parsons |
| 3,598,404 A | 8/1971 | Bowman |
| 3,602,502 A | 8/1971 | Hampl |
| 3,606,320 A | 9/1971 | Erwin, Jr. |
| 3,608,898 A | 9/1971 | Berlin |
| 3,614,097 A | 10/1971 | Blickman |
| 3,628,654 A | 12/1971 | Haracz |
| 3,628,791 A | 12/1971 | Garcia |
| 3,634,895 A | 1/1972 | Childers |
| 3,636,577 A | 1/1972 | Nissen |
| 3,638,941 A | 2/1972 | Kulkens |
| 3,640,528 A | 2/1972 | Proctor |
| 3,641,601 A | 2/1972 | Sieg |
| 3,642,279 A | 2/1972 | Cutter |
| 3,643,943 A | 2/1972 | Erwin, Jr. et al. |
| 3,650,529 A | 3/1972 | Salm |
| 3,658,327 A | 4/1972 | Thiede |
| 3,659,845 A | 5/1972 | Quinton |
| 3,664,666 A | 5/1972 | Lloyd |
| 3,686,776 A | 8/1972 | Dahl |
| 3,689,066 A | 9/1972 | Hagen |
| 3,703,284 A | 11/1972 | Hesen |
| 3,708,166 A | 1/1973 | Annas |
| 3,709,197 A | 1/1973 | Moseley |
| 3,731,917 A | 5/1973 | Townsend |
| 3,738,649 A | 6/1973 | Miller |
| 3,741,538 A | 6/1973 | Useldinger |
| 3,751,033 A | 8/1973 | Rosenthal |
| 3,756,595 A | 9/1973 | Hague |
| 3,767,195 A | 10/1973 | Dimick |
| 3,788,412 A | 1/1974 | Vincent |
| 3,792,860 A | 2/1974 | Selnes |
| 3,809,393 A | 5/1974 | Jones |

(56) References Cited

U.S. PATENT DOCUMENTS

| | | |
|---|---|---|
| 3,814,420 A | 6/1974 | Encke |
| 3,822,488 A | 7/1974 | Johnson |
| 3,826,491 A | 7/1974 | Elder |
| 3,848,467 A | 11/1974 | Flavell |
| 3,851,874 A | 12/1974 | Wilkin |
| 3,858,938 A | 1/1975 | Kristensson et al. |
| 3,861,215 A | 1/1975 | Bradley |
| 3,869,121 A | 3/1975 | Flavell |
| 3,870,297 A | 3/1975 | Elder |
| 3,874,657 A | 4/1975 | Niebojewski |
| 3,880,274 A | 4/1975 | Bechtloff |
| 3,883,922 A | 5/1975 | Fleischhauer |
| 3,892,404 A | 7/1975 | Martucci |
| 3,901,379 A | 8/1975 | Bruhm |
| 3,903,613 A | 9/1975 | Bisberg |
| 3,904,196 A | 9/1975 | Berlin |
| 3,909,857 A | 10/1975 | Herrera |
| 3,912,263 A | 10/1975 | Yatso |
| 3,918,710 A | 11/1975 | Niebojewski |
| 3,926,430 A | 12/1975 | Good, Jr. |
| 3,929,026 A | 12/1975 | Hofmann |
| 3,938,400 A | 2/1976 | Konyha |
| 3,941,377 A | 3/1976 | Lie |
| 3,948,513 A | 4/1976 | Pfotenhauer |
| 3,963,101 A | 6/1976 | Stadelmann et al. |
| 3,977,451 A | 8/1976 | Duba |
| 3,981,500 A | 9/1976 | Ryan |
| 3,987,323 A * | 10/1976 | Hess .................. F16H 25/2021 310/80 |
| 4,012,015 A | 3/1977 | Nelson et al. |
| 4,023,795 A | 5/1977 | Pauls |
| 4,024,949 A | 5/1977 | Kleysteuber et al. |
| 4,026,545 A | 5/1977 | Schonenberger |
| 4,033,567 A | 7/1977 | Lipfert |
| 4,056,265 A | 11/1977 | Ide |
| 4,063,726 A | 12/1977 | Wilson |
| 4,063,727 A | 12/1977 | Hall |
| 4,066,257 A | 1/1978 | Moller |
| 4,066,259 A | 1/1978 | Brentham |
| 4,067,372 A | 1/1978 | Masson |
| 4,072,309 A | 2/1978 | Wilson |
| 4,074,903 A | 2/1978 | Diez de Aux |
| 4,077,626 A | 3/1978 | Newman |
| 4,082,267 A | 4/1978 | Flavell |
| 4,093,196 A | 6/1978 | Bauer |
| 4,094,330 A | 6/1978 | Jong |
| 4,111,417 A | 9/1978 | Gardner |
| 4,113,071 A | 9/1978 | Muller et al. |
| 4,120,294 A | 10/1978 | Wolfe |
| 4,141,158 A | 2/1979 | Benseler et al. |
| 4,146,222 A | 3/1979 | Hribar |
| 4,149,714 A | 4/1979 | Lambert, Jr. |
| 4,151,988 A | 5/1979 | Nabinger |
| 4,151,994 A | 5/1979 | Stalberger, Jr. |
| 4,161,998 A | 7/1979 | Trimble |
| 4,167,938 A | 9/1979 | Remih |
| 4,168,061 A | 9/1979 | Gordon |
| 4,171,805 A | 10/1979 | Abbott |
| 4,179,134 A | 12/1979 | Atkinson |
| 4,183,156 A | 1/1980 | Rudy |
| 4,183,494 A | 1/1980 | Cleveland |
| 4,188,030 A | 2/1980 | Hooper |
| 4,199,139 A | 4/1980 | Mahnke |
| 4,204,673 A | 5/1980 | Speer, Sr. |
| 4,208,049 A | 6/1980 | Wilson |
| 4,215,516 A | 8/1980 | Huschle et al. |
| 4,216,856 A | 8/1980 | Moring et al. |
| 4,227,689 A | 10/1980 | Keiser |
| 4,235,437 A | 11/1980 | Ruis et al. |
| 4,240,627 A | 12/1980 | Brentham |
| 4,248,476 A | 2/1981 | Phelps |
| 4,249,725 A | 2/1981 | Mattox |
| 4,251,932 A | 2/1981 | Love |
| 4,253,661 A | 3/1981 | Russell |
| 4,258,821 A | 3/1981 | Wendt |
| 4,258,913 A | 3/1981 | Brentham |
| 4,274,625 A | 6/1981 | Gaetano |
| 4,278,095 A | 7/1981 | Lapeyre |
| 4,278,249 A | 7/1981 | Forrest |
| 4,286,782 A | 9/1981 | Fuhrhop |
| 4,290,601 A | 9/1981 | Mittelstadt |
| 4,300,760 A | 11/1981 | Bobroff |
| 4,300,761 A | 11/1981 | Howard |
| 4,313,602 A | 2/1982 | Sullivan |
| 4,313,603 A | 2/1982 | Simjian |
| 4,324,501 A | 4/1982 | Herbenar |
| 4,333,978 A | 6/1982 | Kocher |
| 4,334,676 A | 6/1982 | Schonenberger |
| 4,334,695 A | 6/1982 | Ashby |
| 4,337,283 A | 6/1982 | Haas, Jr. |
| 4,342,452 A | 8/1982 | Summa |
| 4,344,616 A | 8/1982 | Ogden |
| 4,349,597 A | 9/1982 | Fine et al. |
| 4,350,336 A | 9/1982 | Hanford |
| 4,358,105 A | 11/1982 | Sweeney, Jr. |
| 4,363,480 A | 12/1982 | Fisher et al. |
| 4,363,486 A | 12/1982 | Chaudhry |
| 4,367,895 A | 1/1983 | Pacitti et al. |
| 4,369,081 A | 1/1983 | Curry et al. |
| 4,370,766 A | 2/1983 | Teague, Jr. |
| 4,374,587 A | 2/1983 | Ogden |
| 4,377,045 A | 3/1983 | Aurensan |
| 4,383,684 A | 5/1983 | Schliep |
| 4,383,714 A | 5/1983 | Ishida |
| 4,397,462 A | 8/1983 | Wilmarth |
| 4,406,451 A | 9/1983 | Gaetano |
| 4,408,613 A | 10/1983 | Relyea |
| 4,422,635 A | 12/1983 | Herod |
| 4,422,636 A | 12/1983 | de Angeli |
| 4,423,864 A | 1/1984 | Wik |
| 4,426,077 A | 1/1984 | Becker |
| 4,431,181 A | 2/1984 | Baswell |
| 4,434,981 A | 3/1984 | Norton |
| 4,441,708 A | 4/1984 | Brentham |
| 4,445,684 A | 5/1984 | Ruff |
| 4,452,448 A | 6/1984 | Ausherman |
| 4,453,766 A | 6/1984 | DiVito |
| 4,461,472 A | 7/1984 | Martinez |
| 4,465,277 A | 8/1984 | Dittrich |
| 4,476,582 A | 10/1984 | Strauss et al. |
| 4,477,071 A | 10/1984 | Brown et al. |
| 4,489,933 A | 12/1984 | Fisher |
| 4,491,318 A | 1/1985 | Francke |
| 4,494,662 A | 1/1985 | Clymer |
| 4,496,147 A | 1/1985 | DeCloux et al. |
| 4,499,784 A | 2/1985 | Shum |
| 4,502,679 A | 3/1985 | De Lorenzo |
| 4,505,474 A | 3/1985 | Mattox |
| 4,505,475 A | 3/1985 | Olschansky et al. |
| 4,509,510 A | 4/1985 | Hook |
| 4,512,567 A | 4/1985 | Phillips |
| 4,512,571 A | 4/1985 | Hermelin |
| 4,522,394 A | 6/1985 | Broussard |
| 4,529,194 A | 7/1985 | Haaheim |
| 4,533,136 A | 8/1985 | Smith et al. |
| 4,536,244 A | 8/1985 | Greci et al. |
| 4,538,805 A | 9/1985 | Parviainen |
| 4,542,899 A | 9/1985 | Hendricks |
| 4,544,152 A | 10/1985 | Taitel |
| 4,544,153 A | 10/1985 | Babcock |
| 4,546,971 A | 10/1985 | Raasoch |
| 4,548,405 A | 10/1985 | Lee |
| 4,549,733 A | 10/1985 | Salyer |
| 4,556,216 A | 12/1985 | Pitkanen |
| 4,563,001 A | 1/1986 | Terauds |
| 4,563,003 A | 1/1986 | Bugallo et al. |
| 4,564,193 A | 1/1986 | Stewart |
| 4,566,689 A | 1/1986 | Ogden |
| 4,566,732 A | 1/1986 | Ostergaard, Sr. |
| 4,569,518 A | 2/1986 | Fulks |
| 4,571,682 A | 2/1986 | Silverman et al. |
| 4,572,500 A | 2/1986 | Weiss |
| 4,572,504 A | 2/1986 | DiBartolo |
| 4,576,352 A | 3/1986 | Ogden |

(56) References Cited

U.S. PATENT DOCUMENTS

| | | |
|---|---|---|
| 4,576,376 A | 3/1986 | Miller |
| 4,577,860 A | 3/1986 | Matias et al. |
| 4,580,983 A | 4/1986 | Cassini et al. |
| 4,581,269 A | 4/1986 | Tilman |
| 4,582,320 A | 4/1986 | Shaw |
| 4,589,656 A | 5/1986 | Baldwin |
| 4,591,147 A | 5/1986 | Smith et al. |
| 4,592,544 A | 6/1986 | Smith et al. |
| 4,600,196 A | 7/1986 | Jones |
| 4,601,142 A | 7/1986 | Frommelt |
| 4,602,779 A | 7/1986 | Ogden |
| 4,610,449 A | 9/1986 | Diercks, Jr. |
| 4,614,337 A | 9/1986 | Schonenberger |
| D286,311 S | 10/1986 | Martinell et al. |
| 4,616,822 A | 10/1986 | Trulaske |
| 4,618,139 A | 10/1986 | Haaheim |
| 4,618,140 A | 10/1986 | Brown |
| 4,619,454 A | 10/1986 | Walton |
| 4,621,623 A | 11/1986 | Wang |
| 4,624,457 A | 11/1986 | Silberman et al. |
| 4,625,962 A | 12/1986 | Street |
| 4,627,614 A | 12/1986 | De Angeli |
| 4,627,615 A | 12/1986 | Nurkowski |
| 4,627,616 A | 12/1986 | Kauffman |
| 4,630,817 A | 12/1986 | Buckley |
| 4,632,385 A | 12/1986 | Geraci |
| 4,632,386 A | 12/1986 | Beech |
| 4,632,390 A | 12/1986 | Richey |
| 4,634,127 A | 1/1987 | Rockwell |
| 4,635,927 A | 1/1987 | Shu |
| 4,635,928 A | 1/1987 | Ogden et al. |
| 4,637,605 A | 1/1987 | Ritchie |
| 4,638,523 A | 1/1987 | Todd |
| 4,638,969 A | 1/1987 | Brown |
| 4,641,833 A | 2/1987 | Trethewey |
| 4,642,080 A | 2/1987 | Takano et al. |
| 4,643,418 A | 2/1987 | Bart |
| 4,645,197 A | 2/1987 | McFee |
| 4,645,200 A | 2/1987 | Hix |
| 4,645,201 A | 2/1987 | Evans |
| 4,645,917 A | 2/1987 | Penney et al. |
| 4,647,041 A | 3/1987 | Whiteley |
| 4,650,067 A | 3/1987 | Brule |
| 4,650,184 A | 3/1987 | Brebner |
| 4,650,185 A | 3/1987 | Cartwright |
| 4,651,581 A | 3/1987 | Svensson |
| 4,659,074 A | 4/1987 | Taitel et al. |
| 4,659,077 A | 4/1987 | Stropkay |
| 4,659,078 A | 4/1987 | Blome |
| 4,662,630 A | 5/1987 | Dignard et al. |
| 4,664,371 A | 5/1987 | Viander |
| 4,664,373 A | 5/1987 | Hait |
| 4,664,646 A | 5/1987 | Rorabaugh |
| 4,673,177 A | 6/1987 | Szymski |
| 4,674,740 A | 6/1987 | Iams et al. |
| 4,674,743 A | 6/1987 | Hirano |
| 4,678,185 A | 7/1987 | Mahnke |
| 4,679,787 A | 7/1987 | Guilbault |
| 4,681,318 A | 7/1987 | Lay |
| 4,684,121 A | 8/1987 | Nestegard |
| 4,684,126 A | 8/1987 | Dalebout et al. |
| 4,685,670 A | 8/1987 | Zinkin |
| 4,687,195 A | 8/1987 | Potts |
| 4,697,809 A | 10/1987 | Rockwell |
| 4,700,946 A | 10/1987 | Breunig |
| 4,702,475 A | 10/1987 | Elstein et al. |
| 4,705,267 A | 11/1987 | Jackson |
| 4,708,337 A | 11/1987 | Shyu |
| 4,709,917 A | 12/1987 | Yang |
| 4,709,918 A | 12/1987 | Grinblat |
| 4,709,920 A | 12/1987 | Schnell |
| 4,711,447 A | 12/1987 | Mansfield |
| 4,714,248 A | 12/1987 | Koss |
| 4,718,207 A | 1/1988 | Frommelt |
| 4,720,093 A | 1/1988 | Del Mar |
| 4,720,099 A | 1/1988 | Carlson |
| 4,720,789 A | 1/1988 | Hector et al. |
| 4,721,303 A | 1/1988 | Fitzpatrick |
| 4,725,057 A | 2/1988 | Shifferaw |
| 4,726,581 A | 2/1988 | Chang |
| 4,728,102 A | 3/1988 | Pauls |
| 4,729,558 A | 3/1988 | Kuo |
| 4,729,562 A | 3/1988 | Pipasik |
| 4,733,858 A | 3/1988 | Lan |
| 4,743,009 A | 5/1988 | Beale |
| 4,743,015 A | 5/1988 | Marshall |
| 4,744,559 A | 5/1988 | Mahnke et al. |
| 4,746,115 A | 5/1988 | Lahman |
| 4,749,184 A | 6/1988 | Tobin |
| 4,750,736 A | 6/1988 | Watterson |
| 4,751,755 A | 6/1988 | Carey, Jr. et al. |
| 4,756,098 A | 7/1988 | Boggia |
| 4,757,987 A | 7/1988 | Allemand |
| 4,759,540 A | 7/1988 | Yu et al. |
| 4,771,148 A | 9/1988 | Bersonnet |
| 4,772,015 A | 9/1988 | Carlson et al. |
| 4,773,170 A | 9/1988 | Moore et al. |
| 4,776,582 A | 10/1988 | Ramhorst |
| 4,779,884 A | 10/1988 | Minati |
| 4,786,049 A | 11/1988 | Lautenschlager |
| 4,786,050 A | 11/1988 | Geschwender |
| 4,788,493 A | 11/1988 | Liptak |
| 4,790,528 A | 12/1988 | Nakao et al. |
| 4,792,134 A | 12/1988 | Chen |
| 4,796,881 A | 1/1989 | Watterson |
| 4,797,968 A | 1/1989 | Wenzlick |
| 4,798,760 A | 1/1989 | Diaz-Kotti |
| 4,799,475 A | 1/1989 | Iams et al. |
| 4,799,671 A | 1/1989 | Hoggan et al. |
| 4,801,079 A | 1/1989 | Gonella |
| 4,804,178 A | 2/1989 | Friedebach |
| 4,805,901 A | 2/1989 | Kulick |
| 4,807,874 A | 2/1989 | Little |
| 4,809,804 A | 3/1989 | Houston et al. |
| 4,809,972 A | 3/1989 | Rasmussen et al. |
| 4,813,667 A | 3/1989 | Watterson |
| 4,813,668 A | 3/1989 | Solloway |
| 4,813,743 A | 3/1989 | Mizelle |
| 4,817,939 A | 4/1989 | Augspurger et al. |
| 4,818,175 A | 4/1989 | Kimura |
| 4,819,583 A | 4/1989 | Guerra |
| 4,822,029 A | 4/1989 | Sarno |
| 4,822,034 A | 4/1989 | Shields |
| 4,824,104 A | 4/1989 | Bloch |
| 4,826,153 A | 5/1989 | Schalip |
| 4,826,157 A | 5/1989 | Fitzpatrick |
| 4,826,158 A | 5/1989 | Fields, Jr. |
| 4,826,159 A | 5/1989 | Hersey |
| 4,828,255 A | 5/1989 | Lahman |
| 4,828,257 A | 5/1989 | Dyer et al. |
| 4,830,362 A | 5/1989 | Bull |
| 4,830,371 A | 5/1989 | Lay |
| 4,832,332 A | 5/1989 | Dumbser |
| 4,836,530 A | 6/1989 | Stanley, Jr. |
| 4,838,543 A | 6/1989 | Armstrong et al. |
| 4,838,544 A | 6/1989 | Sasakawa et al. |
| 4,842,266 A | 6/1989 | Sweeney, Sr. |
| 4,842,274 A | 6/1989 | Oosthuizen |
| 4,844,449 A | 7/1989 | Truslaske |
| 4,844,450 A | 7/1989 | Rodgers, Jr. |
| 4,844,451 A | 7/1989 | Bersonnet et al. |
| 4,848,737 A | 7/1989 | Ehrenfield |
| 4,850,585 A | 7/1989 | Dalebout |
| 4,861,023 A | 8/1989 | Wedman |
| 4,861,025 A | 8/1989 | Rockwell |
| 4,863,161 A | 9/1989 | Telle |
| 4,865,344 A | 9/1989 | Romero, Sr. et al. |
| 4,867,443 A | 9/1989 | Jensen |
| 4,869,493 A | 9/1989 | Johnston |
| 4,869,494 A | 9/1989 | Lambert, Sr. |
| 4,869,497 A | 9/1989 | Stewart et al. |
| 4,875,676 A | 10/1989 | Zimmer |
| 4,877,239 A | 10/1989 | Dela Rosa |
| D304,849 S | 11/1989 | Watterson |

(56) References Cited

U.S. PATENT DOCUMENTS

| | | |
|---|---|---|
| 4,878,662 A | 11/1989 | Chern |
| 4,878,663 A | 11/1989 | Luquette |
| 4,880,225 A | 11/1989 | Lucas et al. |
| 4,880,227 A | 11/1989 | Sowell |
| 4,883,272 A | 11/1989 | Lay |
| 4,886,266 A | 12/1989 | Trulaske |
| 4,891,764 A | 1/1990 | McIntosh |
| 4,894,933 A | 1/1990 | Tonkel et al. |
| 4,898,379 A | 2/1990 | Shiba |
| 4,898,381 A | 2/1990 | Gordon |
| 4,900,012 A | 2/1990 | Fu |
| 4,900,017 A | 2/1990 | Bold, Jr. |
| 4,900,018 A | 2/1990 | Ish, III |
| 4,902,006 A | 2/1990 | Stallings, Jr. |
| 4,904,829 A | 2/1990 | Berthaud et al. |
| D306,468 S | 3/1990 | Watterson |
| D306,891 S | 3/1990 | Watterson |
| 4,905,330 A | 3/1990 | Jacobs |
| 4,907,795 A | 3/1990 | Shaw et al. |
| 4,907,797 A | 3/1990 | Gezari et al. |
| 4,907,798 A | 3/1990 | Burchatz |
| 4,909,504 A | 3/1990 | Yang |
| 4,911,438 A | 3/1990 | Van Straaten |
| 4,913,396 A | 4/1990 | Dalebout et al. |
| 4,913,423 A | 4/1990 | Farran |
| 4,915,377 A | 4/1990 | Malnke et al. |
| 4,915,379 A | 4/1990 | Sapp |
| 4,917,376 A | 4/1990 | Lo |
| 4,919,418 A | 4/1990 | Miller |
| 4,919,419 A | 4/1990 | Houston |
| D307,614 S | 5/1990 | Bingham et al. |
| D307,615 S | 5/1990 | Bingham et al. |
| 4,921,242 A | 5/1990 | Watterson |
| 4,921,247 A | 5/1990 | Sterling |
| 4,923,193 A | 5/1990 | Pitzen et al. |
| 4,925,183 A | 5/1990 | Kim |
| 4,925,724 A | 5/1990 | Ogden |
| 4,927,136 A | 5/1990 | Leask |
| 4,928,546 A | 5/1990 | Walters |
| 4,928,957 A | 5/1990 | Lanier et al. |
| 4,930,768 A | 6/1990 | Lapcevic |
| 4,930,769 A | 6/1990 | Nenoff |
| 4,932,650 A | 6/1990 | Bingham et al. |
| 4,934,690 A | 6/1990 | Bull |
| 4,934,692 A | 6/1990 | Owens |
| D309,167 S | 7/1990 | Griffin |
| D309,485 S | 7/1990 | Bingham et al. |
| 4,938,473 A | 7/1990 | Lee |
| 4,938,478 A | 7/1990 | Lay |
| 4,940,233 A | 7/1990 | Bull |
| 4,941,652 A | 7/1990 | Nagano et al. |
| 4,941,673 A | 7/1990 | Bennett |
| D310,253 S | 8/1990 | Bersonnet et al. |
| 4,948,121 A | 8/1990 | Haaheim et al. |
| 4,949,954 A | 8/1990 | Hix |
| 4,949,958 A | 8/1990 | Richey |
| 4,949,959 A | 8/1990 | Stevens |
| 4,952,265 A | 8/1990 | Yamanaka et al. |
| 4,953,415 A | 9/1990 | Lehtonen |
| 4,953,858 A | 9/1990 | Zelli |
| 4,955,466 A | 9/1990 | Almes et al. |
| 4,955,599 A | 9/1990 | Bersonnet et al. |
| 4,958,832 A | 9/1990 | Kim |
| 4,960,276 A | 10/1990 | Feuer et al. |
| 4,964,632 A | 10/1990 | Rockwell |
| 4,968,028 A | 11/1990 | Wehrell |
| 4,971,316 A | 11/1990 | Dalebout et al. |
| D313,055 S | 12/1990 | Watterson |
| 4,974,831 A | 12/1990 | Dunham |
| 4,974,832 A | 12/1990 | Dalebout |
| 4,976,424 A | 12/1990 | Sargeant et al. |
| 4,976,428 A | 12/1990 | Ghazi |
| 4,976,435 A | 12/1990 | Shafford |
| 4,979,737 A | 12/1990 | Kock |
| 4,981,294 A | 1/1991 | Dalebout et al. |
| 4,984,810 A | 1/1991 | Stearns et al. |
| 4,986,261 A | 1/1991 | Iams et al. |
| 4,989,860 A | 2/1991 | Iams et al. |
| D315,765 S | 3/1991 | Measom et al. |
| 4,998,725 A | 3/1991 | Watterson et al. |
| 5,000,440 A | 3/1991 | Lynch |
| 5,000,442 A | 3/1991 | Dalebout et al. |
| 5,000,443 A | 3/1991 | Dalebout et al. |
| 5,000,444 A | 3/1991 | Dalebout et al. |
| 5,001,632 A | 3/1991 | Hall Tipping |
| 5,002,271 A | 3/1991 | Gonzales |
| D316,124 S | 4/1991 | Dalebout et al. |
| 5,004,224 A | 4/1991 | Wang |
| 5,007,630 A | 4/1991 | Real et al. |
| 5,007,631 A | 4/1991 | Wang |
| 5,013,031 A | 5/1991 | Bull |
| 5,013,033 A | 5/1991 | Watterson et al. |
| 5,014,980 A | 5/1991 | Bersonnet et al. |
| 5,016,870 A | 5/1991 | Bulloch et al. |
| 5,016,871 A | 5/1991 | Dalebout et al. |
| 5,020,793 A | 6/1991 | Loane |
| 5,024,441 A | 6/1991 | Rousseau |
| 5,026,049 A | 6/1991 | Goodman |
| 5,027,303 A | 6/1991 | Witte |
| D318,085 S | 7/1991 | Jacobson et al. |
| D318,086 S | 7/1991 | Bingham et al. |
| D318,699 S | 7/1991 | Jacobson et al. |
| 5,029,801 A | 7/1991 | Dalebout et al. |
| 5,031,455 A | 7/1991 | Cline |
| 5,031,901 A | 7/1991 | Saarinen |
| 5,034,576 A | 7/1991 | Dalebout et al. |
| RE33,662 E | 8/1991 | Blair et al. |
| 5,037,084 A | 8/1991 | Flor |
| 5,037,089 A | 8/1991 | Spagnuolo |
| 5,039,089 A | 8/1991 | Lapcevic |
| 5,039,091 A | 8/1991 | Johnson |
| 5,042,799 A | 8/1991 | Stanley |
| 5,046,382 A | 9/1991 | Steinberg |
| 5,046,722 A | 9/1991 | Antoon |
| 5,048,823 A | 9/1991 | Bean |
| 5,051,638 A | 9/1991 | Pyles |
| 5,054,770 A | 10/1991 | Bull |
| 5,058,881 A | 10/1991 | Measom |
| 5,058,882 A | 10/1991 | Dalebout et al. |
| 5,058,888 A | 10/1991 | Walker et al. |
| 5,062,626 A | 11/1991 | Dalebout et al. |
| 5,062,627 A | 11/1991 | Bingham |
| 5,062,629 A | 11/1991 | Vaughan |
| 5,062,632 A | 11/1991 | Dalebout et al. |
| 5,062,633 A | 11/1991 | Engel et al. |
| 5,066,000 A | 11/1991 | Dolan |
| 5,067,710 A | 11/1991 | Watterson et al. |
| 5,071,115 A | 12/1991 | Welch |
| 5,072,928 A | 12/1991 | Stearns et al. |
| 5,072,929 A | 12/1991 | Peterson et al. |
| 5,074,550 A | 12/1991 | Sloan |
| D323,009 S | 1/1992 | Dalebout et al. |
| D323,198 S | 1/1992 | Dalebout et al. |
| D323,199 S | 1/1992 | Dalebout et al. |
| 5,077,916 A | 1/1992 | Beneteau |
| 5,080,353 A | 1/1992 | Tench |
| 5,081,991 A | 1/1992 | Chance |
| D323,863 S | 2/1992 | Watterson |
| 5,085,426 A | 2/1992 | Wanzer et al. |
| 5,085,427 A | 2/1992 | Wanzer et al. |
| 5,087,047 A | 2/1992 | McConnell |
| 5,088,729 A | 2/1992 | Dalebout |
| 5,090,694 A | 2/1992 | Pauls et al. |
| 5,094,249 A | 3/1992 | Marras et al. |
| 5,094,447 A | 3/1992 | Wang |
| 5,096,225 A | 3/1992 | Osawa |
| 5,102,122 A | 4/1992 | Piane, Jr |
| 5,102,380 A | 4/1992 | Jacobson et al. |
| 5,104,119 A | 4/1992 | Lynch |
| 5,104,120 A | 4/1992 | Watterson et al. |
| 5,108,093 A | 4/1992 | Watterson |
| D326,491 S | 5/1992 | Dalebout |
| 5,109,778 A | 5/1992 | Berkowitz et al. |
| 5,110,117 A | 5/1992 | Fisher et al. |

(56) References Cited

U.S. PATENT DOCUMENTS

| | | | |
|---|---|---|---|
| 5,112,045 | A | 5/1992 | Mason et al. |
| 5,114,388 | A | 5/1992 | Trulaske |
| 5,114,391 | A | 5/1992 | Pitzen et al. |
| 5,122,105 | A | 6/1992 | Engel et al. |
| 5,123,629 | A | 6/1992 | Takeuchi |
| 5,123,885 | A | 6/1992 | Shields |
| 5,123,886 | A | 6/1992 | Cook |
| 5,129,872 | A | 7/1992 | Dalton et al. |
| 5,131,895 | A | 7/1992 | Rogers, Jr. |
| 5,135,216 | A | 8/1992 | Bingham et al. |
| 5,135,458 | A | 8/1992 | Huang |
| 5,137,501 | A | 8/1992 | Mertesdorf |
| 5,138,730 | A | 8/1992 | Masuda |
| 5,141,480 | A | 8/1992 | Lennox et al. |
| 5,142,358 | A | 8/1992 | Jason |
| 5,145,475 | A | 9/1992 | Cares |
| 5,145,481 | A | 9/1992 | Friedebach |
| 5,147,265 | A | 9/1992 | Pauls et al. |
| 5,147,266 | A | 9/1992 | Ricard |
| 5,149,084 | A | 9/1992 | Dalebout et al. |
| 5,149,312 | A | 9/1992 | Croft et al. |
| 5,154,684 | A | 10/1992 | Delf |
| 5,158,520 | A | 10/1992 | Lemke et al. |
| 5,162,029 | A | 11/1992 | Schine |
| 5,163,885 | A | 11/1992 | Wanzer et al. |
| 5,167,159 | A | 12/1992 | Lucking |
| 5,167,597 | A | 12/1992 | David |
| 5,171,196 | A | 12/1992 | Lynch |
| D332,347 | S | 1/1993 | Raadt et al. |
| 5,178,593 | A | 1/1993 | Roberts |
| 5,178,599 | A | 1/1993 | Scott |
| 5,181,894 | A | 1/1993 | Shieng |
| 5,184,295 | A | 2/1993 | Mann |
| 5,184,988 | A | 2/1993 | Dunham |
| 5,186,697 | A | 2/1993 | Rennex |
| 5,190,505 | A | 3/1993 | Dalebout et al. |
| 5,192,255 | A | 3/1993 | Dalebout et al. |
| 5,192,257 | A | 3/1993 | Panasewicz |
| 5,192,258 | A | 3/1993 | Keller |
| 5,195,781 | A | 3/1993 | Osawa |
| 5,195,935 | A | 3/1993 | Fencel |
| 5,195,937 | A | 3/1993 | Engel et al. |
| 5,199,931 | A | 4/1993 | Easley et al. |
| 5,201,694 | A | 4/1993 | Zappel |
| 5,203,229 | A | 4/1993 | Chen |
| 5,203,800 | A | 4/1993 | Meredith |
| 5,203,826 | A | 4/1993 | Dalebout |
| 5,205,798 | A | 4/1993 | Lekhtman |
| 5,205,800 | A | 4/1993 | Grant |
| D335,511 | S | 5/1993 | Engel et al. |
| D335,905 | S | 5/1993 | Cutter et al. |
| 5,207,489 | A | 5/1993 | Miller |
| 5,207,622 | A | 5/1993 | Wilkinson et al. |
| 5,207,625 | A | 5/1993 | White |
| 5,207,628 | A | 5/1993 | Graham |
| 5,211,617 | A | 5/1993 | Millen |
| D336,498 | S | 6/1993 | Engel et al. |
| 5,215,510 | A | 6/1993 | Baran |
| 5,217,422 | A | 6/1993 | Domzalski |
| 5,217,487 | A | 6/1993 | Engel et al. |
| D337,361 | S | 7/1993 | Engel et al. |
| D337,666 | S | 7/1993 | Peterson et al. |
| D337,799 | S | 7/1993 | Cutter et al. |
| 5,226,866 | A | 7/1993 | Engel et al. |
| 5,232,422 | A | 8/1993 | Bishop, Jr. |
| 5,234,392 | A | 8/1993 | Clark |
| 5,240,417 | A | 8/1993 | Smithson et al. |
| 5,242,339 | A | 9/1993 | Thornton |
| 5,242,340 | A | 9/1993 | Jerome |
| 5,242,343 | A | 9/1993 | Miller |
| 5,242,347 | A | 9/1993 | Keeton |
| 5,244,446 | A | 9/1993 | Engel et al. |
| 5,247,853 | A | 9/1993 | Dalebout |
| 5,250,012 | A | 10/1993 | Morris, Jr. |
| 5,250,013 | A | 10/1993 | Brangi |
| 5,254,067 | A | 10/1993 | Habing et al. |
| 5,256,117 | A | 10/1993 | Potts et al. |
| 5,256,118 | A | 10/1993 | Chen |
| 5,256,126 | A | 10/1993 | Grotstein |
| 5,257,701 | A | 11/1993 | Edelson |
| 5,257,964 | A | 11/1993 | Petters |
| 5,259,611 | A | 11/1993 | Dalebout et al. |
| 5,261,864 | A | 11/1993 | Fitzpatrick |
| D342,106 | S | 12/1993 | Campbell et al. |
| 5,269,736 | A | 12/1993 | Roberts |
| 5,271,416 | A | 12/1993 | Lepley |
| 5,273,285 | A | 12/1993 | Long |
| 5,277,678 | A | 1/1994 | Friedebach et al. |
| 5,279,528 | A | 1/1994 | Dalebout et al. |
| 5,279,529 | A | 1/1994 | Eschenbach |
| 5,279,531 | A | 1/1994 | Jen-Huey |
| D344,112 | S | 2/1994 | Smith |
| D344,557 | S | 2/1994 | Ashby |
| 5,282,776 | A | 2/1994 | Dalebout |
| 5,284,461 | A | 2/1994 | Wilkinson et al. |
| 5,290,205 | A | 3/1994 | Densmore et al. |
| 5,290,211 | A | 3/1994 | Stearns |
| 5,292,293 | A | 3/1994 | Schumacher |
| 5,295,927 | A | 3/1994 | Easley |
| 5,295,928 | A | 3/1994 | Rennex |
| 5,295,931 | A | 3/1994 | Dreibelbis et al. |
| 5,295,935 | A | 3/1994 | Wang |
| 5,299,992 | A | 4/1994 | Wilkinson |
| 5,299,993 | A | 4/1994 | Habing |
| 5,302,161 | A | 4/1994 | Loubert et al. |
| 5,302,162 | A | 4/1994 | Pasero |
| 5,306,221 | A | 4/1994 | Itaru |
| D347,251 | S | 5/1994 | Dreibelbis et al. |
| 5,308,075 | A | 5/1994 | Theriault |
| 5,308,304 | A | 5/1994 | Habing |
| 5,310,392 | A | 5/1994 | Lo |
| 5,313,852 | A | 5/1994 | Arena |
| 5,314,390 | A | 5/1994 | Westing et al. |
| 5,314,391 | A | 5/1994 | Potash et al. |
| 5,314,392 | A | 5/1994 | Hawkins et al. |
| 5,314,394 | A | 5/1994 | Ronan |
| 5,316,534 | A | 5/1994 | Dalebout et al. |
| 5,318,487 | A | 6/1994 | Golen et al. |
| 5,320,343 | A | 6/1994 | McKinney |
| 5,320,588 | A | 6/1994 | Wanzer et al. |
| 5,320,591 | A | 6/1994 | Harmon et al. |
| 5,320,641 | A | 6/1994 | Riddle |
| 5,324,242 | A | 6/1994 | Lo |
| D348,493 | S | 7/1994 | Ashby |
| D348,494 | S | 7/1994 | Ashby |
| 5,328,164 | A | 7/1994 | Soga |
| 5,328,420 | A | 7/1994 | Allen |
| 5,328,422 | A | 7/1994 | Nichols |
| 5,328,429 | A | 7/1994 | Potash et al. |
| 5,330,401 | A | 7/1994 | Walstead |
| 5,330,402 | A | 7/1994 | Johnson |
| D349,931 | S | 8/1994 | Bostic et al. |
| 5,334,120 | A | 8/1994 | Rasmussen |
| 5,336,142 | A | 8/1994 | Dalebout et al. |
| 5,336,144 | A | 8/1994 | Rodden |
| 5,336,145 | A | 8/1994 | Keiser |
| 5,336,146 | A | 8/1994 | Piaget et al. |
| 5,342,264 | A | 8/1994 | Gordon |
| 5,342,271 | A | 8/1994 | Long |
| RE34,728 | E | 9/1994 | Hall-Tipping |
| 5,344,372 | A | 9/1994 | Hung |
| 5,344,376 | A | 9/1994 | Bostic et al. |
| 5,348,524 | A | 9/1994 | Grant |
| 5,350,344 | A | 9/1994 | Kissel |
| D351,202 | S | 10/1994 | Bingham |
| D351,435 | S | 10/1994 | Peterson et al. |
| D351,633 | S | 10/1994 | Bingham |
| 5,352,166 | A | 10/1994 | Chang |
| 5,352,167 | A | 10/1994 | Ulicny |
| 5,352,169 | A | 10/1994 | Eschenbach |
| 5,353,452 | A | 10/1994 | Rulis |
| 5,354,248 | A | 10/1994 | Rawls et al. |
| 5,354,251 | A | 10/1994 | Sleamaker |
| 5,356,356 | A | 10/1994 | Hildebrandt et al. |

(56) References Cited

U.S. PATENT DOCUMENTS

| | | |
|---|---|---|
| 5,358,461 A | 10/1994 | Bailey, Jr. |
| D352,534 S | 11/1994 | Dreibelbis et al. |
| 5,359,986 A | 11/1994 | Magrath, III et al. |
| 5,362,069 A | 11/1994 | Hall-Tipping |
| 5,362,295 A | 11/1994 | Nurge |
| 5,364,327 A | 11/1994 | Graham |
| 5,368,532 A | 11/1994 | Farnet |
| D353,422 S | 12/1994 | Bostic et al. |
| 5,372,556 A | 12/1994 | Ropp |
| 5,372,559 A | 12/1994 | Dalebout et al. |
| 5,372,560 A | 12/1994 | Chang |
| 5,372,564 A | 12/1994 | Spirito |
| 5,374,227 A | 12/1994 | Webb |
| 5,374,228 A | 12/1994 | Buisman et al. |
| 5,378,212 A | 1/1995 | Pin-Kuo |
| 5,380,258 A | 1/1995 | Hawley, Jr. |
| 5,382,207 A | 1/1995 | Skowronski et al. |
| 5,382,208 A | 1/1995 | Hu |
| 5,382,209 A | 1/1995 | Pasier |
| 5,382,221 A | 1/1995 | Hsu et al. |
| 5,383,827 A | 1/1995 | Stern |
| 5,383,828 A | 1/1995 | Sands et al. |
| 5,385,346 A | 1/1995 | Carroll et al. |
| 5,385,519 A | 1/1995 | Hsu |
| 5,387,168 A | 2/1995 | Bostic |
| 5,387,169 A | 2/1995 | Wang |
| 5,387,170 A | 2/1995 | Rawls et al. |
| 5,387,171 A | 2/1995 | Casey et al. |
| 5,393,690 A | 2/1995 | Fu et al. |
| D356,128 S | 3/1995 | Smith et al. |
| 5,394,922 A | 3/1995 | Colson et al. |
| 5,396,876 A | 3/1995 | Liscio et al. |
| 5,398,948 A | 3/1995 | Mathis |
| 5,401,226 A | 3/1995 | Stearns |
| 5,403,251 A | 4/1995 | Belsito et al. |
| 5,403,252 A | 4/1995 | Leon et al. |
| 5,403,253 A | 4/1995 | Gaylord |
| 5,403,254 A | 4/1995 | Lundin et al. |
| 5,403,255 A | 4/1995 | Johnston |
| 5,406,661 A | 4/1995 | Pekar |
| 5,407,403 A | 4/1995 | Coleman |
| 5,407,408 A | 4/1995 | Wilkinson |
| 5,409,435 A | 4/1995 | Daniels |
| RE34,959 E | 5/1995 | Potts |
| 5,410,971 A | 5/1995 | Golden et al. |
| 5,417,643 A | 5/1995 | Taylor |
| 5,419,570 A | 5/1995 | Bollotte |
| 5,419,571 A | 5/1995 | Vaughan |
| 5,419,751 A | 5/1995 | Byrd et al. |
| 5,423,729 A | 6/1995 | Eschenbach |
| 5,423,730 A | 6/1995 | Hirsch |
| 5,429,563 A | 7/1995 | Engel et al. |
| 5,429,569 A | 7/1995 | Gunnari |
| 5,431,612 A | 7/1995 | Engel et al. |
| 5,433,679 A | 7/1995 | Szymczak et al. |
| 5,435,315 A | 7/1995 | McPhee et al. |
| 5,435,798 A | 7/1995 | Habing et al. |
| D360,915 S | 8/1995 | Bostic et al. |
| 5,441,467 A | 8/1995 | Stevens |
| 5,441,468 A | 8/1995 | Deckers et al. |
| 5,449,334 A | 9/1995 | Kingsbury |
| 5,454,772 A | 10/1995 | Rodden |
| 5,454,773 A | 10/1995 | Blanchard et al. |
| 5,456,648 A | 10/1995 | Edinburg |
| 5,460,379 A | 10/1995 | Cleland |
| 5,460,586 A | 10/1995 | Wilkinson |
| 5,462,503 A | 10/1995 | Benjamin et al. |
| 5,462,504 A | 10/1995 | Trulaske et al. |
| 5,466,200 A | 11/1995 | Ulrich et al. |
| 5,466,203 A | 11/1995 | Chen |
| 5,468,205 A | 11/1995 | McFall et al. |
| 5,470,298 A | 11/1995 | Curtis |
| 5,471,405 A | 11/1995 | Marsh |
| 5,474,087 A | 12/1995 | Nashner |
| 5,474,510 A | 12/1995 | Chen |
| 5,476,430 A | 12/1995 | Lee et al. |
| 5,484,358 A | 1/1996 | Wang et al. |
| 5,484,362 A | 1/1996 | Skowronski et al. |
| 5,487,707 A | 1/1996 | Sharf et al. |
| 5,489,249 A | 2/1996 | Brewer et al. |
| 5,489,250 A | 2/1996 | Densmore et al. |
| 5,490,818 A | 2/1996 | Haber et al. |
| 5,492,514 A | 2/1996 | Daum |
| 5,492,517 A | 2/1996 | Bostic et al. |
| 5,492,520 A | 2/1996 | Brown |
| D367,689 S | 3/1996 | Wilkinson et al. |
| 5,496,235 A | 3/1996 | Stevens |
| 5,496,236 A | 3/1996 | Buonauito |
| 5,496,238 A | 3/1996 | Taylor |
| 5,496,239 A | 3/1996 | Kallman |
| 5,499,956 A | 3/1996 | Habing et al. |
| 5,505,011 A | 4/1996 | Bleimhofer |
| 5,507,271 A | 4/1996 | Actor |
| 5,509,870 A | 4/1996 | Lloyd |
| 5,511,740 A | 4/1996 | Loubert et al. |
| 5,512,025 A | 4/1996 | Dalebout et al. |
| 5,512,029 A | 4/1996 | Barnard |
| 5,514,053 A | 5/1996 | Hawkins et al. |
| 5,518,471 A | 5/1996 | Hettinger et al. |
| 5,518,473 A | 5/1996 | Miller |
| 5,520,599 A | 5/1996 | Chen |
| D370,949 S | 6/1996 | Furner |
| D371,176 S | 6/1996 | Furner |
| 5,522,783 A | 6/1996 | Gordon |
| 5,527,245 A | 6/1996 | Dalebout et al. |
| 5,529,553 A | 6/1996 | Finlayson |
| 5,529,554 A | 6/1996 | Eschenbach |
| 5,531,658 A | 7/1996 | L. S. C. |
| 5,533,899 A | 7/1996 | Young |
| 5,533,948 A | 7/1996 | Wilkinson |
| 5,533,951 A | 7/1996 | Chang |
| 5,538,489 A | 7/1996 | Magid |
| 5,540,429 A | 7/1996 | Dalebout et al. |
| 5,542,892 A | 8/1996 | Buhler |
| 5,545,112 A | 8/1996 | Densmore et al. |
| 5,549,052 A | 8/1996 | Hoffman |
| 5,549,533 A | 8/1996 | Olson et al. |
| 5,549,536 A | 8/1996 | Clark |
| 5,551,934 A | 9/1996 | Binette |
| 5,551,937 A | 9/1996 | Kwo |
| 5,554,033 A | 9/1996 | Bizzi et al. |
| 5,554,083 A | 9/1996 | Chen |
| 5,554,085 A | 9/1996 | Dalebout |
| 5,556,362 A | 9/1996 | Whipps |
| 5,562,572 A | 10/1996 | Carmein |
| 5,562,574 A | 10/1996 | Miller |
| 5,563,487 A | 10/1996 | Davis |
| 5,568,993 A | 10/1996 | Potzick |
| 5,569,128 A | 10/1996 | Dalebout |
| 5,569,138 A | 10/1996 | Wang et al. |
| 5,573,485 A | 11/1996 | Geschwender |
| 5,575,740 A | 11/1996 | Piaget |
| 5,577,985 A | 11/1996 | Miller |
| 5,577,987 A | 11/1996 | Brown |
| 5,580,249 A | 12/1996 | Jacobsen et al. |
| 5,582,563 A | 12/1996 | Fan |
| 5,584,700 A | 12/1996 | Feldman et al. |
| 5,584,779 A | 12/1996 | Knecht |
| 5,585,561 A | 12/1996 | Bahl et al. |
| 5,586,736 A | 12/1996 | Mollet |
| 5,588,938 A | 12/1996 | Schneider et al. |
| 5,590,893 A | 1/1997 | Robinson et al. |
| 5,591,104 A | 1/1997 | Andrus et al. |
| 5,591,105 A | 1/1997 | Dalebout et al. |
| 5,591,106 A | 1/1997 | Dalebout et al. |
| 5,591,107 A | 1/1997 | Rodgers, Jr. |
| 5,591,908 A | 1/1997 | Reid |
| 5,593,372 A | 1/1997 | Rodgers, Jr. |
| 5,593,380 A | 1/1997 | Bittikofer |
| 5,595,556 A | 1/1997 | Dalebout et al. |
| 5,599,261 A | 2/1997 | Easley et al. |
| 5,600,310 A | 2/1997 | Whipple, III et al. |
| 5,603,675 A | 2/1997 | Wu |
| 5,603,678 A | 2/1997 | Wilson |

(56) References Cited

U.S. PATENT DOCUMENTS

| | | |
|---|---|---|
| 5,607,375 A | 3/1997 | Dalebout |
| 5,611,539 A | 3/1997 | Watterson |
| 5,613,216 A | 3/1997 | Galler |
| 5,613,856 A | 3/1997 | Hoover |
| 5,616,103 A | 4/1997 | Lee |
| 5,622,527 A | 4/1997 | Watterson et al. |
| 5,625,577 A | 4/1997 | Kunii et al. |
| 5,626,538 A | 5/1997 | Dalebout et al. |
| 5,626,539 A | 5/1997 | Piaget |
| 5,626,542 A | 5/1997 | Dalebout et al. |
| 5,630,566 A | 5/1997 | Case |
| 5,632,209 A | 5/1997 | Sakakibara |
| D380,024 S | 6/1997 | Novak et al. |
| 5,634,870 A | 6/1997 | Wilkinson |
| 5,637,059 A | 6/1997 | Dalebout |
| D380,509 S | 7/1997 | Wilkinson et al. |
| 5,643,142 A | 7/1997 | Salerno et al. |
| 5,643,144 A | 7/1997 | Trulaske |
| 5,643,147 A | 7/1997 | Huang |
| 5,643,152 A | 7/1997 | Simonson |
| 5,643,153 A | 7/1997 | Nylen et al. |
| 5,643,157 A | 7/1997 | Seliber |
| 5,645,509 A | 7/1997 | Brewer et al. |
| 5,645,914 A | 7/1997 | Horowitz |
| 5,649,882 A | 7/1997 | Parikh et al. |
| 5,650,709 A | 7/1997 | Rotunda et al. |
| 5,653,662 A | 8/1997 | Rodgers, Jr. |
| 5,655,997 A | 8/1997 | Greenberg et al. |
| 5,656,003 A | 8/1997 | Robinson et al. |
| 5,658,227 A | 8/1997 | Stearns |
| D384,118 S | 9/1997 | Deblauw |
| 5,662,557 A | 9/1997 | Watterson et al. |
| 5,665,031 A | 9/1997 | Hsieh |
| 5,665,033 A | 9/1997 | Palmer |
| 5,667,459 A | 9/1997 | Su |
| 5,669,833 A | 9/1997 | Stone |
| 5,669,857 A | 9/1997 | Watterson et al. |
| 5,669,865 A | 9/1997 | Gordon |
| 5,672,140 A | 9/1997 | Watterson et al. |
| 5,674,156 A | 10/1997 | Watterson et al. |
| 5,674,453 A | 10/1997 | Watterson et al. |
| 5,676,624 A | 10/1997 | Watterson et al. |
| 5,679,047 A | 10/1997 | Engel |
| 5,679,101 A | 10/1997 | Magid |
| 5,683,331 A | 11/1997 | Dalebout |
| 5,683,332 A | 11/1997 | Watterson et al. |
| 5,685,804 A | 11/1997 | Whan-Tong et al. |
| 5,688,209 A | 11/1997 | Trulaske et al. |
| 5,688,216 A | 11/1997 | Mauriello |
| 5,690,582 A | 11/1997 | Ulrich et al. |
| 5,690,587 A | 11/1997 | Gruenangerl |
| 5,690,589 A | 11/1997 | Rodgers, Jr. |
| D387,825 S | 12/1997 | Fleck et al. |
| 5,692,994 A | 12/1997 | Eschenbach |
| 5,695,433 A | 12/1997 | Buisman |
| 5,695,434 A | 12/1997 | Dalebout et al. |
| 5,695,435 A | 12/1997 | Dalebout et al. |
| 5,695,436 A | 12/1997 | Huang |
| 5,702,325 A | 12/1997 | Watterson et al. |
| 5,704,879 A | 1/1998 | Watterson et al. |
| 5,707,319 A | 1/1998 | Riley |
| 5,708,355 A | 1/1998 | Schrey |
| 5,709,632 A | 1/1998 | Socwell |
| 5,709,633 A | 1/1998 | Sokol |
| 5,711,745 A | 1/1998 | Yang |
| 5,711,749 A | 1/1998 | Miller |
| 5,713,549 A | 2/1998 | Shieh |
| 5,713,821 A | 2/1998 | Nissen |
| 5,716,308 A | 2/1998 | Lee |
| 5,718,657 A | 2/1998 | Dalebout et al. |
| 5,718,660 A | 2/1998 | Chen |
| 5,720,200 A | 2/1998 | Anderson et al. |
| 5,720,474 A | 2/1998 | Sugiyama |
| 5,720,698 A | 2/1998 | Dalebout et al. |
| D392,006 S | 3/1998 | Dalebout et al. |
| 5,722,917 A | 3/1998 | Olschansky et al. |
| 5,722,920 A | 3/1998 | Bauer |
| 5,722,922 A | 3/1998 | Watterson et al. |
| 5,725,459 A | 3/1998 | Rexach |
| 5,730,236 A | 3/1998 | Miller et al. |
| 5,733,228 A | 3/1998 | Stevens |
| 5,733,229 A | 3/1998 | Dalebout et al. |
| 5,735,586 A | 4/1998 | Cheng |
| 5,735,773 A | 4/1998 | Vittone |
| 5,735,776 A | 4/1998 | Swezey |
| 5,738,612 A | 4/1998 | Tsuda |
| 5,741,205 A | 4/1998 | Doll et al. |
| 5,743,193 A | 4/1998 | Kakuta et al. |
| 5,743,832 A | 4/1998 | Sands et al. |
| 5,743,833 A | 4/1998 | Watterson et al. |
| 5,743,835 A | 4/1998 | Trotter |
| 5,746,682 A | 5/1998 | Hung |
| 5,749,372 A | 5/1998 | Allen |
| 5,749,787 A | 5/1998 | Jank |
| 5,749,807 A | 5/1998 | Webb |
| 5,749,809 A | 5/1998 | Lin |
| 5,749,813 A | 5/1998 | Domzalski |
| 5,752,879 A | 5/1998 | Berdut |
| 5,752,897 A | 5/1998 | Skowronski et al. |
| 5,755,642 A | 5/1998 | Miller |
| 5,755,645 A | 5/1998 | Miller et al. |
| 5,755,651 A | 5/1998 | Homyonfer |
| 5,759,136 A | 6/1998 | Chen |
| 5,760,353 A | 6/1998 | Rapp |
| 5,761,831 A | 6/1998 | Cho |
| 5,762,584 A | 6/1998 | Daniels |
| 5,762,587 A | 6/1998 | Dalebout et al. |
| 5,762,588 A | 6/1998 | Chen |
| 5,769,759 A | 6/1998 | Alter |
| 5,771,152 A | 6/1998 | Crompton et al. |
| 5,772,522 A | 6/1998 | Nesbit |
| 5,772,558 A | 6/1998 | Rodgers, Jr. |
| 5,772,560 A | 6/1998 | Watterson et al. |
| 5,776,582 A | 7/1998 | Needham |
| 5,779,599 A | 7/1998 | Chen |
| 5,779,607 A | 7/1998 | Harris |
| 5,782,639 A | 7/1998 | Beal |
| 5,782,723 A | 7/1998 | Kuo |
| 5,785,630 A | 7/1998 | Bobick et al. |
| 5,788,609 A | 8/1998 | Miller |
| 5,788,610 A | 8/1998 | Eschenbach |
| 5,788,611 A | 8/1998 | Kuo |
| 5,792,027 A | 8/1998 | Gvoich |
| 5,792,031 A | 8/1998 | Alton |
| 5,795,270 A | 8/1998 | Woods et al. |
| 5,797,578 A | 8/1998 | Graffeo |
| 5,803,874 A | 9/1998 | Wilkinson |
| 5,803,877 A | 9/1998 | Franey |
| 5,803,882 A | 9/1998 | Habing et al. |
| 5,807,210 A | 9/1998 | Devlin |
| 5,810,696 A | 9/1998 | Webb |
| 5,810,697 A | 9/1998 | Joiner |
| 5,810,698 A | 9/1998 | Hullett et al. |
| 5,813,142 A | 9/1998 | Demon |
| 5,813,947 A | 9/1998 | Densmore |
| 5,813,953 A | 9/1998 | Whipple |
| 5,816,981 A | 10/1998 | Hung |
| 5,820,478 A | 10/1998 | Wood et al. |
| 5,823,618 A | 10/1998 | Fox et al. |
| 5,827,155 A | 10/1998 | Jensen et al. |
| 5,827,158 A | 10/1998 | Drecksel |
| 5,830,107 A | 11/1998 | Brigliadoro |
| 5,830,113 A | 11/1998 | Coody et al. |
| 5,830,114 A | 11/1998 | Halfen et al. |
| 5,833,577 A | 11/1998 | Hurt |
| 5,833,583 A | 11/1998 | Chuang |
| 5,833,584 A | 11/1998 | Piaget et al. |
| 5,833,587 A | 11/1998 | Strong et al. |
| 5,836,770 A | 11/1998 | Powers |
| 5,839,990 A | 11/1998 | Virkkala |
| 5,839,993 A | 11/1998 | Fox |
| 5,842,961 A | 12/1998 | Davis |
| 5,846,166 A | 12/1998 | Kuo |
| 5,848,954 A | 12/1998 | Stearns et al. |

(56) References Cited

U.S. PATENT DOCUMENTS

| | | |
|---|---|---|
| 5,852,264 A | 12/1998 | Muller |
| 5,855,537 A | 1/1999 | Coody et al. |
| 5,855,538 A | 1/1999 | Argabright |
| 5,857,939 A | 1/1999 | Kaufman |
| 5,857,940 A | 1/1999 | Husted |
| 5,857,941 A | 1/1999 | Maresh |
| 5,857,943 A | 1/1999 | Murray |
| 5,860,893 A | 1/1999 | Watterson et al. |
| 5,860,894 A | 1/1999 | Dalebout et al. |
| 5,860,899 A | 1/1999 | Rassman |
| 5,865,710 A | 2/1999 | Wilson-Hyde |
| 5,868,108 A | 2/1999 | Schmitz et al. |
| 5,868,648 A | 2/1999 | Coody et al. |
| 5,871,421 A | 2/1999 | Trulaske et al. |
| 5,876,095 A | 3/1999 | Johnston |
| 5,879,271 A | 3/1999 | Stearns et al. |
| 5,879,273 A | 3/1999 | Wei |
| 5,879,276 A | 3/1999 | Miller |
| 5,882,281 A | 3/1999 | Stearns et al. |
| 5,885,197 A | 3/1999 | Barton |
| 5,888,172 A | 3/1999 | Andrus et al. |
| 5,890,562 A | 4/1999 | Bartels et al. |
| 5,890,995 A | 4/1999 | Bobick et al. |
| 5,891,001 A | 4/1999 | Carnes et al. |
| 5,891,003 A | 4/1999 | Deac et al. |
| 5,895,339 A | 4/1999 | Maresh |
| 5,895,340 A | 4/1999 | Keller |
| 5,897,457 A | 4/1999 | Mackovjak |
| 5,897,459 A | 4/1999 | Habing et al. |
| 5,897,460 A | 4/1999 | McBride et al. |
| 5,897,461 A | 4/1999 | Socwell |
| 5,899,833 A | 5/1999 | Ryan et al. |
| 5,899,834 A | 5/1999 | Dalebout et al. |
| 5,902,214 A | 5/1999 | Makikawa et al. |
| 5,904,398 A | 5/1999 | Farricielli |
| 5,904,636 A | 5/1999 | Chen |
| 5,906,269 A | 5/1999 | Zabron et al. |
| 5,906,564 A | 5/1999 | Jacobsen |
| 5,910,070 A | 6/1999 | Henry et al. |
| 5,910,072 A | 6/1999 | Rawls et al. |
| 5,911,132 A | 6/1999 | Sloane |
| 5,913,751 A | 6/1999 | Eschenbach |
| 5,916,064 A | 6/1999 | Eschenbach |
| 5,916,069 A | 6/1999 | Wang |
| 5,917,692 A | 6/1999 | Schmitz et al. |
| 5,919,118 A | 7/1999 | Stearns |
| 5,921,892 A | 7/1999 | Easton |
| 5,921,896 A | 7/1999 | Boland |
| 5,925,001 A | 7/1999 | Hoyt et al. |
| D412,953 S | 8/1999 | Armstrong |
| 5,938,551 A | 8/1999 | Warner |
| 5,938,565 A | 8/1999 | Bernacki |
| 5,938,570 A | 8/1999 | Maresh |
| 5,938,571 A | 8/1999 | Stevens |
| 5,938,575 A | 8/1999 | Stearns |
| 5,940,502 A | 8/1999 | Hirai et al. |
| 5,940,911 A | 8/1999 | Wang |
| 5,941,807 A | 8/1999 | Cassidy |
| 5,943,794 A | 8/1999 | Gelsomini |
| 5,944,641 A | 8/1999 | Habing |
| D413,948 S | 9/1999 | Dalebout |
| 5,947,869 A | 9/1999 | Shea |
| 5,947,872 A | 9/1999 | Ryan et al. |
| 5,951,441 A | 9/1999 | Dalebout |
| 5,951,444 A | 9/1999 | Webber |
| 5,951,447 A | 9/1999 | Butler |
| 5,951,448 A | 9/1999 | Bolland |
| 5,951,449 A | 9/1999 | Oppriecht |
| 5,957,814 A | 9/1999 | Eschenbach |
| 5,961,423 A | 10/1999 | Sellers |
| 5,961,430 A | 10/1999 | Zuckerman et al. |
| 5,967,944 A | 10/1999 | Vittone et al. |
| 5,967,954 A | 10/1999 | Habing |
| 5,967,955 A | 10/1999 | Westfall et al. |
| 5,971,902 A | 10/1999 | Robertson et al. |
| D416,596 S | 11/1999 | Armstrong |
| 5,976,039 A | 11/1999 | Epel et al. |
| 5,976,061 A | 11/1999 | Moon et al. |
| 5,980,430 A | 11/1999 | Wang |
| 5,980,432 A | 11/1999 | Ahman |
| 5,984,798 A | 11/1999 | Gilmour |
| 5,984,839 A | 11/1999 | Corkum |
| 5,989,161 A | 11/1999 | Wang et al. |
| 5,989,163 A | 11/1999 | Rodgers, Jr. |
| 5,989,168 A | 11/1999 | See |
| 5,991,143 A | 11/1999 | Wright et al. |
| 5,993,358 A | 11/1999 | Gureghian et al. |
| 5,993,359 A | 11/1999 | Eschenbach |
| 5,993,362 A | 11/1999 | Ghobadi |
| 5,997,447 A | 12/1999 | Giannelli et al. |
| 5,997,450 A | 12/1999 | Wilkinson |
| 6,003,166 A | 12/1999 | Hald et al. |
| 6,003,481 A | 12/1999 | Pischinger et al. |
| 6,004,244 A | 12/1999 | Simonson |
| 6,006,379 A | 12/1999 | Hensley |
| 6,010,432 A | 1/2000 | Vawter |
| 6,012,591 A | 1/2000 | Brandenberg |
| 6,012,772 A | 1/2000 | Conde et al. |
| 6,013,011 A | 1/2000 | Moore et al. |
| 6,015,367 A | 1/2000 | Scaramucci |
| 6,015,368 A | 1/2000 | Clem |
| 6,019,710 A | 2/2000 | Dalebout et al. |
| 6,027,429 A | 2/2000 | Daniels |
| 6,027,430 A | 2/2000 | Stearns et al. |
| 6,027,432 A | 2/2000 | Cheng |
| 6,029,858 A | 2/2000 | Srokose |
| 6,030,320 A | 2/2000 | Stearns |
| 6,030,321 A | 2/2000 | Fuentes |
| 6,030,323 A | 2/2000 | Fontenot |
| 6,033,344 A | 3/2000 | Trulaske et al. |
| 6,033,347 A | 3/2000 | Dalebout et al. |
| 6,033,350 A | 3/2000 | Krull |
| 6,036,622 A | 3/2000 | Gordon |
| 6,042,512 A | 3/2000 | Eschenbach |
| 6,042,514 A | 3/2000 | Abelbeck |
| 6,042,515 A | 3/2000 | Wang |
| 6,042,516 A | 3/2000 | Norton |
| 6,042,518 A | 3/2000 | Hildebrandt et al. |
| 6,042,523 A | 3/2000 | Graham |
| 6,045,487 A | 4/2000 | Miller |
| 6,045,488 A | 4/2000 | Eschenbach |
| 6,045,490 A | 4/2000 | Shafer |
| 6,045,491 A | 4/2000 | McNergney |
| 6,050,920 A | 4/2000 | Ehrenfried |
| 6,050,921 A | 4/2000 | Wang |
| 6,050,922 A | 4/2000 | Wang |
| 6,050,923 A | 4/2000 | Yu |
| 6,053,844 A | 4/2000 | Clem |
| 6,053,847 A | 4/2000 | Stearns et al. |
| 6,053,848 A | 4/2000 | Eschenbach |
| D425,940 S | 5/2000 | Halfen et al. |
| 6,055,747 A | 5/2000 | Lombardino |
| 6,056,678 A | 5/2000 | Giannelli et al. |
| 6,059,692 A | 5/2000 | Hickman |
| 6,059,695 A | 5/2000 | Hung |
| 6,063,009 A | 5/2000 | Stearns |
| 6,066,075 A | 5/2000 | Poulton |
| 6,068,578 A | 5/2000 | Wang |
| 6,068,579 A | 5/2000 | Killian et al. |
| 6,071,031 A | 6/2000 | Bailey |
| 6,071,216 A | 6/2000 | Giannelli et al. |
| 6,075,525 A | 6/2000 | Hsieh |
| 6,077,196 A | 6/2000 | Eschenbach |
| 6,077,198 A | 6/2000 | Eschenbach |
| 6,077,199 A | 6/2000 | Hsu |
| 6,077,200 A | 6/2000 | Lin |
| 6,080,091 A | 6/2000 | Habing et al. |
| 6,086,520 A | 7/2000 | Rodriquez |
| 6,090,014 A | 7/2000 | Eschenbach |
| 6,090,016 A | 7/2000 | Kuo |
| D428,949 S | 8/2000 | Halfen et al. |
| 6,095,951 A | 8/2000 | Skowronski et al. |
| 6,099,439 A | 8/2000 | Ryan et al. |
| 6,102,412 A | 8/2000 | Staffaroni |

(56) References Cited

U.S. PATENT DOCUMENTS

| | | |
|---|---|---|
| 6,102,832 A | 8/2000 | Tani |
| 6,110,076 A | 8/2000 | Hurt |
| 6,110,077 A | 8/2000 | Yu |
| 6,113,188 A | 9/2000 | Stewart et al. |
| 6,113,522 A | 9/2000 | Montgomery |
| 6,117,049 A | 9/2000 | Lowe |
| 6,120,421 A | 9/2000 | Kuo |
| 6,123,646 A | 9/2000 | Colassi |
| 6,123,647 A | 9/2000 | Mitchell |
| 6,123,648 A | 9/2000 | Stevens |
| 6,123,649 A | 9/2000 | Lee |
| 6,123,650 A | 9/2000 | Birrell |
| 6,125,851 A | 10/2000 | Walker et al. |
| 6,126,574 A | 10/2000 | Stearns et al. |
| 6,126,575 A | 10/2000 | Wang |
| 6,126,576 A | 10/2000 | Wang |
| 6,129,962 A | 10/2000 | Quigley et al. |
| 6,132,314 A | 10/2000 | Aiki |
| 6,132,340 A | 10/2000 | Wang |
| 6,135,924 A | 10/2000 | Gibbs et al. |
| 6,135,925 A | 10/2000 | Liu |
| 6,142,870 A | 11/2000 | Wada et al. |
| 6,142,913 A | 11/2000 | Ewert |
| 6,142,914 A | 11/2000 | Crawford et al. |
| 6,142,915 A | 11/2000 | Eschenbach |
| 6,146,313 A | 11/2000 | Whan-Tong et al. |
| 6,146,315 A | 11/2000 | Schonenberger |
| 6,149,551 A | 11/2000 | Pyles et al. |
| 6,149,552 A | 11/2000 | Chen |
| 6,152,856 A | 11/2000 | Studor et al. |
| 6,152,859 A | 11/2000 | Stearns |
| 6,162,183 A | 12/2000 | Hoover |
| 6,163,451 A | 12/2000 | Chiu |
| 6,165,107 A | 12/2000 | Birrell |
| 6,168,551 B1 | 1/2001 | McGuinness |
| 6,171,216 B1 | 1/2001 | Wang |
| 6,171,217 B1 | 1/2001 | Cutler |
| 6,171,219 B1 | 1/2001 | Simonson |
| 6,174,267 B1 | 1/2001 | Dalebout |
| 6,174,268 B1 | 1/2001 | Novak |
| 6,176,814 B1 | 1/2001 | Ryan et al. |
| 6,179,753 B1 | 1/2001 | Barker et al. |
| 6,181,647 B1 | 1/2001 | Tipton |
| 6,183,397 B1 | 2/2001 | Stearns et al. |
| 6,186,290 B1 | 2/2001 | Carlson |
| 6,186,460 B1 | 2/2001 | Lin |
| 6,186,929 B1 | 2/2001 | Endelman et al. |
| 6,189,846 B1 | 2/2001 | Wang |
| 6,190,289 B1 | 2/2001 | Pyles et al. |
| 6,193,631 B1 | 2/2001 | Hickman |
| 6,193,635 B1 | 2/2001 | Webber et al. |
| 6,203,474 B1 | 3/2001 | Jones |
| 6,206,795 B1 | 3/2001 | Ou |
| 6,210,305 B1 | 4/2001 | Eschenbach |
| 6,213,919 B1 | 4/2001 | Wang |
| 6,215,870 B1 | 4/2001 | Hirai et al. |
| 6,217,487 B1 | 4/2001 | Reinert |
| 6,220,990 B1 | 4/2001 | Crivello |
| 6,220,995 B1 | 4/2001 | Chen |
| 6,224,516 B1 | 5/2001 | Disch |
| 6,224,519 B1 | 5/2001 | Doolittle |
| 6,228,003 B1 | 5/2001 | Hald et al. |
| 6,230,047 B1 | 5/2001 | McHugh |
| 6,230,460 B1 | 5/2001 | Huyett |
| 6,231,482 B1 | 5/2001 | Thompson |
| 6,231,946 B1 | 5/2001 | Brown, Jr. et al. |
| 6,234,935 B1 | 5/2001 | Chu |
| 6,234,936 B1 | 5/2001 | Wang |
| 6,237,583 B1 | 5/2001 | Ripley et al. |
| 6,238,323 B1 | 5/2001 | Simonson |
| 6,241,638 B1 | 6/2001 | Hurt |
| 6,244,988 B1 | 6/2001 | Delman |
| 6,244,992 B1 | 6/2001 | James |
| 6,245,001 B1 | 6/2001 | Siaperas |
| 6,251,047 B1 | 6/2001 | Stearns et al. |
| 6,251,048 B1 | 6/2001 | Kaufman |
| 6,251,052 B1 | 6/2001 | Simonson |
| 6,254,514 B1 | 7/2001 | Maresh et al. |
| 6,254,515 B1 | 7/2001 | Carman et al. |
| 6,261,022 B1 | 7/2001 | Dalebout et al. |
| 6,261,209 B1 | 7/2001 | Coody |
| 6,264,586 B1 | 7/2001 | Webber |
| 6,267,710 B1 | 7/2001 | Liu |
| 6,273,842 B1 | 8/2001 | Wang |
| 6,273,843 B1 | 8/2001 | Lo |
| 6,276,749 B1 | 8/2001 | Okazawa et al. |
| 6,277,054 B1 | 8/2001 | Kuo |
| 6,277,056 B1 | 8/2001 | McBride et al. |
| 6,280,361 B1 | 8/2001 | Harvey et al. |
| 6,280,362 B1 | 8/2001 | Dalebout et al. |
| 6,280,367 B1 | 8/2001 | Arsenault |
| 6,282,816 B1 | 9/2001 | Rosendahl |
| 6,283,896 B1 | 9/2001 | Grunfeld |
| 6,287,240 B1 | 9/2001 | Trabbic |
| 6,293,375 B1 | 9/2001 | Chen |
| 6,296,594 B1 | 10/2001 | Simonson |
| 6,299,959 B1 | 10/2001 | Squires et al. |
| 6,302,815 B1 | 10/2001 | Shishido et al. |
| 6,302,826 B1 | 10/2001 | Lee |
| 6,302,828 B1 | 10/2001 | Martin et al. |
| 6,302,829 B1 | 10/2001 | Schmidt |
| 6,302,830 B1 | 10/2001 | Stearns |
| 6,302,833 B1 | 10/2001 | Ellis et al. |
| 6,306,108 B1 | 10/2001 | Butler |
| 6,307,167 B1 | 10/2001 | Kajio et al. |
| D450,872 S | 11/2001 | Dalebout et al. |
| 6,312,363 B1 | 11/2001 | Watterson et al. |
| 6,314,667 B1 | 11/2001 | Rife et al. |
| 6,315,486 B1 | 11/2001 | Lunz |
| 6,322,059 B1 | 11/2001 | Kelm et al. |
| 6,322,481 B1 | 11/2001 | Krull |
| D452,338 S | 12/2001 | Dalebout et al. |
| 6,325,745 B1 | 12/2001 | Yu |
| 6,325,746 B1 | 12/2001 | Wang |
| 6,328,676 B1 | 12/2001 | Alessandri |
| 6,328,677 B1 | 12/2001 | Drapeau |
| 6,334,624 B1 | 1/2002 | Giglio |
| D453,543 S | 2/2002 | Cutler |
| D453,948 S | 2/2002 | Cutler |
| 6,344,986 B1 | 2/2002 | Jain et al. |
| 6,347,603 B1 | 2/2002 | Felger |
| 6,348,028 B1 | 2/2002 | Cragg |
| 6,350,218 B1 | 2/2002 | Dalebout et al. |
| 6,352,494 B2 | 3/2002 | McAlonan |
| 6,357,077 B1 | 3/2002 | Jones, Jr. et al. |
| 6,359,355 B1 * | 3/2002 | Hartsfield ............... H02K 1/148 310/254.1 |
| 6,361,476 B1 | 3/2002 | Eschenbach |
| 6,368,252 B1 | 4/2002 | Stearns |
| 6,368,254 B1 | 4/2002 | Wall |
| 6,371,738 B2 | 4/2002 | Jones |
| 6,371,895 B1 | 4/2002 | Endelman et al. |
| 6,375,580 B1 | 4/2002 | Schmidt |
| 6,379,289 B1 | 4/2002 | Gossie |
| 6,382,627 B1 | 5/2002 | Lundberg |
| 6,383,120 B1 | 5/2002 | Lo |
| 6,387,015 B1 | 5/2002 | Watson |
| 6,387,016 B1 | 5/2002 | Lo |
| 6,387,020 B1 | 5/2002 | Simonson |
| 6,390,953 B1 | 5/2002 | Maresh |
| 6,390,955 B1 | 5/2002 | Wang |
| 6,394,239 B1 | 5/2002 | Carlson |
| 6,397,797 B1 | 6/2002 | Kolmanovsky et al. |
| 6,398,695 B2 | 6/2002 | Miller |
| 6,402,666 B2 | 6/2002 | Krull |
| 6,404,086 B1 | 6/2002 | Fukasaku |
| 6,409,632 B1 | 6/2002 | Eschenbach |
| 6,409,633 B1 | 6/2002 | Abelbeck |
| 6,413,191 B1 | 7/2002 | Harris et al. |
| 6,413,197 B2 | 7/2002 | McKechnie et al. |
| 6,416,442 B1 | 7/2002 | Stearns et al. |
| 6,416,444 B1 | 7/2002 | Lim |
| 6,419,611 B1 | 7/2002 | Levine et al. |
| 6,422,976 B1 | 7/2002 | Eschenbach |

(56) References Cited

U.S. PATENT DOCUMENTS

| | | |
|---|---|---|
| 6,422,977 B1 | 7/2002 | Eschenbach |
| 6,422,980 B1 | 7/2002 | Simonson |
| 6,422,983 B1 | 7/2002 | Weck |
| 6,428,449 B1 | 8/2002 | Apseloff |
| 6,430,997 B1 | 8/2002 | French et al. |
| 6,432,026 B1 | 8/2002 | Wang |
| 6,435,466 B1 | 8/2002 | Adams |
| 6,436,007 B1 | 8/2002 | Eschenbach |
| 6,436,008 B1 | 8/2002 | Skowronski et al. |
| 6,440,013 B1 | 8/2002 | Brown |
| 6,440,042 B2 | 8/2002 | Eschenbach |
| 6,443,875 B1 | 9/2002 | Golen, Jr. et al. |
| 6,447,424 B1 | 9/2002 | Ashby et al. |
| 6,447,430 B1 | 9/2002 | Webb et al. |
| 6,450,284 B1 | 9/2002 | Sakyo et al. |
| 6,450,922 B1 | 9/2002 | Henderson et al. |
| 6,450,923 B1 | 9/2002 | Vatti |
| 6,450,925 B1 | 9/2002 | Kuo |
| 6,454,679 B1 | 9/2002 | Radow |
| 6,454,682 B1 | 9/2002 | Kuo |
| 6,455,960 B1 | 9/2002 | Trago et al. |
| 6,458,060 B1 | 10/2002 | Watterson et al. |
| 6,458,061 B2 | 10/2002 | Simonson |
| 6,461,275 B1 | 10/2002 | Wang et al. |
| 6,461,279 B1 | 10/2002 | Kuo |
| 6,466,460 B1 | 10/2002 | Rein et al. |
| 6,468,189 B2 | 10/2002 | Alessandri |
| 6,471,622 B1 | 10/2002 | Hammer et al. |
| 6,475,121 B2 | 11/2002 | Wang |
| 6,478,721 B1 | 11/2002 | Hunter |
| 6,482,128 B1 | 11/2002 | Michalow |
| 6,482,130 B1 | 11/2002 | Pasero et al. |
| 6,482,132 B2 | 11/2002 | Eschenbach |
| 6,485,397 B1 | 11/2002 | Manderbacka |
| 6,488,020 B1 | 12/2002 | Rosas-Magallan |
| 6,491,610 B1 | 12/2002 | Henn |
| 6,494,814 B1 | 12/2002 | Wang |
| 6,494,817 B2 | 12/2002 | Lake |
| 6,500,097 B1 | 12/2002 | Hall |
| 6,503,173 B2 | 1/2003 | Clem |
| 6,505,503 B1 | 1/2003 | Teresi et al. |
| 6,513,669 B2 | 2/2003 | Ozawa et al. |
| 6,514,180 B1 | 2/2003 | Rawls |
| 6,520,891 B1 | 2/2003 | Stephens, Jr. |
| 6,527,674 B1 | 3/2003 | Clem |
| 6,527,678 B1 | 3/2003 | Wang |
| 6,527,685 B2 | 3/2003 | Endelman et al. |
| 6,527,796 B1 | 3/2003 | Magovern |
| 6,530,864 B1 | 3/2003 | Parks |
| 6,533,707 B2 | 3/2003 | Wang |
| 6,537,184 B2 | 3/2003 | Kim |
| 6,539,931 B2 | 4/2003 | Trajkovic et al. |
| 6,543,247 B2 | 4/2003 | Strauss |
| 6,544,146 B2 | 4/2003 | Stearns et al. |
| 6,547,701 B1 | 4/2003 | Eschenbach |
| 6,547,702 B1 | 4/2003 | Heidecke |
| 6,551,218 B2 | 4/2003 | Goh |
| 6,551,223 B2 | 4/2003 | Cheng |
| 6,554,749 B2 | 4/2003 | Iund et al. |
| 6,558,299 B1 | 5/2003 | Slattery |
| 6,558,301 B1 | 5/2003 | Jackson |
| 6,561,960 B2 | 5/2003 | Webber |
| 6,563,225 B2 | 5/2003 | Soga et al. |
| 6,563,489 B1 | 5/2003 | Latypov et al. |
| 6,569,061 B2 | 5/2003 | Stearns et al. |
| 6,569,062 B2 | 5/2003 | Wang |
| 6,572,511 B1 | 6/2003 | Volpe |
| 6,572,512 B2 | 6/2003 | Anderson et al. |
| 6,572,513 B2 | 6/2003 | Whan-Tong et al. |
| 6,575,878 B1 | 6/2003 | Choy |
| 6,579,210 B1 | 6/2003 | Stearns et al. |
| 6,582,342 B2 | 6/2003 | Kaufman |
| 6,582,344 B2 | 6/2003 | Tang |
| 6,585,624 B1 | 7/2003 | Chen |
| 6,585,626 B2 | 7/2003 | McBride |
| 6,589,138 B2 | 7/2003 | Dyer et al. |
| 6,592,502 B1 | 7/2003 | Phillips |
| 6,599,223 B2 | 7/2003 | Wang |
| 6,601,016 B1 | 7/2003 | Brown et al. |
| 6,601,358 B2 | 8/2003 | Panatta |
| 6,601,825 B2 | 8/2003 | Bressner et al. |
| 6,604,008 B2 | 8/2003 | Chudley et al. |
| 6,605,020 B1 | 8/2003 | Huang |
| 6,609,478 B2 | 8/2003 | Del Valle |
| 6,610,063 B2 | 8/2003 | Kumar et al. |
| 6,612,969 B2 | 9/2003 | Eschenbach |
| 6,612,971 B1 | 9/2003 | Morris |
| 6,619,681 B2 | 9/2003 | Gutierrez |
| 6,620,079 B2 | 9/2003 | Kuo |
| 6,623,140 B2 | 9/2003 | Watterson |
| 6,623,407 B2 | 9/2003 | Novak |
| 6,623,409 B1 | 9/2003 | Abelbeck |
| 6,626,799 B2 | 9/2003 | Watterson et al. |
| 6,626,802 B1 | 9/2003 | Rodgers, Jr. |
| 6,626,803 B1 | 9/2003 | Oglesby et al. |
| 6,629,902 B2 | 10/2003 | Murphy et al. |
| 6,629,909 B1 | 10/2003 | Stearns et al. |
| 6,629,910 B1 | 10/2003 | Krull |
| 6,632,161 B1 | 10/2003 | Nir |
| 6,634,996 B2 | 10/2003 | Jacobsen |
| 6,637,811 B2 | 10/2003 | Zheng |
| 6,637,818 B2 | 10/2003 | Williams |
| 6,645,125 B1 | 11/2003 | Stearns et al. |
| 6,645,126 B1 | 11/2003 | Martin et al. |
| 6,645,130 B2 | 11/2003 | Webber |
| 6,648,800 B2 | 11/2003 | Stearns et al. |
| 6,648,801 B2 | 11/2003 | Stearns et al. |
| 6,648,802 B2 | 11/2003 | Ware |
| 6,652,424 B2 | 11/2003 | Dalebout |
| 6,652,425 B1 | 11/2003 | Martin et al. |
| 6,652,429 B2 | 11/2003 | Bushnell |
| 6,660,949 B2 | 12/2003 | Kamino et al. |
| 6,661,136 B1 | 12/2003 | Lee |
| 6,663,127 B2 | 12/2003 | Miller |
| 6,663,498 B2 | 12/2003 | Stipan |
| 6,663,500 B2 | 12/2003 | Huang |
| 6,666,800 B2 | 12/2003 | Krull |
| 6,666,801 B1 | 12/2003 | Michalow |
| 6,668,678 B1 | 12/2003 | Baba et al. |
| 6,669,600 B2 | 12/2003 | Warner |
| 6,669,609 B2 | 12/2003 | Gerschefske et al. |
| 6,671,975 B2 | 1/2004 | Hennessey |
| 6,672,991 B2 | 1/2004 | O'Malley |
| 6,672,992 B1 | 1/2004 | Lo et al. |
| 6,672,994 B1 | 1/2004 | Stearns et al. |
| 6,676,530 B2 | 1/2004 | Lochtefeld |
| 6,676,572 B2 | 1/2004 | Wang |
| 6,676,579 B1 | 1/2004 | Lin |
| 6,679,816 B1 | 1/2004 | Krull |
| 6,679,820 B2 | 1/2004 | Barkus et al. |
| 6,681,704 B1 | 1/2004 | Brookhiser |
| 6,681,728 B2 | 1/2004 | Haghgooie |
| 6,682,460 B2 | 1/2004 | Lo |
| 6,682,461 B2 | 1/2004 | Wang |
| 6,685,601 B1 | 2/2004 | Knapp |
| 6,685,602 B2 | 2/2004 | Colosky, Jr. et al. |
| 6,685,607 B1 | 2/2004 | Olson |
| 6,689,019 B2 | 2/2004 | Ohrt et al. |
| 6,695,581 B2 | 2/2004 | Wasson et al. |
| 6,695,694 B2 | 2/2004 | Ishikawa et al. |
| 6,698,110 B1 | 3/2004 | Robbins |
| 6,699,159 B2 | 3/2004 | Rouse |
| 6,699,162 B2 | 3/2004 | Chen |
| 6,701,271 B2 | 3/2004 | Willner et al. |
| 6,702,719 B1 | 3/2004 | Brown et al. |
| 6,705,977 B1 | 3/2004 | Ziak |
| 6,708,427 B2 | 3/2004 | Sussmann et al. |
| 6,712,737 B1 | 3/2004 | Nusbaum |
| 6,712,740 B2 | 3/2004 | Simonson |
| 6,716,142 B2 | 4/2004 | Kuo |
| 6,716,144 B1 | 4/2004 | Shifferaw |
| 6,719,667 B2 | 4/2004 | Wong et al. |
| 6,719,669 B1 | 4/2004 | Wang |
| 6,723,413 B2 | 4/2004 | Walters |

(56) References Cited

U.S. PATENT DOCUMENTS

| | | | |
|---|---|---|---|
| 6,726,600 B2 | 4/2004 | Miller |
| 6,726,601 B1 | 4/2004 | Beutel |
| 6,726,602 B2 | 4/2004 | Chang |
| 6,730,002 B2 | 5/2004 | Hald et al. |
| 6,733,423 B1 | 5/2004 | Chang |
| 6,733,424 B2 | 5/2004 | Krull |
| 6,736,360 B1 | 5/2004 | Buczek |
| 6,738,274 B2 | 5/2004 | Prasad et al. |
| 6,740,009 B1 | 5/2004 | Hall |
| 6,741,052 B2 | 5/2004 | Fitzgibbon |
| 6,743,153 B2 | 6/2004 | Watterson et al. |
| 6,746,371 B1 | 6/2004 | Brown et al. |
| 6,747,427 B1 | 6/2004 | Carson |
| 6,749,537 B1 | 6/2004 | Hickman |
| 6,749,540 B1 | 6/2004 | Pasero et al. |
| 6,749,542 B2 | 6/2004 | Wu |
| 6,758,790 B1 | 7/2004 | Ellis |
| 6,758,791 B1 | 7/2004 | Kuo |
| 6,758,792 B1 | 7/2004 | Chang |
| 6,761,387 B2 | 7/2004 | Sloss |
| 6,761,667 B1 | 7/2004 | Cutler et al. |
| 6,764,429 B1 | 7/2004 | Michalow |
| 6,764,430 B1 | 7/2004 | Fencel |
| 6,764,431 B2 | 7/2004 | Yoss |
| 6,765,726 B2 | 7/2004 | French et al. |
| 6,767,314 B2 | 7/2004 | Thompson |
| 6,770,015 B2 | 8/2004 | Simonson |
| 6,776,740 B1 | 8/2004 | Anderson et al. |
| 6,778,938 B1 | 8/2004 | Ng et al. |
| 6,783,482 B2 | 8/2004 | Oglesby et al. |
| 6,786,821 B2 | 9/2004 | Nobe et al. |
| 6,786,847 B1 | 9/2004 | Morgan et al. |
| 6,786,848 B2 | 9/2004 | Yamashita et al. |
| 6,786,850 B2 | 9/2004 | Nizamuddin |
| 6,786,852 B2 | 9/2004 | Watterson et al. |
| 6,790,162 B1 | 9/2004 | Ellis et al. |
| 6,793,607 B2 | 9/2004 | Neil |
| 6,793,609 B1 | 9/2004 | Fan |
| 6,796,159 B2 | 9/2004 | Kelm et al. |
| 6,796,927 B2 | 9/2004 | Toyama |
| 6,808,458 B1 | 10/2004 | Jung |
| 6,808,472 B1 | 10/2004 | Hickman |
| 6,808,475 B2 | 10/2004 | Kehrbaum |
| 6,811,519 B2 | 11/2004 | Kuo |
| 6,811,520 B2 | 11/2004 | Wu |
| 6,817,117 B1 | 11/2004 | Campbell |
| 6,817,968 B2 | 11/2004 | Galbraith et al. |
| 6,821,230 B2 | 11/2004 | Dalebout et al. |
| 6,824,210 B2 | 11/2004 | Zheng |
| 6,824,502 B1 | 11/2004 | Huang |
| 6,830,540 B2 | 12/2004 | Watterson |
| 6,830,541 B2 | 12/2004 | Wu |
| 6,835,166 B1 | 12/2004 | Stearns et al. |
| 6,837,829 B2 | 1/2005 | Eschenbach |
| 6,837,830 B2 | 1/2005 | Eldridge |
| 6,837,838 B2 | 1/2005 | List |
| 6,840,892 B1 | 1/2005 | Wu |
| 6,842,928 B2 | 1/2005 | Yang et al. |
| 6,843,732 B1 | 1/2005 | Huang |
| 6,846,272 B2 | 1/2005 | Rosenow et al. |
| 6,849,032 B2 | 2/2005 | Chu |
| 6,852,068 B2 | 2/2005 | Ogawa |
| 6,855,093 B2 | 2/2005 | Anderson et al. |
| 6,855,097 B2 | 2/2005 | Krull |
| 6,857,993 B2 | 2/2005 | Yeh |
| 6,860,836 B1 | 3/2005 | Wu |
| 6,860,839 B1 | 3/2005 | Dice |
| 6,863,641 B1 | 3/2005 | Brown et al. |
| 6,866,613 B1 | 3/2005 | Brown et al. |
| 6,872,168 B2 | 3/2005 | Wang et al. |
| 6,872,175 B2 | 3/2005 | Lin |
| 6,875,157 B1 | 4/2005 | Wang |
| 6,875,160 B2 | 4/2005 | Watterson et al. |
| 6,878,101 B2 | 4/2005 | Colley |
| 6,880,487 B2 | 4/2005 | Reinkensmeyer et al. |
| 6,881,176 B2 | 4/2005 | Oishi et al. |
| 6,887,185 B1 | 5/2005 | Kuo |
| 6,887,190 B1 | 5/2005 | Azari |
| 6,893,383 B1 | 5/2005 | Chang et al. |
| 6,896,645 B1 | 5/2005 | Krull |
| 6,899,657 B2 | 5/2005 | Chuang |
| 6,899,659 B2 | 5/2005 | Anderson et al. |
| 6,902,513 B1 | 6/2005 | McClure |
| 6,902,515 B2 | 6/2005 | Howell et al. |
| 6,905,446 B2 | 6/2005 | Greenland |
| 6,908,416 B2 | 6/2005 | Mercado et al. |
| 6,908,417 B2 | 6/2005 | Jackson |
| D507,311 S | 7/2005 | Butler et al. |
| 6,913,562 B2 | 7/2005 | Chen |
| 6,913,563 B2 | 7/2005 | Chen |
| 6,916,278 B2 | 7/2005 | Webber |
| 6,918,858 B2 | 7/2005 | Watterson et al. |
| 6,918,859 B1 | 7/2005 | Yeh |
| 6,918,860 B1 | 7/2005 | Nusbaum |
| 6,921,351 B1 | 7/2005 | Hickman et al. |
| 6,921,354 B1 | 7/2005 | Shifferaw |
| 6,921,355 B2 | 7/2005 | Campanaro et al. |
| 6,923,746 B1 | 8/2005 | Skowronski et al. |
| 6,923,747 B1 | 8/2005 | Chu |
| 6,926,644 B2 | 8/2005 | Chen |
| 6,926,646 B1 | 8/2005 | Nguyen |
| 6,932,745 B1 | 8/2005 | Ellis |
| 6,939,271 B1 | 9/2005 | Whan-Tong et al. |
| 6,944,294 B2 | 9/2005 | Tsay |
| 6,945,912 B2 | 9/2005 | Levi |
| 6,945,917 B1 | 9/2005 | Baatz |
| 6,949,053 B1 | 9/2005 | Stearns |
| 6,949,054 B1 | 9/2005 | Stearns |
| 6,953,418 B2 | 10/2005 | Chen |
| 6,964,632 B1 | 11/2005 | Ko |
| 6,966,872 B2 | 11/2005 | Eschenbach |
| 6,974,404 B1 | 12/2005 | Watterson et al. |
| 6,976,698 B2 | 12/2005 | Kuiken |
| 6,979,283 B2 | 12/2005 | Pan |
| 6,991,588 B1 | 1/2006 | Adams |
| 6,994,306 B1 | 2/2006 | Sweere et al. |
| 6,994,657 B1 | 2/2006 | Eschenbach |
| 6,997,852 B2 | 2/2006 | Watterson et al. |
| 6,997,856 B1 | 2/2006 | Krull |
| 7,001,288 B2 | 2/2006 | Harrell |
| 7,003,122 B2 | 2/2006 | Chen |
| 7,004,271 B1 | 2/2006 | Kamen et al. |
| 7,004,887 B2 | 2/2006 | Pan et al. |
| 7,004,888 B1 | 2/2006 | Weng |
| 7,004,895 B2 | 2/2006 | Perry |
| 7,008,359 B2 | 3/2006 | Fan et al. |
| 7,011,326 B1 | 3/2006 | Schroeder et al. |
| 7,011,607 B2 | 3/2006 | Kolda et al. |
| 7,011,609 B1 | 3/2006 | Kuo |
| 7,022,047 B2 | 4/2006 | Cohen et al. |
| 7,022,048 B1 | 4/2006 | Fernandez |
| 7,022,049 B2 | 4/2006 | Ryan et al. |
| 7,022,051 B2 | 4/2006 | Ota |
| 7,025,713 B2 | 4/2006 | Dalebout |
| 7,032,870 B2 | 4/2006 | Sweere et al. |
| 7,033,176 B2 | 4/2006 | Feldman |
| 7,033,306 B2 | 4/2006 | Graber |
| D520,085 S | 5/2006 | Willardson et al. |
| 7,039,263 B2 | 5/2006 | Towle |
| 7,041,034 B1 | 5/2006 | Stearns et al. |
| 7,041,038 B2 | 5/2006 | Smith |
| 7,041,041 B1 | 5/2006 | Evans |
| 7,044,891 B1 | 5/2006 | Rivera |
| 7,044,897 B2 | 5/2006 | Myers et al. |
| 7,052,426 B2 | 5/2006 | Battat et al. |
| 7,052,440 B2 | 5/2006 | Pyles et al. |
| 7,052,442 B2 | 5/2006 | Watterson |
| 7,052,444 B2 | 5/2006 | Webber |
| 7,052,446 B2 | 5/2006 | Morris et al. |
| 7,055,899 B2 | 6/2006 | Zhurong et al. |
| 7,060,005 B2 | 6/2006 | Carlsen et al. |
| 7,060,006 B1 | 6/2006 | Watterson et al. |
| 7,060,008 B2 | 6/2006 | Watterson et al. |
| 7,070,539 B2 | 7/2006 | Brown et al. |

(56) References Cited

U.S. PATENT DOCUMENTS

| | | |
|---|---|---|
| 7,070,542 B2 | 7/2006 | Reyes et al. |
| 7,070,545 B2 | 7/2006 | Lull et al. |
| 7,073,852 B1 | 7/2006 | Zheng |
| 7,077,788 B2 | 7/2006 | Chang |
| 7,077,791 B2 | 7/2006 | Krull |
| 7,081,073 B1 | 7/2006 | Smith |
| 7,082,703 B2 | 8/2006 | Greene et al. |
| 7,086,994 B2 | 8/2006 | Turak et al. |
| 7,090,621 B2 | 8/2006 | Loane |
| 7,090,622 B2 | 8/2006 | Hetrick |
| 7,097,588 B2 | 8/2006 | Watterson |
| 7,097,591 B2 | 8/2006 | Moon |
| 7,097,593 B2 | 8/2006 | Chang |
| D527,776 S | 9/2006 | Willardson et al. |
| 7,100,517 B1 | 9/2006 | Godwin |
| 7,101,319 B1 | 9/2006 | Potts |
| 7,101,322 B2 | 9/2006 | Carle |
| 7,101,330 B2 | 9/2006 | Elbaz et al. |
| 7,104,926 B2 | 9/2006 | Carlson |
| 7,104,937 B2 | 9/2006 | Arbuckle |
| 7,108,641 B2 | 9/2006 | Pertegaz-Esteban |
| 7,108,659 B2 | 9/2006 | Ross et al. |
| 7,112,168 B2 | 9/2006 | Dalebout et al. |
| 7,115,073 B2 | 10/2006 | Nizamuddin |
| 7,125,371 B2 | 10/2006 | Henderson |
| 7,128,693 B2 | 10/2006 | Brown et al. |
| 7,132,939 B2 | 11/2006 | Tyndall et al. |
| 7,140,626 B1 | 11/2006 | Keay |
| 7,141,008 B2 | 11/2006 | Krull et al. |
| 7,156,776 B2 | 1/2007 | Maser |
| 7,163,493 B1 | 1/2007 | Kuo |
| 7,163,498 B1 | 1/2007 | Abelbeck |
| 7,163,500 B2 | 1/2007 | Endelman et al. |
| 7,166,062 B1 | 1/2007 | Watterson et al. |
| 7,166,064 B2 | 1/2007 | Watterson et al. |
| 7,166,067 B2 | 1/2007 | Talish et al. |
| 7,168,668 B2 | 1/2007 | Coyle |
| 7,169,087 B2 | 1/2007 | Ercanbrack et al. |
| 7,169,088 B2 | 1/2007 | Rodgers, Jr. |
| 7,169,093 B2 | 1/2007 | Simonson et al. |
| 7,172,531 B2 | 2/2007 | Rodgers, Jr. |
| 7,175,193 B2 | 2/2007 | Wu |
| 7,179,207 B2 | 2/2007 | Gerschefske |
| 7,179,208 B1 | 2/2007 | Nalley |
| 7,179,209 B2 | 2/2007 | Sechrest et al. |
| 7,186,189 B2 | 3/2007 | Huang |
| 7,192,387 B2 | 3/2007 | Mendel |
| 7,192,388 B2 | 3/2007 | Dalebout et al. |
| 7,195,568 B2 | 3/2007 | Huang |
| 7,201,705 B2 | 4/2007 | Rodgers, Jr. |
| 7,201,707 B1 | 4/2007 | Moon |
| 7,204,328 B2 | 4/2007 | LoPresti |
| 7,211,029 B2 | 5/2007 | Kau |
| 7,217,224 B2 | 5/2007 | Thomas |
| 7,217,225 B2 | 5/2007 | Husted et al. |
| 7,220,219 B2 | 5/2007 | Papadopoulos et al. |
| 7,220,221 B2 | 5/2007 | Mosimann et al. |
| 7,223,209 B2 | 5/2007 | Lee |
| 7,223,216 B1 | 5/2007 | McBride |
| 7,225,694 B2 | 6/2007 | Said |
| 7,226,402 B1 | 6/2007 | Joya |
| 7,235,942 B2 | 6/2007 | Nagaoka et al. |
| 7,238,147 B2 | 7/2007 | Mills et al. |
| 7,247,128 B2 | 7/2007 | Oga |
| 7,250,022 B2 | 7/2007 | Dalebout |
| 7,257,468 B1 | 8/2007 | Costa et al. |
| 7,258,651 B2 | 8/2007 | Clarke |
| 7,264,554 B2 | 9/2007 | Bentley |
| 7,269,038 B2 | 9/2007 | Shekhawat |
| 7,278,934 B2 | 10/2007 | McBride et al. |
| 7,278,955 B2 | 10/2007 | Giannelli et al. |
| 7,278,966 B2 | 10/2007 | Hjelt et al. |
| 7,279,868 B2 | 10/2007 | Lanni |
| 7,282,016 B2 | 10/2007 | Simonson |
| 7,285,075 B2 | 10/2007 | Cutler et al. |
| 7,285,885 B2 | 10/2007 | Agematsu |
| 7,287,770 B2 | 10/2007 | Drabant et al. |
| 7,290,760 B1 | 11/2007 | Lindsay |
| 7,291,096 B2 | 11/2007 | Ho |
| 7,292,151 B2 | 11/2007 | Ferguson |
| 7,293,510 B1 | 11/2007 | Siao |
| 7,294,094 B1 | 11/2007 | Howle |
| 7,294,100 B2 | 11/2007 | Bull |
| 7,303,508 B2 | 12/2007 | Toyama et al. |
| 7,303,510 B2 | 12/2007 | Gebhardt |
| 7,311,640 B2 | 12/2007 | Baatz |
| 7,316,633 B2 | 1/2008 | Liao et al. |
| 7,319,457 B2 | 1/2008 | Lin et al. |
| 7,322,907 B2 | 1/2008 | Bowser |
| 7,334,350 B2 | 2/2008 | Ellis, III |
| 7,335,139 B2 | 2/2008 | Bartholomew et al. |
| 7,335,140 B2 | 2/2008 | Webber et al. |
| 7,335,147 B2 | 2/2008 | Jones |
| 7,344,481 B2 | 3/2008 | Watterson et al. |
| 7,346,935 B1 | 3/2008 | Patterson |
| 7,347,806 B2 | 3/2008 | Nakano et al. |
| 7,351,187 B2 | 4/2008 | Seliber |
| 7,352,365 B2 | 4/2008 | Trachte |
| 7,354,380 B2 | 4/2008 | Volpe, Jr. |
| 7,357,756 B2 | 4/2008 | Demas |
| 7,357,758 B2 | 4/2008 | Polk, III et al. |
| 7,359,121 B2 | 4/2008 | French et al. |
| 7,361,125 B2 | 4/2008 | Webber et al. |
| 7,364,538 B2 | 4/2008 | Aucamp |
| 7,366,921 B2 | 4/2008 | Ranganathan |
| 7,367,926 B2 | 5/2008 | Clark |
| 7,369,121 B2 | 5/2008 | Lane |
| 7,374,522 B2 | 5/2008 | Arnold |
| 7,377,881 B2 | 5/2008 | Moon |
| 7,377,882 B2 | 5/2008 | Watterson |
| 7,384,013 B2 | 6/2008 | Yen |
| 7,393,308 B1 | 7/2008 | Huang |
| 7,402,145 B1 | 7/2008 | Woggon |
| 7,413,532 B1 | 8/2008 | Monsrud et al. |
| 7,425,188 B2 | 9/2008 | Ercanbrack |
| 7,425,189 B1 | 9/2008 | Eschenbach |
| 7,428,760 B2 | 9/2008 | McCrimmon |
| 7,429,236 B2 | 9/2008 | Dalebout et al. |
| 7,432,677 B2 | 10/2008 | Heydt et al. |
| 7,435,202 B2 | 10/2008 | Daly et al. |
| 7,435,205 B2 | 10/2008 | Reyes et al. |
| 7,455,621 B1 | 11/2008 | Anthony |
| 7,455,622 B2 | 11/2008 | Watterson et al. |
| 7,455,626 B2 | 11/2008 | Trevino et al. |
| 7,455,628 B1 | 11/2008 | Stearns |
| 7,470,234 B1 | 12/2008 | Elhag et al. |
| 7,475,613 B2 | 1/2009 | Bailey |
| 7,482,050 B2 | 1/2009 | Olson |
| 7,488,277 B1 | 2/2009 | Knapp |
| 7,494,450 B2 | 2/2009 | Solomon |
| D588,655 S | 3/2009 | Utykanski |
| 7,497,784 B2 | 3/2009 | Henry |
| 7,507,187 B2 | 3/2009 | Dyer et al. |
| 7,507,189 B2 | 3/2009 | Krull |
| 7,510,509 B2 | 3/2009 | Hickman |
| 7,510,511 B2 | 3/2009 | Von Detten |
| 7,517,303 B2 | 4/2009 | Crawford et al. |
| 7,520,840 B2 | 4/2009 | Shifferaw |
| 7,524,272 B2 | 4/2009 | Bruck et al. |
| 7,525,293 B1 | 4/2009 | Notohamiprodjo et al. |
| 7,537,546 B2 | 5/2009 | Watterson et al. |
| 7,537,549 B2 | 5/2009 | Nelson et al. |
| 7,537,550 B1 | 5/2009 | Krull |
| 7,537,552 B2 | 5/2009 | Dalebout et al. |
| 7,540,828 B2 | 6/2009 | Watterson et al. |
| 7,540,829 B1 | 6/2009 | Lin |
| 7,542,040 B2 | 6/2009 | Templeman |
| 7,544,153 B2 | 6/2009 | Trevino et al. |
| 7,549,947 B2 | 6/2009 | Hickman et al. |
| 7,553,260 B2 | 6/2009 | Piaget et al. |
| 7,553,262 B2 | 6/2009 | Piane, Jr. |
| 7,556,590 B2 | 7/2009 | Watterson et al. |
| 7,556,591 B2 | 7/2009 | Chuang |
| 7,559,879 B2 | 7/2009 | Anderson et al. |

(56) References Cited

U.S. PATENT DOCUMENTS

| | | |
|---|---|---|
| 7,563,203 B2 | 7/2009 | Dalebout et al. |
| 7,563,205 B2 | 7/2009 | Alling |
| 7,569,000 B2 | 8/2009 | Wang |
| 7,569,004 B2 | 8/2009 | Kolomeir |
| 7,575,536 B1 | 8/2009 | Hickman |
| 7,575,537 B2 | 8/2009 | Ellis |
| 7,585,251 B2 | 9/2009 | Doody, Jr. et al. |
| 7,585,254 B1 | 9/2009 | Vittone |
| 7,585,258 B2 | 9/2009 | Watson et al. |
| 7,591,770 B2 | 9/2009 | Stewart et al. |
| 7,591,795 B2 | 9/2009 | Whalen et al. |
| 7,594,877 B2 | 9/2009 | Anderson et al. |
| 7,594,878 B1 | 9/2009 | Joannou |
| 7,601,101 B2 | 10/2009 | Jackson et al. |
| 7,601,105 B1 | 10/2009 | Gipson, III et al. |
| 7,602,301 B1 | 10/2009 | Stirling et al. |
| 7,604,571 B2 | 10/2009 | Wilkins et al. |
| 7,604,572 B2 | 10/2009 | Stanford |
| 7,604,573 B2 | 10/2009 | Dalebout et al. |
| 7,605,508 B2* | 10/2009 | Baumgartner ....... H02K 5/1732 310/43 |
| 7,608,015 B2 | 10/2009 | Radow |
| 7,608,021 B1 | 10/2009 | Nalley |
| 7,608,023 B2 | 10/2009 | Casagrande |
| D604,373 S | 11/2009 | Dalebout et al. |
| 7,614,639 B2 | 11/2009 | Tholkes et al. |
| 7,614,981 B2 | 11/2009 | Cao |
| 7,618,346 B2 | 11/2009 | Crawford et al. |
| 7,618,350 B2 | 11/2009 | Dalebout et al. |
| 7,618,357 B2 | 11/2009 | Dalebout |
| 7,621,850 B2 | 11/2009 | Piaget et al. |
| 7,621,855 B1 | 11/2009 | Krull |
| 7,625,314 B2 | 12/2009 | Ungari |
| 7,625,315 B2 | 12/2009 | Hickman |
| 7,625,321 B2 | 12/2009 | Simonson et al. |
| 7,628,730 B2 | 12/2009 | Watterson et al. |
| 7,628,732 B1 | 12/2009 | Porszasz et al. |
| 7,628,737 B2 | 12/2009 | Kowallis et al. |
| 7,637,847 B1 | 12/2009 | Hickman |
| 7,637,850 B2 | 12/2009 | Lin |
| 7,639,520 B1 | 12/2009 | Zansky et al. |
| 7,645,212 B2 | 1/2010 | Ashby et al. |
| 7,645,213 B2 | 1/2010 | Watterson |
| 7,645,214 B2 | 1/2010 | Lull |
| 7,645,218 B2 | 1/2010 | Potok et al. |
| 7,647,196 B2 | 1/2010 | Kahn et al. |
| 7,648,446 B2 | 1/2010 | Chiles et al. |
| 7,651,442 B2 | 1/2010 | Carlson |
| 7,652,402 B2 | 1/2010 | Kinoshita |
| 7,654,229 B2 | 2/2010 | Smith |
| 7,658,694 B2 | 2/2010 | Ungari |
| 7,658,695 B1 | 2/2010 | Amsbury et al. |
| 7,658,698 B2 | 2/2010 | Pacheco et al. |
| 7,670,263 B2 | 3/2010 | Ellis |
| 7,674,205 B2 | 3/2010 | Dalebout et al. |
| 7,674,206 B2 | 3/2010 | Jones |
| 7,677,518 B2 | 3/2010 | Chouinard et al. |
| 7,682,286 B2 | 3/2010 | Badarneh et al. |
| 7,682,287 B1 | 3/2010 | Hsieh |
| 7,682,290 B2 | 3/2010 | Liao et al. |
| 7,682,291 B2 | 3/2010 | Gill et al. |
| 7,690,556 B1 | 4/2010 | Kahn et al. |
| 7,695,409 B2 | 4/2010 | Helie et al. |
| 7,704,191 B2 | 4/2010 | Smith et al. |
| 7,704,192 B2 | 4/2010 | Dyer et al. |
| 7,708,668 B2 | 5/2010 | Rodgers, Jr. |
| 7,708,672 B2 | 5/2010 | Gibson et al. |
| 7,713,171 B1 | 5/2010 | Hickman |
| 7,713,172 B2 | 5/2010 | Watterson et al. |
| 7,713,177 B2 | 5/2010 | Lo |
| 7,713,180 B2 | 5/2010 | Wickens |
| 7,717,826 B2 | 5/2010 | Cox et al. |
| 7,717,827 B2 | 5/2010 | Kurunmäki et al. |
| 7,717,828 B2 | 5/2010 | Simonson et al. |
| 7,717,830 B1 | 5/2010 | Charniga et al. |
| 7,722,503 B1 | 5/2010 | Smith et al. |
| 7,722,509 B2 | 5/2010 | Eder |
| 7,731,634 B2 | 6/2010 | Stewart et al. |
| 7,736,272 B2 | 6/2010 | Martens |
| 7,736,273 B2 | 6/2010 | Cox et al. |
| 7,736,279 B2 | 6/2010 | Dalebout et al. |
| 7,736,280 B2 | 6/2010 | Weier et al. |
| 7,736,281 B2 | 6/2010 | Corbalis et al. |
| 7,740,563 B2 | 6/2010 | Dalebout et al. |
| 7,745,716 B1 | 6/2010 | Murphy |
| 7,749,137 B2 | 7/2010 | Watt et al. |
| 7,749,144 B2 | 7/2010 | Hammer |
| 7,753,830 B1 | 7/2010 | Marsh et al. |
| 7,753,861 B1 | 7/2010 | Kahn et al. |
| 7,758,469 B2 | 7/2010 | Dyer et al. |
| 7,762,952 B2 | 7/2010 | Lee et al. |
| 7,766,797 B2 | 8/2010 | Dalebout |
| 7,771,319 B1 | 8/2010 | Lannon |
| 7,771,320 B2 | 8/2010 | Riley et al. |
| 7,771,329 B2 | 8/2010 | Dalebout et al. |
| 7,775,128 B2 | 8/2010 | Roessingh et al. |
| 7,775,936 B2 | 8/2010 | Wilkinson |
| 7,775,940 B2 | 8/2010 | Dalebout et al. |
| 7,775,943 B2 | 8/2010 | Vittone |
| 7,777,379 B2* | 8/2010 | Schulz ............... F16C 19/54 310/90 |
| 7,780,578 B2 | 8/2010 | Packham |
| 7,789,800 B1 | 9/2010 | Watterson et al. |
| 7,794,363 B2 | 9/2010 | Wang |
| 7,795,824 B2 | 9/2010 | Shen et al. |
| 7,798,946 B2 | 9/2010 | Dalebout et al. |
| 7,806,780 B1 | 10/2010 | Plunkett |
| 7,806,805 B2 | 10/2010 | Barufka et al. |
| 7,811,209 B2 | 10/2010 | Crawford et al. |
| 7,815,550 B2 | 10/2010 | Watterson et al. |
| 7,815,554 B2 | 10/2010 | Gibson et al. |
| 7,837,161 B2 | 11/2010 | Chase |
| 7,837,595 B2 | 11/2010 | Rice |
| 7,839,058 B1 | 11/2010 | Churchill et al. |
| 7,846,070 B2 | 12/2010 | Oglesby et al. |
| 7,854,669 B2 | 12/2010 | Marty et al. |
| 7,857,731 B2 | 12/2010 | Hickman et al. |
| 7,862,475 B2 | 1/2011 | Watterson |
| 7,862,478 B2 | 1/2011 | Watterson et al. |
| 7,862,483 B2 | 1/2011 | Hendrickson et al. |
| 7,871,355 B2 | 1/2011 | Yeh |
| 7,871,357 B2 | 1/2011 | Gibson et al. |
| 7,878,950 B1 | 2/2011 | Bastian |
| 7,883,448 B2 | 2/2011 | Wang |
| 7,887,465 B2 | 2/2011 | Uffelman |
| 7,892,148 B1 | 2/2011 | Stauffer et al. |
| 7,892,149 B2 | 2/2011 | Wu |
| 7,892,150 B1 | 2/2011 | Colley |
| D635,207 S | 3/2011 | Dalebout et al. |
| 7,901,325 B2 | 3/2011 | Henderson |
| 7,901,330 B2 | 3/2011 | Dalebout et al. |
| 7,908,981 B2 | 3/2011 | Agee |
| 7,909,740 B2 | 3/2011 | Dalebout et al. |
| 7,914,420 B2 | 3/2011 | Daly et al. |
| 7,914,421 B2 | 3/2011 | Weier et al. |
| 7,919,950 B2 | 4/2011 | Uno et al. |
| 7,922,635 B2 | 4/2011 | Lull et al. |
| 7,927,253 B2 | 4/2011 | Vincent |
| 7,931,563 B2 | 4/2011 | Shaw et al. |
| 7,938,751 B2 | 5/2011 | Nicolas et al. |
| 7,938,755 B1 | 5/2011 | Dyer et al. |
| 7,942,783 B2 | 5/2011 | Ochi |
| 7,942,788 B2 | 5/2011 | Wu |
| 7,946,968 B2 | 5/2011 | Kjellberg |
| 7,949,295 B2 | 5/2011 | Kumar et al. |
| 7,951,046 B1 | 5/2011 | Barber, Jr. |
| 7,959,124 B2 | 6/2011 | Phifer et al. |
| 7,972,249 B1 | 7/2011 | Napalan |
| 7,976,437 B1 | 7/2011 | Von Detten |
| 7,978,081 B2 | 7/2011 | Shears et al. |
| 7,980,996 B2 | 7/2011 | Hickman |
| 7,981,000 B2 | 7/2011 | Watterson et al. |
| 7,985,164 B2 | 7/2011 | Ashby |
| 7,988,600 B2 | 8/2011 | Rodgers, Jr. |

(56) References Cited

U.S. PATENT DOCUMENTS

| | | |
|---|---|---|
| 8,001,472 B2 | 8/2011 | Gilley et al. |
| 8,002,674 B2 | 8/2011 | Piaget et al. |
| 8,002,684 B2 | 8/2011 | Laurent |
| 8,007,409 B2 | 8/2011 | Ellis |
| 8,012,067 B2 | 9/2011 | Joannou |
| 8,012,068 B1 | 9/2011 | Malcolm |
| 8,029,415 B2 | 10/2011 | Ashby et al. |
| 8,033,960 B1 | 10/2011 | Dalebout et al. |
| 8,043,173 B2 | 10/2011 | Menalagha et al. |
| 8,047,965 B2 | 11/2011 | Shea |
| 8,047,966 B2 | 11/2011 | Dorogusker et al. |
| 8,047,970 B2 | 11/2011 | Nalley |
| 8,055,469 B2 | 11/2011 | Kulach et al. |
| 8,057,368 B1 | 11/2011 | Lyszczarz |
| 8,062,196 B1 | 11/2011 | Khubani |
| 8,066,514 B2 | 11/2011 | Clarke |
| D650,451 S | 12/2011 | Olson et al. |
| 8,079,939 B1 | 12/2011 | Wang |
| 8,082,029 B2 | 12/2011 | Honda |
| 8,083,693 B1 | 12/2011 | McKeon et al. |
| D652,877 S | 1/2012 | Dalebout et al. |
| 8,103,379 B2 | 1/2012 | Biba et al. |
| 8,104,411 B2 | 1/2012 | Fenton |
| 8,105,213 B2 | 1/2012 | Stewart et al. |
| 8,109,858 B2 | 2/2012 | Redmann |
| 8,113,994 B2 | 2/2012 | Piaget et al. |
| 8,123,527 B2 | 2/2012 | Holljes |
| 8,141,276 B2 | 3/2012 | Ellis |
| 8,147,385 B2 | 4/2012 | Crawford et al. |
| 8,152,702 B2 | 4/2012 | Pacheco |
| 8,162,804 B2 | 4/2012 | Tagliabue |
| D659,775 S | 5/2012 | Olson et al. |
| D659,777 S | 5/2012 | Watterson et al. |
| D660,383 S | 5/2012 | Watterson et al. |
| 8,172,729 B2 | 5/2012 | Ellis |
| 8,177,688 B2 | 5/2012 | Burnfield et al. |
| 8,182,399 B2 | 5/2012 | Davis et al. |
| 8,188,700 B2 | 5/2012 | Tseng et al. |
| 8,200,323 B2 | 6/2012 | Dibenedetto et al. |
| D664,613 S | 7/2012 | Dalebout et al. |
| 8,221,290 B2 | 7/2012 | Vincent et al. |
| 8,221,295 B2 | 7/2012 | Wilkins |
| 8,240,430 B2 | 8/2012 | Downey |
| 8,241,187 B2 | 8/2012 | Moon et al. |
| 8,251,874 B2 | 8/2012 | Ashby et al. |
| 8,260,858 B2 | 9/2012 | Belz et al. |
| 8,272,996 B2 | 9/2012 | Weier |
| 8,275,265 B2 | 9/2012 | Kobyakov et al. |
| 8,280,259 B2 | 10/2012 | George et al. |
| 8,287,434 B2 | 10/2012 | Zavadsky et al. |
| 8,298,123 B2 | 10/2012 | Hickman |
| 8,298,125 B2 | 10/2012 | Colledge et al. |
| D671,177 S | 11/2012 | Sip |
| D671,178 S | 11/2012 | Sip |
| 8,306,635 B2 | 11/2012 | Pryor |
| 8,315,823 B2 | 11/2012 | Berme et al. |
| 8,320,578 B2 | 11/2012 | Kahn et al. |
| 8,323,157 B2 | 12/2012 | Campanaro et al. |
| 8,333,681 B2 | 12/2012 | Schmidt |
| D673,626 S | 1/2013 | Olson et al. |
| 8,343,016 B1 | 1/2013 | Astilean |
| 8,360,904 B2 | 1/2013 | Oleson et al. |
| 8,360,935 B2 | 1/2013 | Olsen et al. |
| 8,360,936 B2 | 1/2013 | Dibenedetto et al. |
| 8,368,329 B1 | 2/2013 | Depew et al. |
| 8,378,647 B2 | 2/2013 | Yonezawa et al. |
| 8,394,005 B2 | 3/2013 | Solow et al. |
| 8,395,366 B2 | 3/2013 | Uno |
| 8,435,160 B1 | 5/2013 | Clum |
| 8,446,275 B2 | 5/2013 | Utter, II |
| 8,449,620 B2 | 5/2013 | Hakansson et al. |
| 8,454,437 B2 | 6/2013 | Dugan |
| 8,459,479 B2 | 6/2013 | Yourist |
| 8,475,346 B2 | 7/2013 | Gerschefske et al. |
| 8,475,367 B1 | 7/2013 | Yuen et al. |
| 8,480,541 B1 | 7/2013 | Brunts |
| 8,485,944 B2 | 7/2013 | Drazan |
| 8,485,945 B2 | 7/2013 | Leonhard |
| 8,487,759 B2 | 7/2013 | Hill |
| 8,505,597 B2 | 8/2013 | Sharperson |
| 8,506,370 B2 | 8/2013 | Homsi |
| 8,512,210 B2 | 8/2013 | Shauli |
| 8,516,723 B2 | 8/2013 | Ferrigan et al. |
| 8,535,247 B2 | 9/2013 | Williams |
| 8,540,560 B2 | 9/2013 | Crowley et al. |
| 8,550,962 B2 | 10/2013 | Piaget et al. |
| 8,562,489 B2 | 10/2013 | Burton et al. |
| 8,573,982 B1 | 11/2013 | Chuang |
| 8,585,561 B2 | 11/2013 | Watt et al. |
| 8,602,951 B2 | 12/2013 | Morris |
| 8,608,624 B2 | 12/2013 | Shabodyash et al. |
| 8,614,595 B2 | 12/2013 | Acatrinei |
| 8,614,902 B2 | 12/2013 | Pansier et al. |
| 8,617,008 B2 | 12/2013 | Marty et al. |
| 8,655,004 B2 | 2/2014 | Prest et al. |
| 8,657,724 B2 | 2/2014 | Yang |
| 8,690,578 B1 | 4/2014 | Nusbaum et al. |
| 8,690,735 B2 | 4/2014 | Watterson et al. |
| 8,690,738 B1 | 4/2014 | Astilian |
| 8,701,567 B2 | 4/2014 | Esfandiari et al. |
| 8,702,430 B2 | 4/2014 | Dibenedetto et al. |
| 8,702,567 B2 | 4/2014 | Hu |
| 8,708,870 B2 | 4/2014 | Nalley |
| 8,734,157 B1 | 5/2014 | Hummel, III |
| 8,734,301 B2 | 5/2014 | Remelius |
| 8,734,302 B2 | 5/2014 | Hsieh |
| D707,763 S | 6/2014 | Cutler |
| 8,740,753 B2 | 6/2014 | Olson et al. |
| 8,740,756 B2 | 6/2014 | Shabodyash et al. |
| 8,749,380 B2 | 6/2014 | Vock et al. |
| 8,758,201 B2 | 6/2014 | Ashby et al. |
| 8,762,101 B2 | 6/2014 | Yuen et al. |
| 8,764,609 B1 | 7/2014 | Elahmadie |
| 8,771,153 B2 | 7/2014 | Dalebout et al. |
| 8,777,820 B2 | 7/2014 | Lo |
| 8,783,326 B1 | 7/2014 | Vaninger et al. |
| 8,784,270 B2 | 7/2014 | Watterson |
| 8,784,274 B1 | 7/2014 | Chuang |
| 8,790,222 B2 | 7/2014 | Burger |
| 8,801,581 B2 | 8/2014 | Lai et al. |
| 8,808,148 B2 | 8/2014 | Watterson |
| 8,814,762 B2 | 8/2014 | Butler |
| D712,493 S | 9/2014 | Ercanbrack et al. |
| 8,824,697 B2 | 9/2014 | Christoph |
| 8,825,445 B2 | 9/2014 | Hoffman et al. |
| 8,840,075 B2 | 9/2014 | Olson |
| 8,845,493 B2 | 9/2014 | Watterson et al. |
| 8,847,988 B2 | 9/2014 | Geisner et al. |
| 8,851,565 B2 | 10/2014 | Hontz et al. |
| 8,864,627 B2 | 10/2014 | Bayerlein et al. |
| 8,870,726 B2 | 10/2014 | Watterson et al. |
| 8,876,661 B2 | 11/2014 | Lu |
| 8,876,668 B2 | 11/2014 | Hendrickson et al. |
| 8,888,660 B1 | 11/2014 | Oteman |
| 8,894,549 B2 | 11/2014 | Colledge |
| 8,894,551 B2 | 11/2014 | Kerdjoudj |
| 8,894,555 B2 | 11/2014 | Olson |
| 8,911,330 B2 | 12/2014 | Watterson et al. |
| 8,920,288 B2 | 12/2014 | Dalebout |
| 8,920,291 B2 | 12/2014 | Chen et al. |
| 8,926,475 B2 | 1/2015 | Lin et al. |
| 8,926,479 B2 | 1/2015 | Chen et al. |
| 8,956,290 B2 | 2/2015 | Gilley et al. |
| 8,956,715 B2 | 2/2015 | Kim |
| 8,968,163 B1 | 3/2015 | Vidmar |
| 8,979,709 B2 | 3/2015 | Toback et al. |
| 8,986,165 B2 | 3/2015 | Ashby |
| 8,992,364 B2 | 3/2015 | Law et al. |
| 8,992,387 B2 | 3/2015 | Watterson et al. |
| D726,476 S | 4/2015 | Ercanbrack |
| 9,005,085 B2 | 4/2015 | Astilean |
| 9,011,291 B2 | 4/2015 | Birrell |
| 9,015,952 B2 | 4/2015 | Magosaki |
| 9,028,368 B2 | 5/2015 | Ashby et al. |

(56) References Cited

U.S. PATENT DOCUMENTS

| | | |
|---|---|---|
| 9,028,370 B2 | 5/2015 | Watterson |
| 9,038,218 B1 | 5/2015 | Heil et al. |
| 9,039,578 B2 | 5/2015 | Dalebout |
| D731,011 S | 6/2015 | Buchanan |
| 9,050,491 B2 | 6/2015 | Gordon et al. |
| 9,050,498 B2 | 6/2015 | Lu et al. |
| 9,072,930 B2 | 7/2015 | Ashby et al. |
| 9,072,932 B2 | 7/2015 | Piaget et al. |
| 9,089,732 B2 | 7/2015 | Andon et al. |
| 9,095,740 B2 | 8/2015 | Wu |
| 9,108,079 B2 | 8/2015 | Solow et al. |
| 9,114,275 B2 | 8/2015 | Lu et al. |
| 9,114,276 B2 | 8/2015 | Bayerlein et al. |
| 9,119,983 B2 | 9/2015 | Rhea |
| 9,123,317 B2 | 9/2015 | Watterson et al. |
| 9,126,071 B2 | 9/2015 | Smith |
| 9,126,072 B2 | 9/2015 | Watterson |
| 9,132,051 B2 | 9/2015 | Heil |
| 9,138,614 B2 | 9/2015 | Lu et al. |
| 9,138,615 B2 | 9/2015 | Olson et al. |
| 9,142,139 B2 | 9/2015 | Watterson et al. |
| 9,144,703 B2 | 9/2015 | Dalebout et al. |
| 9,149,683 B2 | 9/2015 | Smith |
| 9,162,102 B1 | 10/2015 | Eder et al. |
| 9,162,106 B1 | 10/2015 | Scheiman |
| 9,168,414 B2 | 10/2015 | Liu et al. |
| 9,174,085 B2 | 11/2015 | Foley |
| 9,186,535 B2 | 11/2015 | Ercanbrack |
| 9,186,537 B2 | 11/2015 | Arnold et al. |
| 9,186,549 B2 | 11/2015 | Watterson et al. |
| 9,186,552 B1 | 11/2015 | Deal |
| 9,192,800 B1 | 11/2015 | Meyer et al. |
| 9,199,115 B2 | 12/2015 | Yim et al. |
| 9,199,123 B2 | 12/2015 | Solow |
| 9,201,458 B2 | 12/2015 | Hunt et al. |
| 9,220,940 B2 | 12/2015 | Al Kuwari |
| 9,221,545 B2 | 12/2015 | Popescu et al. |
| 9,224,291 B2 | 12/2015 | Moll-Carrillo et al. |
| 9,226,692 B2 | 1/2016 | Haas |
| 9,254,409 B2 | 2/2016 | Dalebout et al. |
| 9,254,416 B2 | 2/2016 | Ashby |
| 9,278,248 B2 | 3/2016 | Tyger |
| 9,278,249 B2 | 3/2016 | Watterson |
| 9,278,250 B2 | 3/2016 | Buchanan |
| 9,289,063 B2 | 3/2016 | Baugh et al. |
| 9,289,648 B2 | 3/2016 | Watterson |
| 9,308,415 B2 | 4/2016 | Crawford et al. |
| 9,311,802 B1 | 4/2016 | Chin et al. |
| 9,333,388 B2 | 5/2016 | Lee et al. |
| 9,339,681 B1 | 5/2016 | Nalley |
| 9,339,683 B2 | 5/2016 | Dilli et al. |
| 9,339,691 B2 | 5/2016 | Brammer |
| 9,352,185 B2 | 5/2016 | Hendrickson et al. |
| 9,352,186 B2 | 5/2016 | Watterson |
| 9,352,187 B2 | 5/2016 | Piaget et al. |
| 9,357,551 B2 | 5/2016 | Gutman |
| 9,358,422 B2 | 6/2016 | Brontman |
| 9,364,706 B2 | 6/2016 | Lo |
| 9,364,708 B2 | 6/2016 | Luger et al. |
| 9,364,714 B2 | 6/2016 | Koduri et al. |
| 9,367,668 B2 | 6/2016 | Flynt et al. |
| 9,370,687 B2 | 6/2016 | Hao |
| 9,375,605 B2 | 6/2016 | Tyger |
| 9,381,394 B2 | 7/2016 | Mortensen et al. |
| 9,387,387 B2 | 7/2016 | Dalebout |
| 9,389,718 B1 | 7/2016 | Letourneur |
| 9,393,453 B2 | 7/2016 | Watterson |
| 9,403,047 B2 | 8/2016 | Olson |
| 9,403,051 B2 | 8/2016 | Cutler |
| 9,409,050 B2 | 8/2016 | Mintz |
| 9,415,257 B2 | 8/2016 | Habing |
| 9,421,416 B2 | 8/2016 | Mortensen et al. |
| 9,452,315 B1 | 9/2016 | Murray et al. |
| 9,452,320 B2 | 9/2016 | Yang |
| 9,455,784 B2 | 9/2016 | Cune et al. |
| 9,457,219 B2 | 10/2016 | Smith |
| 9,457,220 B2 | 10/2016 | Olson |
| 9,457,222 B2 | 10/2016 | Dalebout |
| 9,457,224 B2 | 10/2016 | Giannelli et al. |
| 9,460,632 B2 | 10/2016 | Watterson |
| 9,463,349 B1 | 10/2016 | Chang |
| 9,463,356 B2 | 10/2016 | Rhea |
| 9,468,794 B2 | 10/2016 | Barton |
| 9,468,798 B2 | 10/2016 | Dalebout |
| 9,480,874 B2 | 11/2016 | Cutler |
| 9,486,658 B2 | 11/2016 | Alexander |
| 9,492,704 B2 | 11/2016 | Mortensen et al. |
| 9,498,668 B2 | 11/2016 | Smith |
| 9,498,671 B1 | 11/2016 | Softky |
| 9,505,241 B2 | 11/2016 | Lyon |
| 9,517,378 B2 | 12/2016 | Ashby et al. |
| 9,521,901 B2 | 12/2016 | Dalebout |
| 9,533,187 B2 | 1/2017 | Kao |
| 9,539,458 B1 | 1/2017 | Ross |
| 9,539,461 B2 | 1/2017 | Ercanbrack |
| 9,540,071 B2 | 1/2017 | Jordan et al. |
| 9,540,174 B2 | 1/2017 | Josserond et al. |
| 9,560,917 B2 | 2/2017 | Roslund, Jr. |
| 9,573,017 B2 | 2/2017 | Chang |
| 9,579,534 B2 | 2/2017 | Sutkowski et al. |
| 9,579,544 B2 | 2/2017 | Watterson |
| 9,582,976 B2 | 2/2017 | Chin et al. |
| 9,586,086 B2 | 3/2017 | Dalebout et al. |
| 9,586,090 B2 | 3/2017 | Watterson et al. |
| 9,604,099 B2 | 3/2017 | Taylor |
| 9,610,475 B1 | 4/2017 | DeKnock et al. |
| 9,616,276 B2 | 4/2017 | Dalebout |
| 9,616,278 B2 | 4/2017 | Olson |
| 9,623,281 B2 | 4/2017 | Hendrickson |
| 9,623,286 B1 | 4/2017 | Chen |
| 9,636,567 B2 | 5/2017 | Brammer et al. |
| 9,673,904 B2 | 6/2017 | Palanisamy et al. |
| 9,675,839 B2 | 6/2017 | Dalebout |
| 9,681,313 B2 | 6/2017 | Malach |
| 9,682,306 B2 | 6/2017 | Lin et al. |
| 9,682,307 B2 | 6/2017 | Dalebout |
| 9,694,234 B2 | 7/2017 | Dalebout et al. |
| 9,694,242 B2 | 7/2017 | Ashby |
| 9,700,780 B2 | 7/2017 | Riley et al. |
| 9,707,441 B2 | 7/2017 | Yang |
| 9,707,447 B1 | 7/2017 | Lopez Babodilla |
| 9,731,158 B1 | 8/2017 | Lo |
| 9,737,747 B1 | 8/2017 | Walsh et al. |
| 9,737,755 B2 | 8/2017 | Dalebout |
| 9,757,605 B2 | 9/2017 | Olson et al. |
| 9,764,184 B2 | 9/2017 | Kueker et al. |
| 9,764,186 B2 | 9/2017 | Dalebout |
| 9,767,785 B2 | 9/2017 | Ashby |
| 9,776,039 B1 | 10/2017 | Xu |
| 9,782,625 B1 | 10/2017 | Blum et al. |
| 9,795,822 B2 | 10/2017 | Smith et al. |
| 9,795,827 B2 | 10/2017 | Wiener et al. |
| 9,808,672 B2 | 11/2017 | Dalebout |
| 9,808,673 B2 | 11/2017 | Robinson |
| 9,814,927 B2 | 11/2017 | Forystek |
| 9,814,929 B2 | 11/2017 | Moser |
| 9,814,930 B2 | 11/2017 | Manzke et al. |
| 9,827,458 B2 | 11/2017 | Dalton |
| 9,829,068 B2 | 11/2017 | Marchetti |
| 9,833,658 B2 | 12/2017 | Wiener et al. |
| 9,849,326 B2 | 12/2017 | Smith |
| 9,849,330 B2 | 12/2017 | Lagree |
| 9,878,210 B2 | 1/2018 | Watterson |
| 9,889,334 B2 | 2/2018 | Ashby et al. |
| 9,889,339 B2 | 2/2018 | Douglass |
| 9,901,767 B2 | 2/2018 | Kuo |
| 9,901,780 B2 | 2/2018 | DeLuca |
| 9,901,805 B2 | 2/2018 | Hughes, Jr. |
| 9,914,011 B2 | 3/2018 | Downey et al. |
| 9,914,014 B2 | 3/2018 | Lagree et al. |
| 9,937,375 B2 | 4/2018 | Zhu |
| 9,937,376 B2 | 4/2018 | McInelly et al. |
| 9,937,377 B2 | 4/2018 | McInelly et al. |
| 9,937,378 B2 | 4/2018 | Dalebout et al. |

(56) References Cited

U.S. PATENT DOCUMENTS

| | | |
|---|---|---|
| 9,937,379 B2 | 4/2018 | Mortensen |
| 9,943,719 B2 | 4/2018 | Smith et al. |
| 9,943,722 B2 | 4/2018 | Dalebout |
| 9,948,037 B2 | 4/2018 | Ashby |
| 9,948,349 B2 | 4/2018 | Malach |
| 9,950,209 B2 | 4/2018 | Yim et al. |
| 9,956,450 B2 | 5/2018 | Bayerlein et al. |
| 9,968,816 B2 | 5/2018 | Olson et al. |
| 9,968,821 B2 | 5/2018 | Finlayson et al. |
| 9,968,823 B2 | 5/2018 | Cutler |
| 9,987,513 B2 | 6/2018 | Yim et al. |
| 9,987,517 B1 | 6/2018 | Kuo |
| 9,993,680 B2 | 6/2018 | Gordon |
| 10,004,940 B2 | 6/2018 | Badarneh |
| 10,010,755 B2 | 7/2018 | Watterson |
| 10,010,756 B2 | 7/2018 | Watterson |
| 10,022,590 B2 | 7/2018 | Foley et al. |
| 10,029,145 B2 | 7/2018 | Douglass |
| D826,350 S | 8/2018 | Hochstrasser |
| 10,046,196 B2 | 8/2018 | Ercanbrack |
| D827,733 S | 9/2018 | Hochstrasser |
| 10,065,064 B2 | 9/2018 | Smith et al. |
| 10,071,285 B2 | 9/2018 | Smith et al. |
| 10,085,586 B2 | 10/2018 | Smith et al. |
| 10,086,254 B2 | 10/2018 | Watterson |
| 10,136,842 B2 | 11/2018 | Ashby |
| 10,186,161 B2 | 1/2019 | Watterson |
| 10,188,890 B2 | 1/2019 | Olson |
| 10,207,143 B2 | 2/2019 | Dalebout |
| 10,207,145 B2 | 2/2019 | Tyger |
| 10,207,147 B2 | 2/2019 | Ercanbrack |
| 10,207,148 B2 | 2/2019 | Powell |
| 10,212,994 B2 | 2/2019 | Watterson |
| 10,220,259 B2 | 3/2019 | Brammer |
| 10,226,396 B2 | 3/2019 | Ashby |
| 10,226,664 B2 | 3/2019 | Dalebout |
| 10,252,109 B2 | 4/2019 | Watterson |
| 10,258,828 B2 | 4/2019 | Dalebout |
| 10,272,317 B2 | 4/2019 | Watterson |
| 10,279,212 B2 | 5/2019 | Dalebout et al. |
| 10,293,211 B2 | 5/2019 | Watterson et al. |
| D852,292 S | 6/2019 | Cutler |
| 10,343,017 B2 | 7/2019 | Jackson |
| 10,376,736 B2 | 8/2019 | Powell et al. |
| 10,388,183 B2 | 8/2019 | Watterson |
| 10,391,361 B2 | 8/2019 | Watterson |
| D864,320 S | 10/2019 | Weston |
| D864,321 S | 10/2019 | Weston |
| 10,426,989 B2 | 10/2019 | Dalebout |
| 10,433,612 B2 | 10/2019 | Ashby |
| 10,441,840 B2 | 10/2019 | Dalebout |
| 10,449,416 B2 | 10/2019 | Dalebout |
| D868,909 S | 12/2019 | Cutler et al. |
| 10,492,519 B2 | 12/2019 | Capell |
| 10,493,349 B2 | 12/2019 | Watterson |
| 10,500,473 B2 | 12/2019 | Watterson |
| 10,543,395 B2 | 1/2020 | Powell et al. |
| 2001/0001303 A1 | 5/2001 | Ohsuga et al. |
| 2001/0008053 A1 | 7/2001 | Belli |
| 2001/0049470 A1 | 12/2001 | Mault et al. |
| 2001/0051564 A1 | 12/2001 | Alexander |
| 2002/0016235 A1 | 2/2002 | Ashby et al. |
| 2002/0019298 A1 | 2/2002 | Eschenbach |
| 2002/0024521 A1 | 2/2002 | Goden |
| 2002/0025888 A1 | 2/2002 | Germanton |
| 2002/0026130 A1 | 2/2002 | West |
| 2002/0039952 A1 | 4/2002 | Clem |
| 2002/0043909 A1 | 4/2002 | Nielsen |
| 2002/0045519 A1 | 4/2002 | Watterson |
| 2002/0055418 A1 | 5/2002 | Pyles et al. |
| 2002/0055419 A1 | 5/2002 | Hinnebusch |
| 2002/0055420 A1 | 5/2002 | Stearns et al. |
| 2002/0055422 A1 | 5/2002 | Airmet |
| 2002/0066735 A1 | 6/2002 | Hewlitt et al. |
| 2002/0077221 A1 | 6/2002 | Dalebout et al. |
| 2002/0094914 A1 | 7/2002 | Maresh et al. |
| 2002/0107058 A1 | 8/2002 | Namba et al. |
| 2002/0115536 A1 | 8/2002 | Hojo |
| 2002/0119057 A1* | 8/2002 | Sekihara ............... F16C 25/083 417/415 |
| 2002/0128127 A1 | 9/2002 | Chen |
| 2002/0147078 A1 | 10/2002 | Wu |
| 2002/0151413 A1 | 10/2002 | Dalebout |
| 2002/0159253 A1 | 10/2002 | Dalebout et al. |
| 2002/0160883 A1 | 10/2002 | Dugan |
| 2002/0171070 A1 | 11/2002 | Shim |
| 2002/0198084 A1 | 12/2002 | Stearns et al. |
| 2003/0032524 A1 | 2/2003 | Lamar et al. |
| 2003/0032535 A1 | 2/2003 | Wang |
| 2003/0045406 A1 | 3/2003 | Stone |
| 2003/0060344 A1 | 3/2003 | David |
| 2003/0069108 A1 | 4/2003 | Rubinstein |
| 2003/0073545 A1 | 4/2003 | Liu |
| 2003/0092532 A1 | 5/2003 | Giannelli et al. |
| 2003/0092540 A1 | 5/2003 | Gillen |
| 2003/0096675 A1 | 5/2003 | Wang |
| 2003/0097878 A1 | 5/2003 | Farringdon et al. |
| 2003/0104908 A1 | 6/2003 | Tung |
| 2003/0119635 A1 | 6/2003 | Arbuckle |
| 2003/0128186 A1 | 7/2003 | Laker |
| 2003/0134718 A1 | 7/2003 | Kim |
| 2003/0148853 A1 | 8/2003 | Alessandri |
| 2003/0171189 A1 | 9/2003 | Kaufman |
| 2003/0171190 A1 | 9/2003 | Rice |
| 2003/0176815 A1 | 9/2003 | Baba et al. |
| 2003/0181289 A1 | 9/2003 | Oscar Moavro |
| 2003/0183027 A1 | 10/2003 | Koch |
| 2003/0211916 A1 | 11/2003 | Capuano |
| 2003/0222419 A1 | 12/2003 | Geary |
| 2003/0236153 A1 | 12/2003 | Pan et al. |
| 2004/0005958 A1 | 1/2004 | Kamen et al. |
| 2004/0005961 A1 | 1/2004 | Alexander |
| 2004/0014567 A1 | 1/2004 | Mendel |
| 2004/0014571 A1 | 1/2004 | Haynes |
| 2004/0018917 A1 | 1/2004 | Corbalis |
| 2004/0018918 A1 | 1/2004 | Reyes |
| 2004/0023759 A1 | 2/2004 | Duncan et al. |
| 2004/0023761 A1 | 2/2004 | Emery |
| 2004/0023762 A1 | 2/2004 | Lull |
| 2004/0023766 A1 | 2/2004 | Slone |
| 2004/0023778 A1 | 2/2004 | Kusumoto et al. |
| 2004/0025754 A1 | 2/2004 | Dye |
| 2004/0029645 A1 | 2/2004 | Chen |
| 2004/0033865 A1 | 2/2004 | Wu |
| 2004/0037716 A1* | 2/2004 | Jaisle .................... F16C 39/063 417/407 |
| 2004/0043871 A1 | 3/2004 | Chang |
| 2004/0043873 A1 | 3/2004 | Wilkinson et al. |
| 2004/0051392 A1 | 3/2004 | Badarneh |
| 2004/0053748 A1 | 3/2004 | Lo et al. |
| 2004/0063549 A1 | 4/2004 | Kuo |
| 2004/0067821 A1 | 4/2004 | Kehrbaum |
| 2004/0067833 A1 | 4/2004 | Talish |
| 2004/0082444 A1 | 4/2004 | Golesh |
| 2004/0091307 A1 | 5/2004 | James |
| 2004/0092367 A1 | 5/2004 | Corbalis |
| 2004/0097331 A1 | 5/2004 | Zillig |
| 2004/0100484 A1 | 5/2004 | Barrett |
| 2004/0102292 A1 | 5/2004 | Pyles et al. |
| 2004/0103432 A1 | 5/2004 | Barrett |
| 2004/0114768 A1 | 6/2004 | Luo |
| 2004/0132586 A1 | 7/2004 | Leighton et al. |
| 2004/0132587 A1 | 7/2004 | Leighton et al. |
| 2004/0136750 A1 | 7/2004 | Yoshioka et al. |
| 2004/0138030 A1 | 7/2004 | Wang |
| 2004/0142800 A1 | 7/2004 | Gerschefske |
| 2004/0144626 A1 | 7/2004 | Saeki |
| 2004/0152566 A1 | 8/2004 | Yeh |
| 2004/0155622 A1 | 8/2004 | Mayhew et al. |
| 2004/0160336 A1 | 8/2004 | Hoch |
| 2004/0162189 A1 | 8/2004 | Hickman |
| 2004/0162191 A1 | 8/2004 | Ercanbrack |
| 2004/0163574 A1 | 8/2004 | Schoenbach |
| 2004/0166999 A1 | 8/2004 | Dodge |

(56) References Cited

U.S. PATENT DOCUMENTS

| | | |
|---|---|---|
| 2004/0171460 A1 | 9/2004 | Park |
| 2004/0171464 A1 | 9/2004 | Ashby et al. |
| 2004/0171465 A1 | 9/2004 | Hald |
| 2004/0176215 A1 | 9/2004 | Gramaccioni |
| 2004/0176217 A1 | 9/2004 | Watterson |
| 2004/0177531 A1 | 9/2004 | Dibenedetto et al. |
| 2004/0180719 A1 | 9/2004 | Feldman |
| 2004/0181972 A1 | 9/2004 | Csorba |
| 2004/0198555 A1 | 10/2004 | Anderson |
| 2004/0198559 A1 | 10/2004 | Grossi |
| 2004/0198571 A1 | 10/2004 | Howell et al. |
| 2004/0224740 A1 | 11/2004 | Ball et al. |
| 2004/0224825 A1 | 11/2004 | Giannelli et al. |
| 2004/0224827 A1 | 11/2004 | Ashley |
| 2004/0242378 A1 | 12/2004 | Pan |
| 2004/0242379 A1 | 12/2004 | Juva |
| 2004/0242380 A1 | 12/2004 | Kuivala |
| 2004/0248699 A1 | 12/2004 | Colley |
| 2004/0254020 A1 | 12/2004 | Dragusin |
| 2004/0256524 A1 | 12/2004 | Beck et al. |
| 2004/0259689 A1 | 12/2004 | Wilkins et al. |
| 2004/0266587 A1 | 12/2004 | Miller |
| 2005/0003931 A1 | 1/2005 | Mills et al. |
| 2005/0008992 A1 | 1/2005 | Westergaard et al. |
| 2005/0009668 A1 | 1/2005 | Savettiere |
| 2005/0023292 A1 | 2/2005 | Market et al. |
| 2005/0032611 A1 | 2/2005 | Webber |
| 2005/0037898 A1 | 2/2005 | Chang |
| 2005/0037904 A1 | 2/2005 | Chang |
| 2005/0043145 A1 | 2/2005 | Anderson et al. |
| 2005/0043146 A1 | 2/2005 | Lo et al. |
| 2005/0043155 A1 | 2/2005 | Yannitte |
| 2005/0049117 A1 | 3/2005 | Rodgers |
| 2005/0049121 A1 | 3/2005 | Dalebout |
| 2005/0049123 A1 | 3/2005 | Dalebout et al. |
| 2005/0054492 A1 | 3/2005 | Neff |
| 2005/0064994 A1 | 3/2005 | Matsumoto |
| 2005/0075213 A1 | 4/2005 | Arick |
| 2005/0077805 A1 | 4/2005 | Dalebout et al. |
| 2005/0090770 A1 | 4/2005 | Chen |
| 2005/0096187 A1 | 5/2005 | Hsu |
| 2005/0096189 A1 | 5/2005 | Chen |
| 2005/0107220 A1 | 5/2005 | Wang |
| 2005/0107226 A1 | 5/2005 | Monda |
| 2005/0107229 A1 | 5/2005 | Wickens |
| 2005/0113158 A1 | 5/2005 | Sterchi et al. |
| 2005/0129903 A1 | 6/2005 | Carr |
| 2005/0131319 A1 | 6/2005 | Der Meer |
| 2005/0132838 A1 | 6/2005 | Lin |
| 2005/0143226 A1 | 6/2005 | Heidecke |
| 2005/0143228 A1 | 6/2005 | Lee |
| 2005/0148398 A1 | 7/2005 | Lochtefeld et al. |
| 2005/0148439 A1 | 7/2005 | Wu |
| 2005/0148440 A1 | 7/2005 | Denton |
| 2005/0148442 A1 | 7/2005 | Watterson |
| 2005/0159273 A1 | 7/2005 | Chen |
| 2005/0164839 A1 | 7/2005 | Watterson |
| 2005/0170935 A1 | 8/2005 | Manser |
| 2005/0170936 A1 | 8/2005 | Quinn |
| 2005/0172311 A1 | 8/2005 | Hjelt et al. |
| 2005/0178210 A1 | 8/2005 | Lanham |
| 2005/0181347 A1 | 8/2005 | Barnes et al. |
| 2005/0181911 A1 | 8/2005 | Porth |
| 2005/0192162 A1 | 9/2005 | Pan |
| 2005/0196737 A1 | 9/2005 | Mann |
| 2005/0202934 A1 | 9/2005 | Olrik et al. |
| 2005/0209050 A1 | 9/2005 | Bartels |
| 2005/0209051 A1 | 9/2005 | Santomassimo et al. |
| 2005/0209061 A1 | 9/2005 | Crawford et al. |
| 2005/0209062 A1 | 9/2005 | Anderson et al. |
| 2005/0215397 A1 | 9/2005 | Watterson |
| 2005/0233861 A1 | 10/2005 | Hickman |
| 2005/0233871 A1 | 10/2005 | Anders |
| 2005/0239600 A1 | 10/2005 | Liang |
| 2005/0239607 A1 | 10/2005 | Chang |
| 2005/0245370 A1 | 11/2005 | Boland |
| 2005/0250622 A1 | 11/2005 | Chang |
| 2005/0266961 A1 | 12/2005 | Shum et al. |
| 2005/0272562 A1 | 12/2005 | Alessandri et al. |
| 2005/0272577 A1 | 12/2005 | Olson |
| 2005/0277520 A1 | 12/2005 | Van Waes |
| 2005/0281963 A1 | 12/2005 | Cook |
| 2005/0283911 A1 | 12/2005 | Roussy |
| 2005/0288155 A1 | 12/2005 | Yang |
| 2006/0003869 A1 | 1/2006 | Huang et al. |
| 2006/0004265 A1 | 1/2006 | Pulkkinen et al. |
| 2006/0019804 A1 | 1/2006 | Young |
| 2006/0035757 A1 | 2/2006 | Flick et al. |
| 2006/0035758 A1 | 2/2006 | Rogozinski |
| 2006/0040797 A1 | 2/2006 | Chang |
| 2006/0047447 A1 | 3/2006 | Brady et al. |
| 2006/0053586 A1 | 3/2006 | Chase |
| 2006/0053587 A1 | 3/2006 | Chase |
| 2006/0058158 A1 | 3/2006 | McAvoy |
| 2006/0058162 A1 | 3/2006 | Vieno et al. |
| 2006/0063644 A1 | 3/2006 | Yang |
| 2006/0075544 A1 | 4/2006 | Kriesel |
| 2006/0079800 A1 | 4/2006 | Martikka et al. |
| 2006/0100069 A1 | 5/2006 | Dibble et al. |
| 2006/0100546 A1 | 5/2006 | Silk |
| 2006/0122035 A1 | 6/2006 | Felix |
| 2006/0122038 A1 | 6/2006 | Chou Lin |
| 2006/0122044 A1 | 6/2006 | Ho |
| 2006/0123814 A1 | 6/2006 | Choi et al. |
| 2006/0128534 A1 | 6/2006 | Roque |
| 2006/0135274 A1 | 6/2006 | Henry |
| 2006/0135322 A1 | 6/2006 | Rocker |
| 2006/0148622 A1 | 7/2006 | Chen |
| 2006/0151303 A1 | 7/2006 | Motoda |
| 2006/0160665 A1 | 7/2006 | Tai |
| 2006/0160666 A1 | 7/2006 | Wang |
| 2006/0166791 A1 | 7/2006 | Liao |
| 2006/0166799 A1 | 7/2006 | Boland et al. |
| 2006/0172862 A1 | 8/2006 | Badarneh et al. |
| 2006/0189439 A1 | 8/2006 | Baudhuin |
| 2006/0189440 A1 | 8/2006 | Gravagne |
| 2006/0189462 A1 | 8/2006 | Pearson et al. |
| 2006/0194679 A1 | 8/2006 | Hatcher |
| 2006/0199706 A1 | 9/2006 | Wehrell |
| 2006/0205568 A1 | 9/2006 | Huang |
| 2006/0217236 A1 | 9/2006 | Watterson |
| 2006/0217245 A1 | 9/2006 | Golesh et al. |
| 2006/0223680 A1 | 10/2006 | Chang |
| 2006/0229163 A1 | 10/2006 | Waters |
| 2006/0229170 A1 | 10/2006 | Ozawa et al. |
| 2006/0232147 A1 | 10/2006 | Cheng |
| 2006/0234832 A1 | 10/2006 | Toyama et al. |
| 2006/0240947 A1 | 10/2006 | Qu |
| 2006/0240951 A1 | 10/2006 | Wang |
| 2006/0240959 A1 | 10/2006 | Huang |
| 2006/0244187 A1 | 11/2006 | Downey |
| 2006/0247109 A1 | 11/2006 | Powell |
| 2006/0248965 A1 | 11/2006 | Wyatt |
| 2006/0252602 A1 | 11/2006 | Brown |
| 2006/0252608 A1 | 11/2006 | Kang et al. |
| 2006/0258513 A1 | 11/2006 | Routley |
| 2006/0258515 A1 | 11/2006 | Kang et al. |
| 2006/0264306 A1 | 11/2006 | Tischler |
| 2006/0270522 A1 | 11/2006 | Yonehana et al. |
| 2006/0276306 A1 | 12/2006 | Pan et al. |
| 2006/0279294 A1 | 12/2006 | Cehelnik |
| 2006/0287089 A1 | 12/2006 | Addington et al. |
| 2006/0287147 A1 | 12/2006 | Kriesel |
| 2006/0287163 A1 | 12/2006 | Wang |
| 2006/0288846 A1 | 12/2006 | Logan |
| 2007/0004561 A1 | 1/2007 | Yoo |
| 2007/0004562 A1 | 1/2007 | Pan et al. |
| 2007/0004569 A1 | 1/2007 | Cao |
| 2007/0006489 A1 | 1/2007 | Case, Jr. et al. |
| 2007/0010383 A1 | 1/2007 | Pertegaz-Esteban |
| 2007/0015635 A1 | 1/2007 | Donner |
| 2007/0015636 A1 | 1/2007 | Molter |
| 2007/0027002 A1 | 2/2007 | Clark et al. |
| 2007/0037667 A1 | 2/2007 | Gordon |

(56) References Cited

U.S. PATENT DOCUMENTS

| | | |
|---|---|---|
| 2007/0038137 A1 | 2/2007 | Arand et al. |
| 2007/0042868 A1 | 2/2007 | Fisher |
| 2007/0049462 A1 | 3/2007 | Asukai et al. |
| 2007/0049464 A1 | 3/2007 | Chou |
| 2007/0049465 A1 | 3/2007 | Wu |
| 2007/0049466 A1 | 3/2007 | Hubbard |
| 2007/0049470 A1 | 3/2007 | Pyles et al. |
| 2007/0054790 A1 | 3/2007 | Dodge et al. |
| 2007/0060449 A1 | 3/2007 | Lo |
| 2007/0060450 A1 | 3/2007 | Lo |
| 2007/0060451 A1 | 3/2007 | Lucas |
| 2007/0066448 A1 | 3/2007 | Pan et al. |
| 2007/0072748 A1 | 3/2007 | Lee |
| 2007/0072752 A1 | 3/2007 | Koch |
| 2007/0079691 A1 | 4/2007 | Turner |
| 2007/0087908 A1 | 4/2007 | Pan et al. |
| 2007/0111858 A1 | 5/2007 | Dugan |
| 2007/0111866 A1 | 5/2007 | McVay et al. |
| 2007/0117683 A1 | 5/2007 | Ercanbrack et al. |
| 2007/0123389 A1 | 5/2007 | Martin |
| 2007/0123390 A1 | 5/2007 | Mathis |
| 2007/0123395 A1 | 5/2007 | Ellis |
| 2007/0123396 A1 | 5/2007 | Ellis |
| 2007/0131409 A1 | 6/2007 | Asahi |
| 2007/0135264 A1 | 6/2007 | Rosenberg |
| 2007/0137331 A1 | 6/2007 | Kachouh |
| 2007/0142177 A1 | 6/2007 | Simms et al. |
| 2007/0142179 A1 | 6/2007 | Terao et al. |
| 2007/0142183 A1 | 6/2007 | Chang |
| 2007/0149363 A1 | 6/2007 | Wang |
| 2007/0151489 A1 | 7/2007 | Byrne |
| 2007/0155277 A1 | 7/2007 | Amitai et al. |
| 2007/0155495 A1 | 7/2007 | Goo |
| 2007/0161468 A1 | 7/2007 | Yanagisawa et al. |
| 2007/0167292 A1 | 7/2007 | Kuo |
| 2007/0179023 A1 | 8/2007 | Dyer |
| 2007/0184953 A1 | 8/2007 | Luberski et al. |
| 2007/0190508 A1 | 8/2007 | Dalton |
| 2007/0191141 A1 | 8/2007 | Weber |
| 2007/0191190 A1 | 8/2007 | Kuo |
| 2007/0197274 A1 | 8/2007 | Dugan |
| 2007/0197345 A1 | 8/2007 | Wallace et al. |
| 2007/0197353 A1 | 8/2007 | Hundley |
| 2007/0197920 A1 | 8/2007 | Adams |
| 2007/0201727 A1 | 8/2007 | Birrell et al. |
| 2007/0204430 A1 | 9/2007 | Chase |
| 2007/0214630 A1 | 9/2007 | Kim |
| 2007/0219066 A1 | 9/2007 | Wang |
| 2007/0225119 A1 | 9/2007 | Schenk |
| 2007/0225120 A1 | 9/2007 | Schenk |
| 2007/0225126 A1 | 9/2007 | Yoo |
| 2007/0225127 A1 | 9/2007 | Pan et al. |
| 2007/0225622 A1 | 9/2007 | Huang et al. |
| 2007/0232455 A1 | 10/2007 | Hanoun |
| 2007/0232463 A1 | 10/2007 | Wu |
| 2007/0245612 A1 | 10/2007 | Tresenfeld |
| 2007/0247320 A1 | 10/2007 | Morahan |
| 2007/0249467 A1 | 10/2007 | Hong et al. |
| 2007/0254778 A1 | 11/2007 | Ashby |
| 2007/0270294 A1 | 11/2007 | Sheets |
| 2007/0270667 A1 | 11/2007 | Coppi et al. |
| 2007/0270726 A1 | 11/2007 | Chou |
| 2007/0281828 A1 | 12/2007 | Rice |
| 2007/0281831 A1 | 12/2007 | Wang |
| 2007/0284495 A1 | 12/2007 | Charles |
| 2007/0296313 A1 | 12/2007 | Wang |
| 2007/0298935 A1 | 12/2007 | Badarneh |
| 2007/0298937 A1 | 12/2007 | Shah |
| 2008/0001772 A1 | 1/2008 | Saito |
| 2008/0001866 A1 | 1/2008 | Martin |
| 2008/0004162 A1 | 1/2008 | Chen |
| 2008/0018211 A1 | 1/2008 | Dye |
| 2008/0020898 A1 | 1/2008 | Pyles et al. |
| 2008/0020902 A1 | 1/2008 | Arnold |
| 2008/0020907 A1 | 1/2008 | Lin |
| 2008/0026658 A1 | 1/2008 | Kriesel |
| 2008/0026838 A1 | 1/2008 | Dunstan et al. |
| 2008/0032864 A1 | 2/2008 | Hakki |
| 2008/0032870 A1 | 2/2008 | Wu |
| 2008/0032871 A1 | 2/2008 | Yeh |
| 2008/0039301 A1 | 2/2008 | Halbridge |
| 2008/0046246 A1 | 2/2008 | Hakki |
| 2008/0051256 A1 | 2/2008 | Ashby et al. |
| 2008/0057889 A1 | 3/2008 | Jan |
| 2008/0058169 A1 | 3/2008 | Fox |
| 2008/0058170 A1 | 3/2008 | Giannascoli et al. |
| 2008/0067302 A1 | 3/2008 | Olivera |
| 2008/0070756 A1 | 3/2008 | Chu |
| 2008/0076637 A1 | 3/2008 | Gilley et al. |
| 2008/0076972 A1 | 3/2008 | Dorogusker et al. |
| 2008/0077619 A1 | 3/2008 | Gilley et al. |
| 2008/0096745 A1 | 4/2008 | Perry |
| 2008/0103024 A1 | 5/2008 | Habing |
| 2008/0103034 A1 | 5/2008 | Mihara et al. |
| 2008/0108917 A1 | 5/2008 | Joutras et al. |
| 2008/0119333 A1 | 5/2008 | Bowser |
| 2008/0139370 A1 | 6/2008 | Charnitski |
| 2008/0153670 A1 | 6/2008 | McKirdy |
| 2008/0153682 A1 | 6/2008 | Dabbs et al. |
| 2008/0155077 A1 | 6/2008 | James |
| 2008/0161170 A1 | 7/2008 | Lumpee |
| 2008/0161653 A1 | 7/2008 | Lin et al. |
| 2008/0171640 A1 | 7/2008 | Chang |
| 2008/0171922 A1 | 7/2008 | Teller |
| 2008/0176717 A1 | 7/2008 | Wang |
| 2008/0176718 A1 | 7/2008 | Wang |
| 2008/0182724 A1 | 7/2008 | Guthrie |
| 2008/0187689 A1 | 8/2008 | Dierkens et al. |
| 2008/0188362 A1 | 8/2008 | Chen |
| 2008/0190745 A1 | 8/2008 | Taniguchi et al. |
| 2008/0191864 A1 | 8/2008 | Wolfson |
| 2008/0200287 A1 | 8/2008 | Marty et al. |
| 2008/0200310 A1 | 8/2008 | Tagliabue |
| 2008/0207407 A1 | 8/2008 | Yeh |
| 2008/0214358 A1 | 9/2008 | Ogg et al. |
| 2008/0214971 A1 | 9/2008 | Talish |
| 2008/0216717 A1 | 9/2008 | Jones |
| 2008/0228110 A1 | 9/2008 | Berme |
| 2008/0229875 A1 | 9/2008 | Ray |
| 2008/0234110 A1 | 9/2008 | Webber et al. |
| 2008/0234111 A1 | 9/2008 | Packham |
| 2008/0242511 A1 | 10/2008 | Munoz et al. |
| 2008/0242520 A1 | 10/2008 | Hubbard |
| 2008/0244870 A1 | 10/2008 | Chase |
| 2008/0245944 A1 | 10/2008 | Chase |
| 2008/0248926 A1 | 10/2008 | Cole et al. |
| 2008/0248935 A1 | 10/2008 | Solow |
| 2008/0250729 A1 | 10/2008 | Kriesel |
| 2008/0255794 A1 | 10/2008 | Levine |
| 2008/0279896 A1 | 11/2008 | Heinen et al. |
| 2008/0280732 A1 | 11/2008 | Jones |
| 2008/0280733 A1 | 11/2008 | Dickie et al. |
| 2008/0280734 A1 | 11/2008 | Liu |
| 2008/0280735 A1 | 11/2008 | Dickie et al. |
| 2008/0286068 A1* | 11/2008 | Yamanaka ............... F16C 35/00 411/360 |
| 2008/0287262 A1 | 11/2008 | Chou |
| 2008/0300110 A1 | 12/2008 | Smith et al. |
| 2008/0300115 A1 | 12/2008 | Erlandson |
| 2008/0300914 A1 | 12/2008 | Karkanias et al. |
| 2008/0312047 A1 | 12/2008 | Feng |
| 2008/0318737 A1 | 12/2008 | Chu |
| 2009/0001831 A1 | 1/2009 | Cho et al. |
| 2009/0011907 A1 | 1/2009 | Radow |
| 2009/0023553 A1 | 1/2009 | Shim |
| 2009/0027925 A1 | 1/2009 | Kanouda et al. |
| 2009/0029831 A1 | 1/2009 | Weier |
| 2009/0036276 A1 | 2/2009 | Loach |
| 2009/0042696 A1 | 2/2009 | Wang |
| 2009/0042698 A1 | 2/2009 | Wang |
| 2009/0048073 A1 | 2/2009 | Roimicher |
| 2009/0048079 A1 | 2/2009 | Nalley |
| 2009/0048493 A1 | 2/2009 | James et al. |
| 2009/0053682 A1 | 2/2009 | Stern |

(56) References Cited

U.S. PATENT DOCUMENTS

| | | |
|---|---|---|
| 2009/0054214 A1 | 2/2009 | Kadar |
| 2009/0054751 A1 | 2/2009 | Babashan et al. |
| 2009/0069159 A1 | 3/2009 | Wang |
| 2009/0069722 A1 | 3/2009 | Flaction et al. |
| 2009/0075781 A1 | 3/2009 | Schwarzberg et al. |
| 2009/0075784 A1 | 3/2009 | Hoggan |
| 2009/0080808 A1 | 3/2009 | Hagen |
| 2009/0093347 A1 | 4/2009 | Wang |
| 2009/0100718 A1 | 4/2009 | Gerber |
| 2009/0105047 A1 | 4/2009 | Guidi et al. |
| 2009/0105052 A1 | 4/2009 | Dalebout et al. |
| 2009/0105548 A1 | 4/2009 | Bart |
| 2009/0108698 A1 | 4/2009 | Guan et al. |
| 2009/0111664 A1 | 4/2009 | Kau |
| 2009/0111665 A1 | 4/2009 | Wang |
| 2009/0111666 A1 | 4/2009 | Wang |
| 2009/0111670 A1 | 4/2009 | Williams |
| 2009/0118098 A1 | 5/2009 | Yeh |
| 2009/0119032 A1 | 5/2009 | Meyer |
| 2009/0120208 A1 | 5/2009 | Meyer |
| 2009/0120210 A1 | 5/2009 | Phillips et al. |
| 2009/0120225 A1 | 5/2009 | Saya et al. |
| 2009/0124463 A1 | 5/2009 | Lin |
| 2009/0124464 A1 | 5/2009 | Kastelic |
| 2009/0124465 A1 | 5/2009 | Wang |
| 2009/0124466 A1 | 5/2009 | Zhang |
| 2009/0128516 A1 | 5/2009 | Rimon et al. |
| 2009/0131225 A1 | 5/2009 | Burdea |
| 2009/0144639 A1 | 6/2009 | Nims et al. |
| 2009/0156363 A1 | 6/2009 | Guidi et al. |
| 2009/0156364 A1 | 6/2009 | Simeoni |
| 2009/0158871 A1 | 6/2009 | Chuo |
| 2009/0163326 A1 | 6/2009 | Wang |
| 2009/0163327 A1 | 6/2009 | Huang et al. |
| 2009/0170667 A1 | 7/2009 | Irving et al. |
| 2009/0170672 A1 | 7/2009 | McMullen |
| 2009/0176625 A1 | 7/2009 | Giannelli et al. |
| 2009/0176628 A1 | 7/2009 | Radding et al. |
| 2009/0180646 A1 | 7/2009 | Vulfson et al. |
| 2009/0181829 A1 | 7/2009 | Wu |
| 2009/0181830 A1 | 7/2009 | Wu |
| 2009/0181831 A1 | 7/2009 | Kuo |
| 2009/0181833 A1 | 7/2009 | Cassidy |
| 2009/0197740 A1 | 8/2009 | Julskjaer et al. |
| 2009/0209393 A1 | 8/2009 | Crater et al. |
| 2009/0221405 A1 | 9/2009 | Wang |
| 2009/0221407 A1 | 9/2009 | Hauk |
| 2009/0224618 A1* | 9/2009 | Bhatti ............... H02K 5/1672 310/90 |
| 2009/0227424 A1 | 9/2009 | Hirata et al. |
| 2009/0227432 A1 | 9/2009 | Pacheco |
| 2009/0232420 A1 | 9/2009 | Eisenberg et al. |
| 2009/0240858 A1 | 9/2009 | Takebayashi |
| 2009/0246746 A1 | 10/2009 | Roerdink et al. |
| 2009/0253554 A1 | 10/2009 | McIntosh |
| 2009/0258710 A1 | 10/2009 | Quatrochi et al. |
| 2009/0258763 A1 | 10/2009 | Richter |
| 2009/0269728 A1 | 10/2009 | Verstegen et al. |
| 2009/0286653 A1 | 11/2009 | Wiber |
| 2009/0293319 A1 | 12/2009 | Avni |
| 2009/0312158 A1 | 12/2009 | Trevino et al. |
| 2010/0003871 A1* | 1/2010 | Wishart ............... B63H 5/10 440/6 |
| 2010/0015585 A1 | 1/2010 | Baker |
| 2010/0016127 A1 | 1/2010 | Farnsworth et al. |
| 2010/0022354 A1 | 1/2010 | Fisher |
| 2010/0024590 A1 | 2/2010 | O'Neill |
| 2010/0032533 A1 | 2/2010 | Chen et al. |
| 2010/0034665 A1 | 2/2010 | Zhong et al. |
| 2010/0035726 A1 | 2/2010 | Fisher et al. |
| 2010/0041516 A1 | 2/2010 | Kodama |
| 2010/0048358 A1 | 2/2010 | Tchao et al. |
| 2010/0062904 A1 | 3/2010 | Crawford et al. |
| 2010/0062914 A1 | 3/2010 | Splane |
| 2010/0063426 A1 | 3/2010 | Planke |
| 2010/0064255 A1 | 3/2010 | Rottler et al. |
| 2010/0079291 A1 | 4/2010 | Kroll et al. |
| 2010/0081548 A1 | 4/2010 | Labedz |
| 2010/0087298 A1 | 4/2010 | Zaccherini |
| 2010/0099541 A1 | 4/2010 | Patel |
| 2010/0105527 A1 | 4/2010 | Johnson |
| 2010/0113223 A1 | 5/2010 | Chiles et al. |
| 2010/0125026 A1 | 5/2010 | Zavadsky et al. |
| 2010/0130337 A1 | 5/2010 | Stewart |
| 2010/0137105 A1 | 6/2010 | McLaughlin |
| 2010/0144501 A1 | 6/2010 | Berhanu |
| 2010/0156625 A1 | 6/2010 | Ruha |
| 2010/0167883 A1 | 7/2010 | Grind |
| 2010/0173276 A1 | 7/2010 | Vasin |
| 2010/0173755 A1 | 7/2010 | P Erez De Lazarraga |
| 2010/0175634 A1 | 7/2010 | Chang et al. |
| 2010/0184568 A1 | 7/2010 | Schippers |
| 2010/0190615 A1 | 7/2010 | Baker et al. |
| 2010/0192715 A1 | 8/2010 | Vauchel et al. |
| 2010/0197462 A1 | 8/2010 | Piane, Jr. |
| 2010/0197465 A1 | 8/2010 | Stevenson |
| 2010/0210418 A1 | 8/2010 | Park |
| 2010/0216599 A1 | 8/2010 | Watterson |
| 2010/0216600 A1 | 8/2010 | Noffsinger |
| 2010/0216607 A1 | 8/2010 | Mueller |
| 2010/0222179 A1 | 9/2010 | Temple et al. |
| 2010/0222182 A1 | 9/2010 | Park |
| 2010/0227740 A1 | 9/2010 | Liu |
| 2010/0235667 A1 | 9/2010 | Mucignat et al. |
| 2010/0240458 A1 | 9/2010 | Gaiba et al. |
| 2010/0242246 A1 | 9/2010 | Dalebout et al. |
| 2010/0248899 A1 | 9/2010 | Bedell et al. |
| 2010/0255959 A1 | 10/2010 | Dalebout et al. |
| 2010/0267524 A1 | 10/2010 | Stewart et al. |
| 2010/0279822 A1 | 11/2010 | Ford |
| 2010/0285933 A1 | 11/2010 | Nalley |
| 2010/0289466 A1 | 11/2010 | Telefus |
| 2010/0289772 A1 | 11/2010 | Miller |
| 2010/0292050 A1 | 11/2010 | DiBenedetto et al. |
| 2010/0304931 A1 | 12/2010 | Stumpf |
| 2010/0304932 A1 | 12/2010 | Kolman et al. |
| 2010/0311552 A1 | 12/2010 | Sumners |
| 2010/0320956 A1 | 12/2010 | Lumsden et al. |
| 2011/0003664 A1 | 1/2011 | Richard |
| 2011/0021319 A1 | 1/2011 | Nissila et al. |
| 2011/0028282 A1 | 2/2011 | Sbragia |
| 2011/0034300 A1 | 2/2011 | Hall |
| 2011/0054359 A1 | 3/2011 | Sazonov et al. |
| 2011/0056328 A1 | 3/2011 | Ko |
| 2011/0061840 A1 | 3/2011 | Goldmann |
| 2011/0065371 A1 | 3/2011 | Joanne |
| 2011/0065373 A1 | 3/2011 | Goldmann |
| 2011/0067361 A1 | 3/2011 | Sloan |
| 2011/0073743 A1 | 3/2011 | Shamie |
| 2011/0077055 A1 | 3/2011 | Pakula et al. |
| 2011/0082013 A1 | 4/2011 | Bastian |
| 2011/0086707 A1 | 4/2011 | Loveland |
| 2011/0087137 A1 | 4/2011 | Hanoun |
| 2011/0087445 A1 | 4/2011 | Sobolewski |
| 2011/0087446 A1 | 4/2011 | Redmond |
| 2011/0093100 A1 | 4/2011 | Ramsay |
| 2011/0098157 A1 | 4/2011 | Whalen et al. |
| 2011/0098615 A1 | 4/2011 | Whalen et al. |
| 2011/0109283 A1 | 5/2011 | Kapels et al. |
| 2011/0112771 A1 | 5/2011 | French |
| 2011/0118089 A1 | 5/2011 | Ellis |
| 2011/0124466 A1 | 5/2011 | Nishimura |
| 2011/0124476 A1 | 5/2011 | Holley |
| 2011/0131005 A1 | 6/2011 | Ueshima et al. |
| 2011/0136627 A1 | 6/2011 | Williams |
| 2011/0143769 A1 | 6/2011 | Jones et al. |
| 2011/0143898 A1 | 6/2011 | Trees |
| 2011/0149459 A1* | 6/2011 | Baumann ............... H02K 11/40 361/212 |
| 2011/0152037 A1 | 6/2011 | Tsou |
| 2011/0152038 A1 | 6/2011 | Freitag |
| 2011/0152039 A1 | 6/2011 | Hendrickson et al. |
| 2011/0152635 A1 | 6/2011 | Morris et al. |
| 2011/0165995 A1 | 7/2011 | Paulus |

(56) References Cited

U.S. PATENT DOCUMENTS

| | | |
|---|---|---|
| 2011/0172060 A1 | 7/2011 | Morales et al. |
| 2011/0175744 A1 | 7/2011 | Englert et al. |
| 2011/0181420 A1 | 7/2011 | Mack et al. |
| 2011/0188269 A1 | 8/2011 | Hosotani |
| 2011/0197157 A1 | 8/2011 | Hoffman et al. |
| 2011/0199799 A1 | 8/2011 | Hui et al. |
| 2011/0201481 A1 | 8/2011 | Lo |
| 2011/0202236 A1 | 8/2011 | Galasso et al. |
| 2011/0205164 A1 | 8/2011 | Hansen et al. |
| 2011/0221672 A1 | 9/2011 | Osterhout et al. |
| 2011/0247530 A1 | 10/2011 | Coffman |
| 2011/0252597 A1 | 10/2011 | Burris et al. |
| 2011/0257797 A1 | 10/2011 | Burris et al. |
| 2011/0269517 A1 | 11/2011 | Englert et al. |
| 2011/0269604 A1 | 11/2011 | Tseng |
| 2011/0275482 A1 | 11/2011 | Brodess et al. |
| 2011/0275489 A1 | 11/2011 | Apau |
| 2011/0275499 A1 | 11/2011 | Eschenbach |
| 2011/0281691 A1 | 11/2011 | Ellis |
| 2011/0283188 A1 | 11/2011 | Farrenkopf et al. |
| 2011/0283231 A1 | 11/2011 | Richstein et al. |
| 2011/0308919 A1 | 12/2011 | Hahn |
| 2011/0312473 A1 | 12/2011 | Chu et al. |
| 2011/0319229 A1 | 12/2011 | Corbalis et al. |
| 2012/0004075 A1 | 1/2012 | Kissel et al. |
| 2012/0004080 A1 | 1/2012 | Webb |
| 2012/0010053 A1 | 1/2012 | Bayerlein et al. |
| 2012/0015778 A1 | 1/2012 | Lee et al. |
| 2012/0015779 A1 | 1/2012 | Powch et al. |
| 2012/0015784 A1 | 1/2012 | Reed |
| 2012/0020135 A1 | 1/2012 | McCune |
| 2012/0021873 A1 | 1/2012 | Brunner |
| 2012/0021875 A1 | 1/2012 | Karl |
| 2012/0032896 A1 | 2/2012 | Vesely |
| 2012/0071301 A1 | 3/2012 | Kaylor et al. |
| 2012/0088633 A1 | 4/2012 | Crafton |
| 2012/0088634 A1 | 4/2012 | Heidecke |
| 2012/0088640 A1 | 4/2012 | Wissink |
| 2012/0116684 A1 | 5/2012 | Ingrassia et al. |
| 2012/0132877 A1 | 5/2012 | Wang |
| 2012/0133192 A1 | 5/2012 | Simpson |
| 2012/0165162 A1 | 6/2012 | Lu |
| 2012/0169603 A1 | 7/2012 | Peterson et al. |
| 2012/0174833 A1 | 7/2012 | Early |
| 2012/0178590 A1 | 7/2012 | Lu |
| 2012/0187012 A1 | 7/2012 | TeVault et al. |
| 2012/0190502 A1 | 7/2012 | Paulus et al. |
| 2012/0207420 A1* | 8/2012 | Bostwick ............... F16C 35/067 384/537 |
| 2012/0212505 A1 | 8/2012 | Burroughs et al. |
| 2012/0218184 A1 | 8/2012 | Wissmar |
| 2012/0230504 A1 | 9/2012 | Kuroda |
| 2012/0237911 A1 | 9/2012 | Watterson |
| 2012/0242774 A1 | 9/2012 | Numano et al. |
| 2012/0248263 A1 | 10/2012 | Grotenhuis |
| 2012/0252580 A1 | 10/2012 | Dugan |
| 2012/0253234 A1 | 10/2012 | Yang et al. |
| 2012/0253489 A1 | 10/2012 | Dugan |
| 2012/0258433 A1 | 10/2012 | Hope et al. |
| 2012/0263892 A1 | 10/2012 | Rodgers |
| 2012/0270705 A1 | 10/2012 | Lo |
| 2012/0271143 A1 | 10/2012 | Aragones et al. |
| 2012/0277040 A1 | 11/2012 | Vincent et al. |
| 2012/0277891 A1 | 11/2012 | Aragones et al. |
| 2012/0293141 A1 | 11/2012 | Zhang et al. |
| 2012/0295774 A1 | 11/2012 | Dalebout et al. |
| 2012/0296455 A1 | 11/2012 | Ohnemus et al. |
| 2012/0298017 A1 | 11/2012 | Chen |
| 2012/0300515 A1 | 11/2012 | Carletti et al. |
| 2012/0319604 A1 | 12/2012 | Walters |
| 2012/0326873 A1 | 12/2012 | Utter, II |
| 2013/0002533 A1 | 1/2013 | Burroughs et al. |
| 2013/0004010 A1 | 1/2013 | Royer |
| 2013/0009993 A1 | 1/2013 | Horseman |
| 2013/0018494 A1 | 1/2013 | Amini |
| 2013/0034671 A1 | 2/2013 | George |
| 2013/0035612 A1 | 2/2013 | Mason et al. |
| 2013/0040783 A1 | 2/2013 | Duda et al. |
| 2013/0041590 A1 | 2/2013 | Burich et al. |
| 2013/0041617 A1 | 2/2013 | Pease et al. |
| 2013/0044521 A1 | 2/2013 | Zhao et al. |
| 2013/0050973 A1 | 2/2013 | Rohrbach |
| 2013/0053222 A1 | 2/2013 | Lo |
| 2013/0053990 A1 | 2/2013 | Ackland |
| 2013/0092647 A1 | 4/2013 | Chen |
| 2013/0093271 A1 | 4/2013 | Luke et al. |
| 2013/0095959 A1 | 4/2013 | Marty |
| 2013/0095978 A1 | 4/2013 | Sauter |
| 2013/0123083 A1 | 5/2013 | Sip |
| 2013/0130868 A1 | 5/2013 | Hou |
| 2013/0130869 A1 | 5/2013 | Hou |
| 2013/0139736 A1 | 6/2013 | Flaherty |
| 2013/0141235 A1 | 6/2013 | Utter, II |
| 2013/0147411 A1 | 6/2013 | Pang et al. |
| 2013/0150214 A1 | 6/2013 | Wu |
| 2013/0154441 A1 | 6/2013 | Redmond |
| 2013/0165195 A1 | 6/2013 | Watterson |
| 2013/0165297 A1 | 6/2013 | Daly |
| 2013/0172152 A1 | 7/2013 | Watterson |
| 2013/0172153 A1 | 7/2013 | Watterson |
| 2013/0178334 A1 | 7/2013 | Brammer |
| 2013/0178768 A1 | 7/2013 | Dalebout |
| 2013/0182781 A1 | 7/2013 | Matsutani |
| 2013/0185003 A1 | 7/2013 | Carbeck et al. |
| 2013/0190136 A1 | 7/2013 | Watterson |
| 2013/0190143 A1 | 7/2013 | Greenhill et al. |
| 2013/0190657 A1 | 7/2013 | Flaction et al. |
| 2013/0196298 A1 | 8/2013 | Watterson |
| 2013/0196821 A1 | 8/2013 | Watterson et al. |
| 2013/0196822 A1 | 8/2013 | Watterson et al. |
| 2013/0196826 A1 | 8/2013 | Colledge |
| 2013/0196827 A1 | 8/2013 | Chang |
| 2013/0211858 A1 | 8/2013 | Ohnemus et al. |
| 2013/0218585 A1 | 8/2013 | Watterson |
| 2013/0228063 A1 | 9/2013 | Turner |
| 2013/0228422 A1 | 9/2013 | Mathieu |
| 2013/0231219 A1 | 9/2013 | Huang |
| 2013/0237383 A1 | 9/2013 | Chen |
| 2013/0244836 A1 | 9/2013 | Maughan |
| 2013/0245966 A1 | 9/2013 | Burroughs et al. |
| 2013/0263418 A1 | 10/2013 | Johnson, Jr. |
| 2013/0267383 A1 | 10/2013 | Watterson |
| 2013/0267386 A1 | 10/2013 | Her |
| 2013/0268101 A1 | 10/2013 | Brammer |
| 2013/0274040 A1 | 10/2013 | Coza et al. |
| 2013/0274067 A1 | 10/2013 | Watterson et al. |
| 2013/0274069 A1 | 10/2013 | Watterson et al. |
| 2013/0274071 A1 | 10/2013 | Wang |
| 2013/0280682 A1 | 10/2013 | Levine et al. |
| 2013/0281241 A1 | 10/2013 | Watterson |
| 2013/0324368 A1 | 12/2013 | Aragones et al. |
| 2013/0325394 A1 | 12/2013 | Yuen et al. |
| 2013/0338802 A1 | 12/2013 | Winsper et al. |
| 2013/0346043 A1 | 12/2013 | Mewes et al. |
| 2014/0011645 A1 | 1/2014 | Johnson et al. |
| 2014/0024499 A1 | 1/2014 | Watterson |
| 2014/0026788 A1 | 1/2014 | Kallio, III et al. |
| 2014/0031703 A1 | 1/2014 | Rayner et al. |
| 2014/0039840 A1 | 2/2014 | Yuen et al. |
| 2014/0052280 A1 | 2/2014 | Yuen et al. |
| 2014/0056461 A1 | 2/2014 | Afshar |
| 2014/0073488 A1 | 3/2014 | Wu |
| 2014/0073970 A1 | 3/2014 | Ashby |
| 2014/0080678 A1 | 3/2014 | Wu |
| 2014/0085077 A1 | 3/2014 | Luna et al. |
| 2014/0100464 A1 | 4/2014 | Kaleal et al. |
| 2014/0102340 A1 | 4/2014 | Kooistra |
| 2014/0121066 A1 | 5/2014 | Huang et al. |
| 2014/0121071 A1 | 5/2014 | Strom et al. |
| 2014/0135173 A1 | 5/2014 | Watterson |
| 2014/0139450 A1 | 5/2014 | Levesque et al. |
| 2014/0156228 A1 | 6/2014 | Molettiere et al. |
| 2014/0167539 A1* | 6/2014 | Neuhaus ............... H02K 7/06 310/80 |

(56) References Cited

U.S. PATENT DOCUMENTS

| | | |
|---|---|---|
| 2014/0171266 A1 | 6/2014 | Hawkins, III et al. |
| 2014/0182401 A1* | 7/2014 | Ishii .................. B62D 5/0409 74/89.14 |
| 2014/0187383 A1 | 7/2014 | Martin |
| 2014/0195103 A1 | 7/2014 | Nassef |
| 2014/0221160 A1 | 8/2014 | Hardy et al. |
| 2014/0222173 A1 | 8/2014 | Giedwoyn et al. |
| 2014/0232303 A1 | 8/2014 | Simofi-Ilyes et al. |
| 2014/0265690 A1 | 9/2014 | Henderson |
| 2014/0270375 A1 | 9/2014 | Canavan et al. |
| 2014/0274564 A1 | 9/2014 | Greenbaum |
| 2014/0274574 A1 | 9/2014 | Shorten et al. |
| 2014/0274579 A1 | 9/2014 | Olson |
| 2014/0287884 A1 | 9/2014 | Buchanan |
| 2014/0309085 A1 | 10/2014 | Watterson et al. |
| 2014/0358473 A1 | 12/2014 | Goel et al. |
| 2014/0360413 A1 | 12/2014 | Schenk |
| 2015/0001048 A1 | 1/2015 | Koppes et al. |
| 2015/0003621 A1 | 1/2015 | Trammell |
| 2015/0004579 A1 | 1/2015 | Shelton |
| 2015/0016623 A1 | 1/2015 | Trammell |
| 2015/0044648 A1 | 2/2015 | White et al. |
| 2015/0048807 A1 | 2/2015 | Fan et al. |
| 2015/0065273 A1 | 3/2015 | Lake |
| 2015/0065301 A1 | 3/2015 | Oteman |
| 2015/0105220 A1 | 4/2015 | Hong |
| 2015/0182779 A1 | 7/2015 | Dalebout |
| 2015/0182781 A1 | 7/2015 | Watterson |
| 2015/0192929 A1 | 7/2015 | Rihn et al. |
| 2015/0199494 A1 | 7/2015 | Koduri et al. |
| 2015/0201722 A1 | 7/2015 | Brouard |
| 2015/0202487 A1 | 7/2015 | Wu |
| 2015/0209610 A1 | 7/2015 | Dalebout et al. |
| 2015/0209617 A1 | 7/2015 | Hsiao |
| 2015/0238817 A1 | 8/2015 | Watterson |
| 2015/0246751 A1 | 9/2015 | Spivack et al. |
| 2015/0250304 A1 | 9/2015 | Dalebout |
| 2015/0250418 A1 | 9/2015 | Ashby |
| 2015/0251047 A1 | 9/2015 | Maanitty |
| 2015/0251048 A1 | 9/2015 | Dalebout |
| 2015/0251055 A1 | 9/2015 | Ashby |
| 2015/0253210 A1 | 9/2015 | Ashby et al. |
| 2015/0253735 A1 | 9/2015 | Watterson |
| 2015/0253736 A1 | 9/2015 | Watterson |
| 2015/0258560 A1 | 9/2015 | Ashby |
| 2015/0265903 A1 | 9/2015 | Kolen et al. |
| 2015/0295397 A1 | 10/2015 | Lin et al. |
| 2015/0314184 A1 | 11/2015 | Moya Saez |
| 2015/0328973 A1* | 11/2015 | Wardle .................. B60K 6/387 192/63 |
| 2015/0346994 A1 | 12/2015 | Chanyontpatanakul |
| 2015/0352396 A1 | 12/2015 | Dalebout |
| 2015/0352401 A1 | 12/2015 | Johnson |
| 2015/0352402 A1 | 12/2015 | Arnold et al. |
| 2015/0367158 A1 | 12/2015 | Pretz et al. |
| 2015/0367176 A1 | 12/2015 | Bejestan et al. |
| 2016/0008650 A1 | 1/2016 | Jue et al. |
| 2016/0016035 A1 | 1/2016 | Hao |
| 2016/0027325 A1 | 1/2016 | Malhotra |
| 2016/0038785 A1 | 2/2016 | Netter |
| 2016/0047446 A1 | 2/2016 | Hung |
| 2016/0058335 A1 | 3/2016 | Ashby |
| 2016/0063615 A1 | 3/2016 | Watterson |
| 2016/0066818 A1 | 3/2016 | Cowley et al. |
| 2016/0092909 A1 | 3/2016 | Watterson |
| 2016/0096064 A1 | 4/2016 | Gatti |
| 2016/0101311 A1 | 4/2016 | Workman |
| 2016/0107065 A1 | 4/2016 | Brammer |
| 2016/0121074 A1 | 5/2016 | Ashby |
| 2016/0121161 A1 | 5/2016 | Mountain |
| 2016/0148535 A1 | 5/2016 | Ashby |
| 2016/0148536 A1 | 5/2016 | Ashby |
| 2016/0158595 A1 | 6/2016 | Dalebout |
| 2016/0193518 A1 | 7/2016 | Baxter |
| 2016/0206922 A1 | 7/2016 | Dalebout et al. |
| 2016/0211841 A1 | 7/2016 | Harrison |
| 2016/0219968 A1 | 8/2016 | Martin |
| 2016/0250519 A1 | 9/2016 | Watterson |
| 2016/0253918 A1 | 9/2016 | Watterson |
| 2016/0263426 A1 | 9/2016 | Mueller et al. |
| 2016/0303421 A1 | 10/2016 | Tyger et al. |
| 2016/0317861 A1 | 11/2016 | Dalebout |
| 2016/0346595 A1 | 12/2016 | Dalebout et al. |
| 2016/0367851 A1 | 12/2016 | Astilean et al. |
| 2017/0036053 A1 | 2/2017 | Smith et al. |
| 2017/0056711 A1 | 3/2017 | Dalebout et al. |
| 2017/0056715 A1 | 3/2017 | Dalebout et al. |
| 2017/0056726 A1 | 3/2017 | Dalebout et al. |
| 2017/0068782 A1 | 3/2017 | Pillai et al. |
| 2017/0113093 A1 | 4/2017 | Bellavista et al. |
| 2017/0120102 A1 | 5/2017 | Chen |
| 2017/0124912 A1 | 5/2017 | Ashby et al. |
| 2017/0128784 A1 | 5/2017 | Molins et al. |
| 2017/0136280 A1 | 5/2017 | Lee |
| 2017/0136288 A1 | 5/2017 | Huang |
| 2017/0136289 A1 | 5/2017 | Frank |
| 2017/0136291 A1 | 5/2017 | Huang |
| 2017/0136339 A1 | 5/2017 | Habiche |
| 2017/0165523 A1 | 6/2017 | Chou |
| 2017/0189745 A1 | 7/2017 | Hamilton et al. |
| 2017/0193578 A1 | 7/2017 | Watterson |
| 2017/0216660 A1 | 8/2017 | Lernihan |
| 2017/0266481 A1 | 9/2017 | Dalebout |
| 2017/0266483 A1 | 9/2017 | Dalebout et al. |
| 2017/0266489 A1 | 9/2017 | Douglass et al. |
| 2017/0266532 A1 | 9/2017 | Watterson |
| 2017/0266533 A1 | 9/2017 | Dalebout |
| 2017/0266534 A1 | 9/2017 | Watterson |
| 2017/0266535 A1 | 9/2017 | Watterson |
| 2017/0270820 A1 | 9/2017 | Ashby |
| 2017/0274242 A1 | 9/2017 | Corbalis |
| 2017/0326411 A1 | 11/2017 | Watterson |
| 2017/0340917 A1 | 11/2017 | Chang |
| 2017/0368442 A1 | 12/2017 | Baudhuin |
| 2018/0001135 A1 | 1/2018 | Powell |
| 2018/0036585 A1 | 2/2018 | Powell |
| 2018/0056111 A1 | 3/2018 | Chiang et al. |
| 2018/0085630 A1 | 3/2018 | Capell et al. |
| 2018/0089396 A1 | 3/2018 | Capell et al. |
| 2018/0092603 A1 | 4/2018 | Duan et al. |
| 2018/0099116 A1 | 4/2018 | Ashby |
| 2018/0099179 A1 | 4/2018 | Chatterton et al. |
| 2018/0099180 A1 | 4/2018 | Wilkinson |
| 2018/0099181 A1 | 4/2018 | Powell et al. |
| 2018/0104533 A1 | 4/2018 | Powell et al. |
| 2018/0111018 A1 | 4/2018 | Lee |
| 2018/0111034 A1 | 4/2018 | Watterson |
| 2018/0117383 A1 | 5/2018 | Workman |
| 2018/0117385 A1 | 5/2018 | Watterson et al. |
| 2018/0117388 A1 | 5/2018 | Porter |
| 2018/0117393 A1 | 5/2018 | Ercanbrack |
| 2018/0117419 A1 | 5/2018 | Jackson |
| 2018/0147440 A1 | 5/2018 | Lin |
| 2018/0154205 A1 | 6/2018 | Watterson |
| 2018/0154207 A1 | 6/2018 | Hochstrasser |
| 2018/0154208 A1 | 6/2018 | Powell et al. |
| 2018/0154209 A1 | 6/2018 | Watterson |
| 2018/0200566 A1 | 7/2018 | Weston |
| 2019/0058370 A1 | 2/2019 | Tinney |
| 2019/0080624 A1 | 3/2019 | Watterson |
| 2019/0151698 A1 | 5/2019 | Olson |
| 2019/0168072 A1 | 6/2019 | Brammer |
| 2019/0178313 A1 | 6/2019 | Wrobel |
| 2019/0192898 A1 | 6/2019 | Dalebout |
| 2019/0192952 A1 | 6/2019 | Powell |
| 2019/0209893 A1 | 7/2019 | Watterson |
| 2019/0223612 A1 | 7/2019 | Watterson |
| 2019/0232112 A1 | 8/2019 | Dalebout |
| 2019/0269958 A1 | 9/2019 | Dalebout et al. |
| 2019/0269971 A1 | 9/2019 | Capell et al. |
| 2019/0275366 A1 | 9/2019 | Powell |
| 2019/0282852 A1 | 9/2019 | Dalebout |
| 2019/0328079 A1 | 10/2019 | Ashby et al. |
| 2019/0329091 A1 | 10/2019 | Powell et al. |

(56) References Cited

U.S. PATENT DOCUMENTS

2019/0376585 A1  12/2019  Buchanan
2020/0009417 A1  1/2020  Dalebout
2020/0016459 A1  1/2020  Smith

FOREIGN PATENT DOCUMENTS

| | | |
|---|---|---|
| CN | 101079566 | 12/2009 |
| CN | 102710084 | 10/2012 |
| CN | 105340157 | 2/2016 |
| CN | 205725228 | 11/2016 |
| EP | 425182 | 5/1991 |
| EP | 1710894 | 10/2006 |
| GB | 1538178 | 1/1979 |
| JP | 5612368 | 10/2014 |
| TW | 392386 | 6/2000 |
| TW | 201330462 | 7/2013 |
| WO | 2003003543 | 1/2003 |
| WO | WO2011/108329 | 9/2011 |

OTHER PUBLICATIONS

U.S. Appl. No. 16/750,925, filed Jan. 25, 2019, Ryan Silcock.
U.S. Appl. No. 16/780,765, filed Feb. 3, 2020, Scott R. Watterson.
U.S. Appl. No. 16/797,850, filed Feb. 11, 2020, Scott R. Watterson.
U.S. Appl. No. 62/914,007, filed Oct. 11, 2019, Jared Willardson.
U.S. Appl. No. 62/934,291, filed Nov. 12, 2019, William T. Dalebout.
U.S. Appl. No. 62/934,297, filed Nov. 12, 2019, William T. Dalebout.
English Translation of Taiwan Office Action and Search Report issued in PCT application No. 108119423 dated Dec. 24, 2019.
U.S. Appl. No. 13/088,007, filed Apr. 15, 2011, Scott R. Watterson.
U.S. Appl. No. 15/821,386, filed Nov. 22, 2017, ICON Healty & Fitness, Inc.
U.S. Appl. No. 15/973,176, filed May 7, 2018, Melanie Douglass.
U.S. Appl. No. 16/506,085, filed Jul. 9, 2019, ICON Health & Fitness, Inc.
U.S. Appl. No. 16/572,272, filed Sep. 16, 2019, ICON Health & Fitness, Inc.
U.S. Appl. No. 29/702,127, filed Sep. 16, 2019, ICON Health & Fitness, Inc.
U.S. Appl. No. 62/697,833, filed Jul. 13, 2018, ICON Health & Fitness, Inc.
U.S. Appl. No. 62/796,952, filed Jan. 25, 2019, ICON Health & Fitness, Inc.
U.S. Appl. No. 62/804,146, filed Feb. 11, 2019, ICON Health & Fitness, Inc.
U.S. Appl. No. 62/804,685, filed Feb. 12, 2019, ICON Health & Fitness, Inc.
U.S. Appl. No. 62/842,118, filed May 23, 2019, ICON Health & Fitness, Inc.
U.S. Appl. No. 62/852,118, filed May 22, 2019, David Hays.
U.S. Appl. No. 62/866,576, filed Jun. 25, 2019, ICON Health & Fitness, Inc.
U.S. Appl. No. 62/887,391, filed Aug. 15, 2019, ICON Health & Fitness, Inc.
U.S. Appl. No. 62/887,398, filed Aug. 15, 2019, ICON Health & Fitness, Inc.
U.S. Appl. No. 62/897,113, filed Sep. 9, 2019, ICON Health & Fitness, Inc.
English Translation of Taiwan Office Action and Search Report issued in PCT application No. 107128125 dated Aug. 30, 2019.
International Search Report and Written Opinion issued in PCT application No. PCT/US2018/046670 dated Dec. 5, 2018.
Supplementary Partial European Search Report for EP Application No. 18846454.9, dated May 25, 2021, 25 pages.
English translation of Search Report for TW Application No. 107128125, dated Apr. 21, 2021, 16 pages.
English translation of Search Report for TW Application No. 109114191, dated Feb. 4, 2021, 23 pages.
Search Report for Taiwanese Patent Application No. 110106018, dated Nov. 23, 2021, 8 pages with English translation.

\* cited by examiner

SYSTEMS AND METHODS FOR AXIAL IMPACT RESISTANCE IN ELECTRIC MOTORS

CROSS-REFERENCE TO RELATED APPLICATIONS

This application claims priority to provisional patent application number 62/546,547 entitled "SYSTEMS AND METHODS FOR AXIAL IMPACT RESISTANCE IN ELECTRIC MOTORS" filed Aug. 16, 2017 and provisional patent application number 62/553,591 entitled "SYSTEMS AND METHODS FOR AXIAL IMPACT RESISTANCE IN ELECTRIC MOTORS" filed Sep. 1, 2017, which applications are herein incorporated by reference for all that they disclose.

BACKGROUND

Technical Field

This disclosure generally relates to electric motors. More particularly, this disclosure generally relates to one or more features on or in contact with the rotor of an electric motor to protect the electric motor from damage due to axial impacts.

Background and Relevant Art

Electric motors operate by rotating a rotor relative to a stator to generate torque. The rotor conventionally rotates relative to the stator and around a longitudinal axis on a bearing or set of bearings. Force applied to the bearings in the longitudinal direction can compress the bearings perpendicular to the intended operation direction and damage the bearings.

Common sources of longitudinal force include mishandling during shipping, storage, or installation of the electric motor, such as dropping the motor on an end. Because the bearings inside the motor are constructed to have very tight tolerances to reduce vibration, even small deformation to the bearings or race due to the impact from a drop may introduce vibrations into the bearings and cause premature failure or unintended noise during operation. Example electric motor assemblies are taught by U.S. Pat. No. 3,607,816 to Ryder and U.S. Pat. No. 3,430,084 to Hall.

BRIEF SUMMARY

In some embodiments, a system for providing torque includes a stator, a rotor, an axle, an endcap, an endbell, and a compliant member. The stator has a first end and a second end opposite the first end with a chamber therein. The rotor is at least partially positioned in the chamber and rotatable relative to the stator about a longitudinal axis. The axle has a first end, a second end opposite the first end, and supports the rotor. The endcap is located at a first end of the stator and adjacent to the first end of the axle, and the endbell is located at the second end of the stator and adjacent to the second end of the axle. The compliant member is positioned relative to the axle between a portion of the rotor and one of the endbell and the endcap.

In other embodiments, a system for providing torque includes a stator, a rotor, an axle, an endcap, an endbell, a first compliant member, and a second compliant member. The stator has a first end and a second end opposite the first end with a chamber therein. The rotor is at least partially positioned in the chamber and rotatable relative to the stator about a longitudinal axis. The axle has a first end, a second end opposite the first end, and supports the rotor. The endcap is located at a first end of the stator and adjacent to the first end of the axle, and the endbell is located at the second end of the stator and adjacent to the second end of the axle. The first compliant member is positioned at least partially around the axle between a portion of the rotor and the endcap. The second compliant member is positioned at least partially around the axle between a portion of the rotor and the endbell.

In yet other embodiments, a system for providing torque includes a stator, a rotor, an axle, an endcap, an endbell, a first resilient member, and a second resilient member. The stator has a first end and a second end opposite the first end with a chamber therein. At least one permanent magnet is positioned in the chamber proximate the rotor. The rotor is at least partially positioned in the chamber and rotatable relative to the stator about a longitudinal axis. The rotor includes an armature positioned on the axle and configured to rotate with the axle. The axle has a first end, a second end opposite the first end, and supports the rotor. The endcap is located at a first end of the stator and adjacent to the first end of the axle, and the endbell is located at the second end of the stator and adjacent to the second end of the axle. The first resilient member is positioned at least partially around the axle between a portion of the rotor and the endcap. The second resilient member is positioned at least partially around the axle between a portion of the rotor and the endbell.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
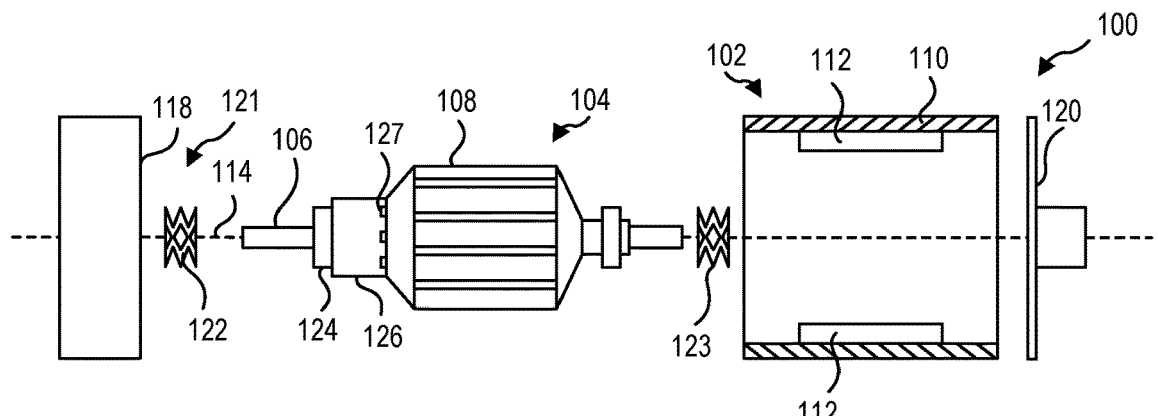
FIG. 1 is a perspective exploded view of an embodiment of an electric motor, according to the present disclosure.

FIG. 1 is a perspective exploded view of an embodiment of an electric motor 100, according to the present disclosure. The electric motor 100 includes a stator 102 and a rotor 104. The rotor 104 is rotatable about an axle 106 that extends along the rotor 104. The rotor 104 includes an armature 108 that rotates with or around the axle 106 to rotate relative to the stator 102. The stator 102 includes a permanent magnet 112 that interacts with the electromagnets of the armature 108 to rotate the armature 108 and axle 106 of the rotor 104 about a longitudinal axis 114.

The axle 106 is coupled to a flywheel 116 of the electric motor 100. The rotation of the rotor 104 about the longitudinal axis 114 rotates the flywheel 116. The rotating flywheel 116 functions to increase the moment of inertia of the rotor 104. Increasing the moment of inertia of the rotor 104 provides a smoother and more consistent angular speed for the rotor 104 during operation.

During shipping, storage, or other movement of the electric motor 100, the electric motor 100 is susceptible to damage. In particular, the electric motor 100 is susceptible to dropping, impacting, or otherwise applying a force along the longitudinal axis 114 that may damage one or more internal or external components of the electric motor 100. Energy applied to the electric motor 100 can be dissipated by one or more compliant members internally and/or externally positioned on the electric motor 100.

The illustrated embodiment includes an endcap 118 positioned at a first end of the housing 110 and an endbell 120 positioned at an opposite second end of the housing 110. The endcap 118 is positioned at a first end of the axle 106 to receive a portion of the axle 106. The endbell 120 is positioned at an opposite second end of the axle 106 to receive another portion of the axle 106. The compression of the endcap 118 and/or endbell 120 toward the housing 110 can cause damage to the endcap 118, the endbell 120, the housing 110, the axle 106, other components of the electric motor 100, or combinations thereof. As used herein, a "first end" of a component should be understood to be longitudinally proximate the endcap 118 and a "second end" of a component should be understood to be longitudinally proximate the endbell 120 and/or flywheel 116.

An electric motor 100 according to the present disclosure includes a compliant member 121 positioned on or near the rotor 104 to absorb, dissipate, or otherwise reduce force or energy applied to the rotor 104 relative to the stator 102 in an axial direction. For example, the compliant member 121 includes a first compliant member 122 and a second compliant member 123, each positioned around the axle 106 to protect the rotor 104 axial movements.

A first compliant member 122 is positioned around and adjacent the first end of the axle 106 between at least a part of the rotor 104 and the endcap 118. A second compliant member 123 is positioned around and adjacent the second end of the axle 106 between at least a part of the rotor 104 and the endbell 120. The first compliant member 122 and second compliant member 123 are configured to elastically and/or plastically deform under a compressive load along the longitudinal axis 114. For example, the first compliant member 122 in this embodiment is positioned longitudinally between the endcap 118 and a bearing 124 at the first end of the axle 106. The second compliant member 123 is positioned longitudinally between the endbell 120 and another bearing at the second end of the axle 106.

Figure 2:
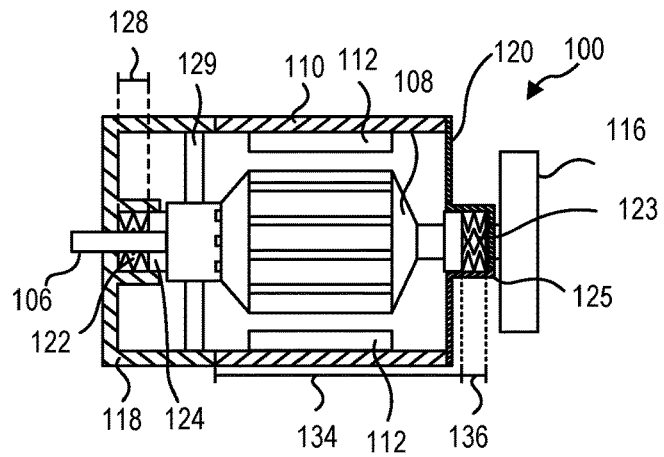
FIG. 2 is an assembled side cross-sectional view of the embodiment of an electric motor in FIG. 1, according to the present disclosure.

The embodiment illustrated in FIG. 1 includes a commutator 126 with a plurality of tangs 127 that are oriented in a radial direction from the longitudinal axis 114. The tangs 127 are flush with a surface of the commutator 126 to limit the exposure of the tangs 127 to impact and/or damage from movement of the endcap 118 in a longitudinal direction relative to the rotor 104. The tangs 127 shown in FIG. 1 are embedded in the commutator 126 in a single piece. As shown in FIG. 2, brushes 129 may extend from the commutator 126.

The electric motor 100 is illustrated in an assembled state in FIG. 2. The endcap 118, housing 110, and endbell 120 create an enclosure for the armature 108 and other internal components. The endcap 118 and the endbell 120 each can move in a longitudinal direction relative to the housing 110 to dissipate and/or absorb impacts during shipping and/or due to improper handling of the electric motor 100.

The endcap 118 receives a portion of first end of the axle 106 to hold the endcap 118. The endcap 118 is in contact with the first compliant member 122 and is adjacent to but not contacting the housing 110. The first compliant member 122 has an expanded length 128 in an expanded state. In the expanded state, the first compliant member 122 is positioned between and contacting the endcap 118 and the bearing 124. The first compliant member 122 resists compression and resists movement of the endcap 118 toward the housing 110.

In the expanded state of the first compliant member 122 shown in FIG. 2, an endcap gap 130 is located longitudinally between the endcap 118 and the electric motor 100. For example, as shown in FIG. 2, the endcap gap 130 is located between the endcap 118 and the commutator (shown as 124 in FIG. 1). The bearing 124 can move longitudinally toward the endcap 118 the length of the endcap gap 130 before contacting the endcap 118 and directly transferring energy to the electric motor 100 (e.g., through the commutator 126). In the distance before the bearing 124 contacts the endcap 118, the first compliant member 122 may absorb or dissipate at least a portion of the energy applied in the longitudinal direction to slow or stop the movement of the bearing 124 and limit or prevent damage to the electric motor 100.

The endbell 120 receives a portion of second end of the axle 106 to hold the endbell 120. The endbell 120 is in contact with the second compliant member 123 and is adjacent to but not contacting the housing 110, and is shown in direct contact but may be spaced apart by a washer or other spacer. The second compliant member 123 has an expanded length, similar to the first compliant member 122, in an expanded state. In the expanded state, the second compliant member 123 is positioned between and contacting the endbell 120 and the second bearing at the second end of the axle, and is shown in direct contact with both. The second compliant member 123 resists compression and resists movement of the endbell 120 toward the housing 110.

In the expanded state of the second compliant member 123 shown in FIG. 2, an endbell gap 132 is located longitudinally between the endbell 120 and the electric motor 100. For example, as shown in FIG. 2, the endbell gap 132 is located between the endbell 120 and the right bearing 124. The bearing 124 can move longitudinally toward the endbell 120 the length of the endbell gap 132 before contacting the endbell 120 and/or before the endbell 120 contacts the armature 108 and directly transfers energy to the electric motor 100. In the distance before the bearing 124 contacts the endbell 120 or the endbell 120 contacts the electric motor 100 (e.g., armature 108), the second compliant member 123 may absorb or dissipate at least a portion of the energy applied in the longitudinal direction to slow or stop the movement of the electric motor 100 (e.g., the bearing 124) within the endbell 120 and limit or prevent damage to the electric motor 100.

In the illustrated embodiment, the second compliant member 123 is positioned inside a cup 125 of the endbell 120. The cup 125 may define part or all of an endbell length 136. The endbell length 136 is related to a housing length 134. The endbell length 136 and housing length 134 in the illustrated embodiment have a ratio of about 10%. The housing 110 may be shortened from a conventional electric motor to allow the additional longitudinal movement and/or length of the endbell 120.

Figure 3:
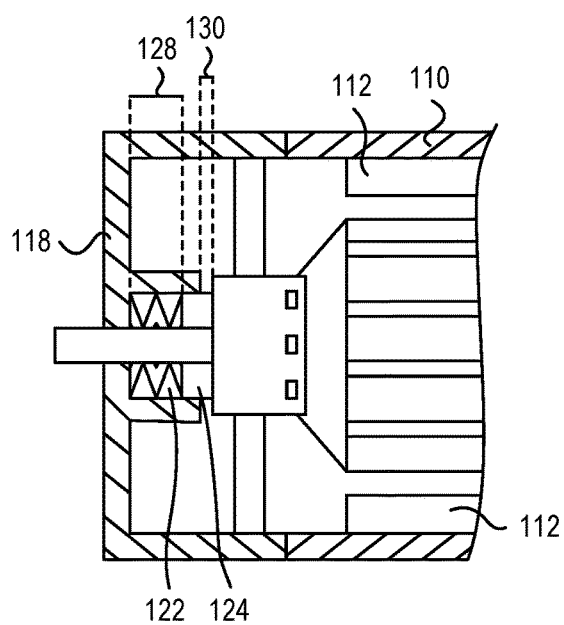
FIG. 3 is a side cross-sectional detail view of an endcap in an uncompressed state of the embodiment of an electric motor in FIG. 1, according to the present disclosure.
Figure 4:
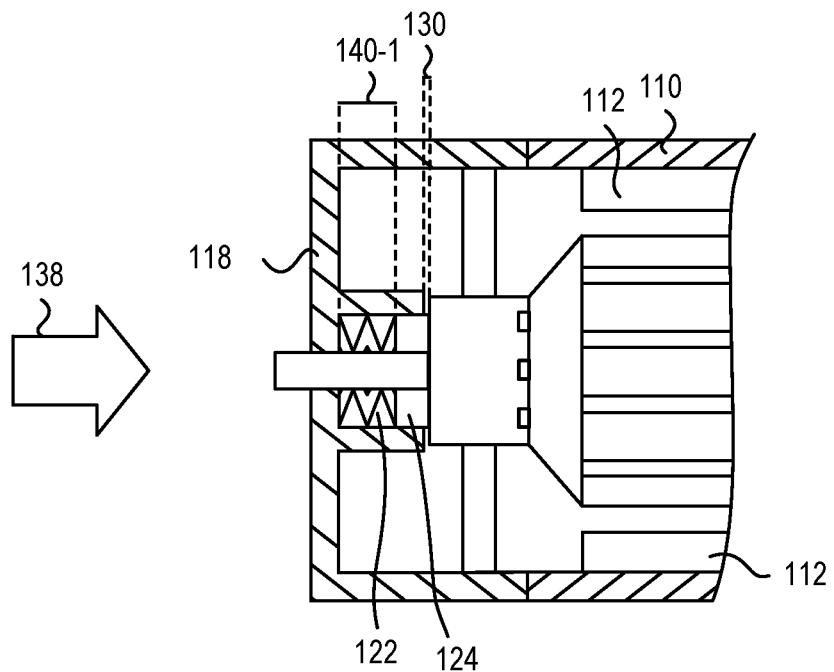
FIG. 4 is a side cross-sectional detail view of an endcap in a compressed state of the embodiment of an electric motor in FIG. 1, according to the present disclosure.

As described herein, the endcap 118 is moveable in a longitudinal direction to absorb and/or dissipate energy applied to the electric motor 100 along a longitudinal axis to prevent and/or limit damage to the electric motor 100. FIG. 3 and FIG. 4 illustrate the movement of the endcap 118 and compression of the first compliant member 122.

FIG. 3 is a detail view of the endcap 118 and housing 110 with the first compliant member 122 in an expanded state with a first expanded length 128-1. The first compliant member 122 is contacting both the endcap 118 and a bearing 124 at the first end of the rotor. In the expanded state, the first compliant member 122 holds the endcap gap 130 open.

FIG. 4 shows the first compliant member 122 of FIG. 3 in a compressed state. A longitudinal force 138 on the endcap 118, such as from dropping the electric motor during shipping or installation, can apply force to the endcap 118 longitudinally toward the electric motor. The longitudinal movement can compress the first compliant member 122 against the bearing 124 to a compressed state shown in FIG. 4. The first compliant member 122 in the compressed state has a first compressed length 140-1. A ratio between the first compressed length 140-1 in FIG. 4 and the first expanded length 128-1 shown in FIG. 3 is at least 50%.

The first compliant member 122 is illustrated as a resilient member, in this embodiment. The resilient member is a wave spring that has multiple layers and elastically deforms between the expanded state and the compressed state. The wave spring has a substantially linear spring constant throughout the compression range between the expanded state and the compressed state. The first compliant member 122 shown in the illustrated embodiment has a spring constant about 500 kilonewtons per meter. The displacement between the first expanded length 128-1 and the first compressed length 140-1 is at least 1 millimeter. The wave spring shown in FIG. 3 and FIG. 4 can elastically deform multiple times between the expanded state and the compressed state to prevent or limit damage to the bearings 124, the endcap 118, the housing 110, or other components.

Transferring the longitudinal force 138 to the bearings 124 may damage the bearings 124. The endcap gap 130 is less that a full compression distance of the first compliant member 122. In other words, the endcap 118 contacts the electric motor 100 (e.g., via the bearing 124 and/or the commutator) before the wave spring illustrated in FIG. 4 is stacked or fully compressed. The electric motor 100 (e.g., the bearings 124 and/or the commutator) are, therefore, protected from further compression and damage.

Figure 5:
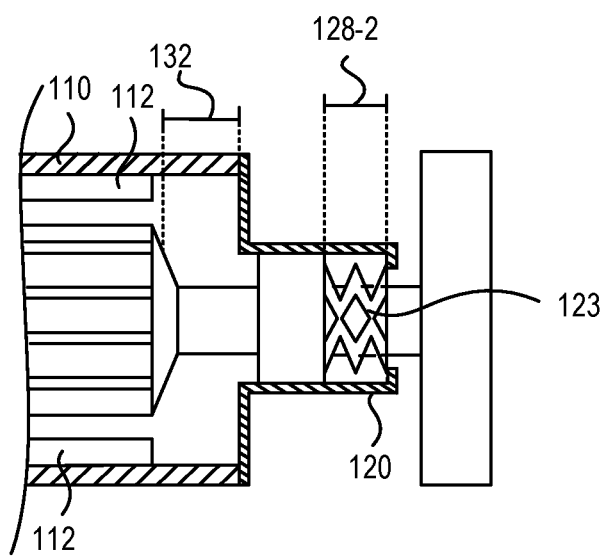
FIG. 5 is a side cross-sectional detail view of an endbell in an uncompressed state of the embodiment of an electric motor in FIG. 1, according to the present disclosure.
Figure 6:
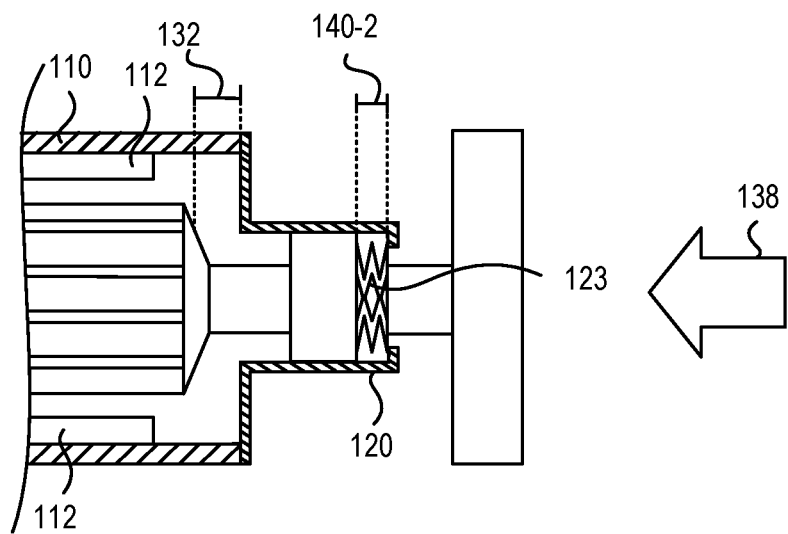
FIG. 6 is a side cross-sectional detail view of an endbell in a compressed state of the embodiment of an electric motor in FIG. 1, according to the present disclosure.
Figure 7:
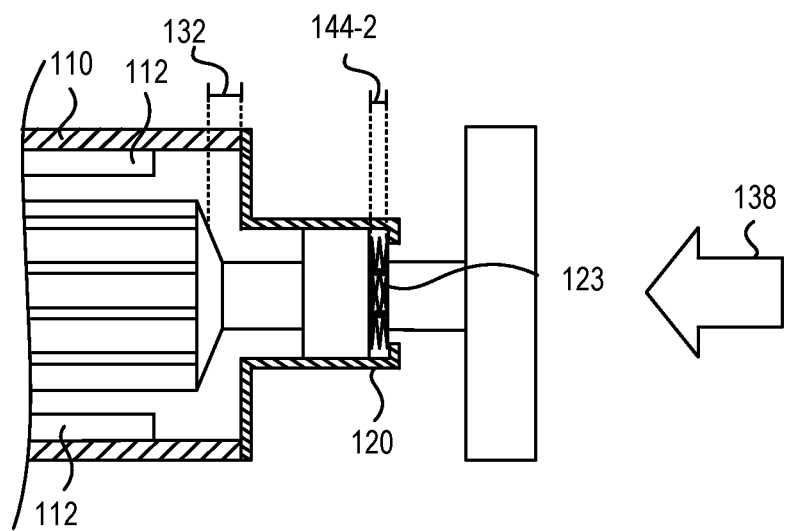
FIG. 7 is a side cross-sectional detail view of an endbell in an elastically deformed state of the embodiment of an electric motor in FIG. 1, according to the present disclosure.

As described herein, the endbell 120 is moveable and/or deformable in a longitudinal direction to absorb and/or dissipate energy applied to the electric motor 100 along a longitudinal axis to prevent and/or limit damage to the electric motor 100. FIG. 5 through FIG. 7 illustrate the movement and deformation of the endbell 120 and compression of the second compliant member 123 in response to the longitudinal force applied the endcap 118 and housing 110 as shown in FIG. 4.

FIG. 5 is a detail view of the endbell 120 and housing 110 with the second compliant member 123 in an expanded state with a second expanded length 128-2. The second compliant member 123 is contacting both the endbell 120 and a bearing 124 at the second end of the rotor. In the expanded state, the second compliant member 123 holds the endbell gap 132 open.

FIG. 6 shows second compliant member 123 of FIG. 5 in a compressed state. A longitudinal force 138 on the endbell 120 (e.g., through the flywheel (not labeled)) can move the endbell 120 longitudinally toward the electric motor 100 (e.g., armature 108). The longitudinal movement can compress the second compliant member 123 against the bearing 124 to a compressed state shown in FIG. 6. The second compliant member 123 in the compressed state has a second compressed length 140-2. A ratio between the second compressed length 140-2 in FIG. 6 and the second expanded length 128-2 shown in FIG. 5 is at least 50%.

The second compliant member 123 is illustrated as a resilient member in this embodiment. The resilient member is a wave spring that has multiple layers and elastically deforms between the expanded state and the compressed state. The wave spring has a substantially linear spring constant throughout the compression range between the expanded state and the compressed state. The second compliant member 123 shown in the illustrated embodiment has a spring constant about 500 kilonewtons per meter. The displacement between the second expanded length 128-2 and the second compressed length 140-2 is at least 1 millimeter. The wave spring shown in FIG. 5 and FIG. 6 can elastically deform multiple times between the expanded state and the compressed state to prevent or limit damage to the bearings, the endbell 120, the housing 110, or other components.

Similar to the discussion in conjunction with FIGS. 3 and 4, transferring the longitudinal force 138 to the bearings 124 may damage the bearings 124. The endbell gap 132 is less that a full compression distance of the second compliant member 123. In other words, the endbell 120 contacts the electric motor 100 (e.g., via the bearing 124 and/or the armature 108) before the wave spring illustrated in FIG. 6 is stacked or fully compressed. The electric motor 100 (e.g., the bearings 124 and/or the commutator) are, therefore, protected from further compression and damage.

FIG. 7 illustrates the embodiment of an endbell 120 deforming to further absorb and/or dissipate energy. Upon continued compression by a longitudinal force 138, the second compliant member 123 continues to compress to a stacked state, as shown in FIG. 7, in which the second compliant member 123 cannot compress further. For example, in the stacked state, the second compliant member 123 has a stacked length 144-2 that represents the combined thickness of the material of the second compliant member 123 without any voids therebetween. In the depicted embodiment of a wave spring, the stacked state is a state in which each layer of the wave spring is compressed flat.

In the stacked state, the compliant member 123 is unable to compress further and/or unable to absorb any further energy. The contact between the endbell 120 and the housing 110 may transfer energy directly from the housing 110 to the endbell 120, resulting in a deformation of the endbell 120. The endbell 120 of the illustrated embodiment is an elastically deformable material, such as spring steel, such that the endbell 120 may deflect and return to the undeformed state of FIG. 5 and FIG. 6 after the removal and/or decrease of the longitudinal force 138.

Figure 8:
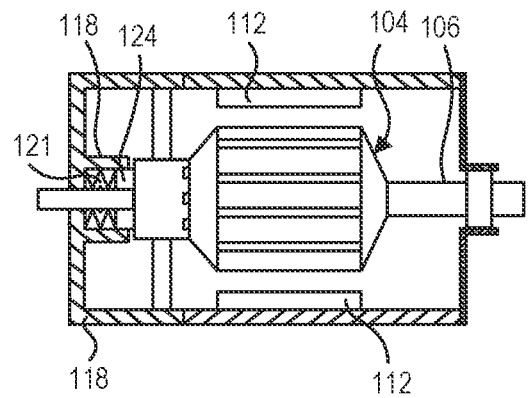
FIG. 8 is a side cross-sectional view of another embodiment of an electric motor, according to the present disclosure.

FIG. 8 illustrates another embodiment of the electric motor 100 of FIG. 1, where the compliant member 121 includes only a single compliant member that is connected to the rotor 104 and the endcap 118. A first end of the compliant member 121 is longitudinally fixed relative to the endcap 118 and an opposite second end of the compliant member 121 is longitudinally fixed relative to the bearing 124 or other part of the rotor 104. For example, when an axial force applied to the endcap 118 urges the endcap 118 toward the rotor 104, the compliant member 121 compresses while resisting the compressive force to absorb or dissipate the compressive force. In another example, when a tensile force is applied to the endcap 118 urges the endcap 118 away from the rotor 104, the compliant member 121 elongates while resisting the tensile force to absorb or dissipate the tensile force.

The compliant member 121, therefore, provides protection from application of axial force in both a compressive and a tensile orientation. While the compliant member 121 is fixed longitudinally relative to the bearing 124 and the endcap 118 during shipping, storage, handling, installation, or combinations thereof, the compliant member 121 may be selectively decoupled from one or both of the rotor 104 and the endcap 118 during operation of the electric motor 100. For example, the compliant member 121 of the illustrated embodiment is connected to the rotor 104 and the endcap 118 via adhesive. The compliant member 121 is, therefore, longitudinally fixed and rotationally fixed relative to the rotor 104 and the endcap 118. Before operation, the adhesive bond may be broken, fractured, or otherwise removed such that compliant member is not rotationally fixed relative to at least one of the rotor 104 and the endcap 118. In another example, the compliant member 121 may be connected to the rotor 104 and/or endcap 118 by a friction fit, a snap fit, a mechanical interlock, a mechanical fastener (e.g., pin, clip, clamp, threaded bolt), adhesive, or combinations thereof.

In yet another example, the compliant member 121 may be longitudinally fixed relative to the rotor 104 and the endcap 118 while being rotatable relative to at least one of the rotor 104 and the endcap 118. For example, the compliant member 121 may be connected to the rotor 104 and/or endcap 118 through interlocking rings that allow rotation of the compliant member 121 relative to the rotor 104 and/or endcap 118 while transmitting axial forces. In another example, the compliant member 121 may include bearings at the point of attachment to the rotor 104 and the endcap 118, such that the compliant member 121 may still allow rotational movement of the rotor 104 relative to the endcap 118 while limiting longitudinal motion of the rotor 104 relative to the endcap 118.

Figure 9:
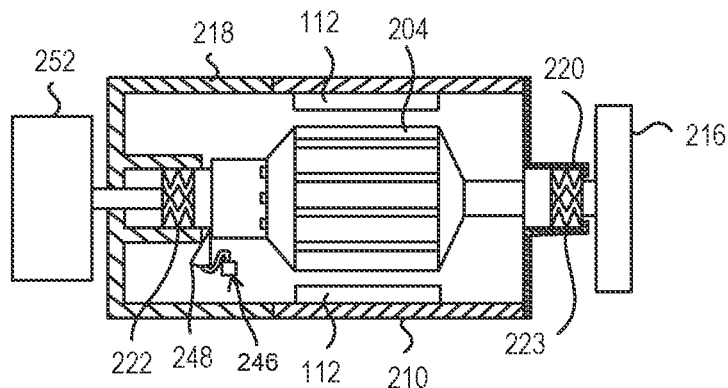
FIG. 9 is a side cross-sectional view of an embodiment of an electric motor electric motor with removable wedge members, according to the present disclosure.

FIG. 9 illustrates another embodiment of an electric motor, according to the present disclosure with a first compliant member 222 and second compliant member 223. During shipping, handling, storage, and installation, impacts or other force applied to the motor may move the rotor 204 axially within the housing 210. The rotor 204 may have a flywheel 216, a fan 252, or other components attached at the ends of the rotor 204. An impact to the flywheel 216, fan 252, or other component may be transmitted through along the rotor 204. In some embodiments, the first compliant member 222 and/or second compliant member 223 may limit damage to the rotor 204 by absorbing or dissipating energy. In the depicted embodiment in FIG. 9, a removable wedge may be positioned between the flywheel 216, fan 252, or other components and the housing 210, endcap 218, and endbell 220. The wedge may transmit force or impacts from the flywheel 216, fan 252, or other component through the wedge directly to the endcap 218, endbell 220 or other component to the housing 210. Thereby, force applied to the flywheel 216, fan 252, or other component at the end of the rotor 204 may be borne by the exterior structure of the motor.

For example, a first wedge 248 may be positioned between the endcap 218 and a bearing (not labeled) of the rotor 204. Force applied to the endcap 218 may urge the rotor 204 toward the endcap 218 and housing 210. The first wedge 248 may be positioned in contact with the bearing and the endcap 218 to transmit the force directly to the endcap 218.

In other embodiments, a motor may lack a compliant member, and the first wedge 248 may limit and/or prevent axial movement of the rotor 204 relative to the endcap 218, the endbell 220, or the housing 210.

In some embodiments, a wedge may include a tab that facilitates removal of the wedge prior to operation. As shown in FIG. 9, the first wedge 248 has a tab 246 connected to the first wedge 248. The tab 246 may extend radially from the first wedge 248 and allow a radial force to be applied to remove (e.g., dislodge) the first wedge 248.

The first wedge 248 is illustrated as a rigid member that transmits substantially all force from the flywheel 216, fan 252, or other components to the endcap 218, endbell 220, and housing. In other examples, the first wedge 248 may be a foam compliant member that may compress and plastically deform to absorb or dissipate axial energy during shipping, handling, storage, or installation.

Figure 10:
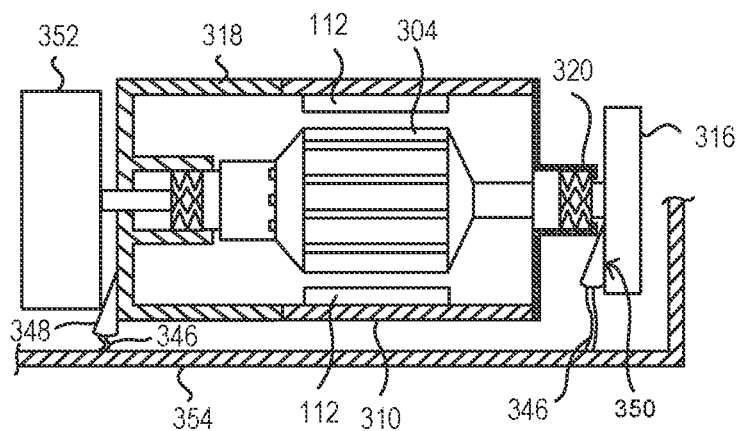
FIG. 10 is a side cross-sectional view of another embodiment of an electric motor with tethered wedge members, according to the present disclosure.

In another embodiment shown in FIG. 10, a tab 346 is a tether connected to a frame 354 around the motor. In the illustrated embodiment, a first wedge 348 and a second wedge 350 are included. The first wedge 348 and second wedge 350 are each positioned at opposite first and second ends of the rotor 304, respectively. For example, the first wedge 348 is positioned longitudinally between the endcap 318 and a fan 352 of the rotor 304 and the second wedge is positioned longitudinally between the endbell 320 and the flywheel 316.

The first wedge 348 and second wedge 350 are each tethered to a frame 354 or another external part of a motor by a tab 346 such that upon rotation of the rotor 304, the tabs 346 pull on the first wedge 348 and second wedge 350 and decouple the first wedge 348 and second wedge 350 from the rotor 304 and the endcap 218, endbell 220, housing 210, or other stationary component. The tabs 346 have a length that is less than a radius of the outer surface of the housing 310 to the axis of rotation of the axle 306, preventing the wrapping of the tabs 346 around the axle 306.

Figure 11:
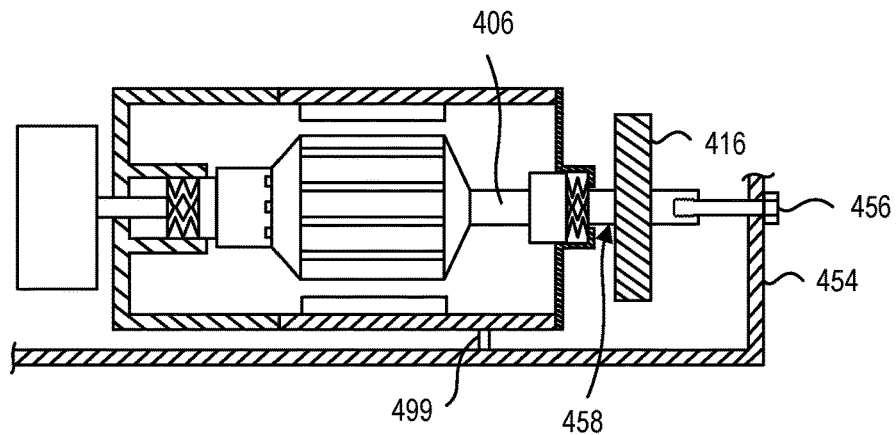
FIG. 11 is a side cross-sectional view of an embodiment of an electric motor with a threaded rotor restraint, according to the present disclosure.

FIG. 11 is an illustration of an embodiment of an electric motor with a restraint device to restrain and/or prevent movement of a rotor relative to a stator. The electric motor may be connected to a frame 454 that is held stationary relative to the axle 406 by, for example, a connector 499. The axle 406 may be selectively secured to the frame 454 by a restraint device to limit and/or prevent axial movement of the axle 406. For example, the axle 406 can include a threaded connection 458 in which a threaded bolt 456 is positioned. The threaded bolt 456 is tightened down against the frame 454, thereby compressing a compliant member and putting the threaded bolt 456 and axle 406 under tension. The tension limits and/or prevents axial movement of the axle 406 to limit and/or prevent damage to the axle and/or rotor. While FIG. 11 illustrates an electric motor with a plurality of compliant members, other embodiments of an electric motor with a threaded restraint device may include one or no compliant members while limiting and/or preventing axial movement of the axle.

The threaded bolt 456 and threaded connection 458 are shown as a left-hand thread. The threads are oriented in rotational direction that allows the rotation of the axle 406 during normal operation to back the threaded bolt 456 out of the threaded connection 458, releasing the tension on the axle 406 and allowing normal operations to continue.

Figure 12:
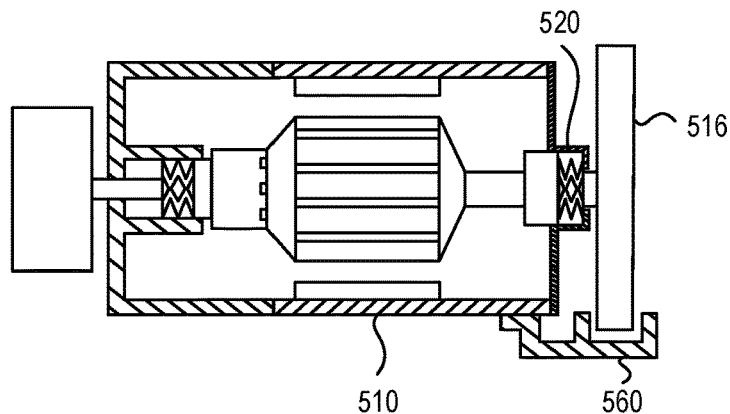
FIG. 12 is a side cross-sectional view of an embodiment of an electric motor with a mechanical rotor restraint, according to the present disclosure.

FIG. 12 is an illustration of another embodiment of an electric motor with a restraint device to restrain and/or prevent movement of a rotor relative to a stator. An electric motor can include a restraint bracket 560 connected to the housing 510 or other stationary portion of the motor or frame. The restraint bracket 560 limits and/or prevents axial movement and/or radial movement of at least part of the rotor. The embodiment illustrated in FIG. 12 is a one-piece restraint bracket 560 that limits and/or prevents axial movement and/or radial movement of the flywheel 516. The restraint bracket 560 wraps partially around the flywheel 516 on either longitudinal side of the flywheel 516, limiting and/or preventing axial movement of the flywheel 516 (and hence the rotor).

The embodiment of the bracket 560 and flywheel 516 shown in FIG. 12 allows contact between the bracket 560 and the flywheel 516 to limit and/or prevent rotational movement of the flywheel 516 (and hence the rotor). The restraint bracket 560 is selectively removable from the housing 510 (or other portion of the stator) to allow operation of the motor unrestricted by the restraint bracket 560. In some embodiments, the restraint bracket 560 is connected through mechanical fasteners that are selectively removable after installation. While FIG. 12 illustrates an electric motor with a plurality of compliant members, other embodiments of an electric motor with a bracket restraint device may include one or no compliant members while limiting and/or preventing axial movement of the axle.

Figure 13:
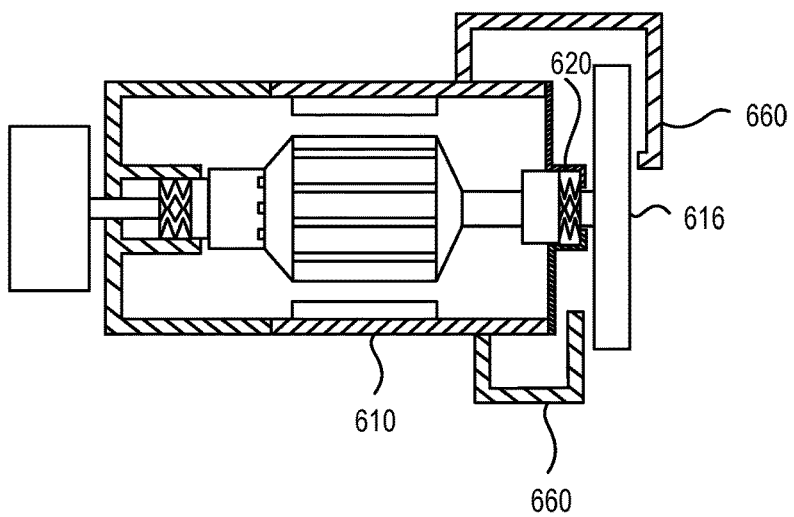
FIG. 13 is a side cross-sectional view of an embodiment of an electric motor with a mechanical rotor restrain, according to the present disclosure.

FIG. 13 is an illustration of a further embodiment of an electric motor with a restraint device to restrain and/or prevent movement of a rotor relative to a stator. An electric motor can include one or more restraint brackets 660 connected to the housing 610 or other stationary portion of the motor or frame. Each restraint bracket 660 limits and/or prevents axial movement of at least part of the rotor in at least one direction. The embodiment illustrated in FIG. 13 includes two restraint brackets 660 that limit and/or prevent axial movement of the flywheel 616 in at least one direction. For example, the left-most restraint bracket 660 may limit and/or prevent axial movement of the flywheel 616 toward the electric motor and the right-most restraint bracket 660 may limit and/or prevent axial movement of the flywheel 616 away from the electric motor. The restraint brackets 660 are located on either longitudinal side of the flywheel 516, limiting and/or preventing axial movement of the flywheel 516 (and hence the rotor).

One or more of the restraint brackets 660 may be selectively removable from the housing 610 (or other portion of the stator) to allow operation of the motor unrestricted by one or more of the restraint brackets 660. In some embodiments, the restraint brackets 660 are connected through mechanical fasteners that are selectively removable after installation. While FIG. 13 illustrates an electric motor with a plurality of compliant members, other embodiments of an electric motor with a bracket restraint device may include one or no compliant members while limiting and/or preventing axial movement of the axle.

INDUSTRIAL APPLICABILITY

In general, the present invention relates to protecting an electric motor from damage during shipping or handling of the electric motor. The most common damage to the electric motor is longitudinal force applied to the rotor, usually by dropping the motor on an end, that damages the bearings of the rotor inside the stator.

As described herein, the electric motor may include a housing that has an endcap positioned at a first end of the housing and/or an endbell positioned at an opposite second end of the housing. The endcap and/or endbell may be connected to the housing at one or more points that may allow for at least one movement in a longitudinal direction. In some embodiments, the endcap and/or endbell may be connected to the housing by a snap fit, one or more mechanical interlocks (such as splines), one or more mechanical fasteners, or combinations thereof. For example, the endcap and/or endbell may be connected to the housing by a snap fit that, once advanced beyond an initial lip or edge of the connection, allows for some longitudinal movement without allowing the endcap and/or endbell to disconnect from the housing. In another example, a mechanical interlock between the endcap and/or endbell and the housing may be grooves or splines that allow for longitudinal movement of the endcap and/or endbell relative to the housing while also limiting and/or preventing rotational movement of the endcap and/or endbell relative to the housing. In a further example, the endcap and/or endbell may be adhered to the housing.

As described herein, in some embodiments, a compliant member is positioned proximate the endcap at a first end of the rotor. In other embodiments, a compliant member is positioned proximate the endbell at a second end of the rotor. In yet other embodiments, a first compliant member is positioned proximate the endcap at a first end of the rotor and a second compliant member is positioned proximate the endbell at the second end of the rotor.

In some embodiments, a compliant member is plastically deformable. For example, the compliant member may be a polymer that plastically deforms upon application of force to absorb energy. In another example, the compliant member may be a metal that is plastically deformable, such as tin, by the application of for instance, less than 15 kilonewtons of force. In other embodiments, a compliant member is elastically deformable. For example, the compliant member may include an elastically deformable material such as steel (and more particularly spring steel), titanium, aluminum, other metals and alloys, polymers, organic materials, or combinations thereof.

A plastically or elastically deformable compliant member may have various shapes. In some embodiments, an elastically deformable member may be a coil spring, a wave spring, a leaf spring, a bushing, a wedge, a piston-and-cylinder including a compressible fluid, or combinations thereof. A coil spring may be positioned around the axle. In other examples, a plurality of piston-and-cylinders may be positioned between a portion of the rotor and the endcap or endbell. The compliant member may be elastically deformable from an expanded state to a compressed state. In other embodiments, the compliant member may be elastically deformable from an expanded state to a stacked state.

In the illustrated embodiment, the first and second compliant members have a spring constant about 500 kilonewtons per meter (kN/m). In some embodiments, a compliant member according to the present disclosure may have a spring constant in a range having an upper value, a lower value, or upper and lower values including any of 250 kN/m, 300 kN/m, 350 kN/m, 400 kN/m, 450 kN/m, 500 kN/m, 550 kN/m, 600 kN/m, 650 kN/m, 700 kN/m, 750 kN/m, or any values therebetween. For example, the spring constant may be greater than 250 kN/m. In other examples, the spring constant may be less than 750 kN/m. In yet other examples, the spring constant may be between 250 kN/m and 750 kN/m. In further examples, the spring constant may be between 350 kN/m and 650 kN/m. In yet further examples, the spring constant may be between 450 kN/m and 550 kN/m.

In some embodiments with both a first compliant member and a second compliant member, the first spring constant of the first compliant member may be equal to the second spring constant of the second compliant member. In other embodiments, the first spring constant may be greater than the second spring constant. In yet other embodiments, the second spring constant may be greater than the first spring constant.

In some embodiments, a plastically deformable member may include foams, polymers, plastic metal alloys, or other materials or shapes that compress to absorb and/or dissipate energy without fully returning to an original shape. For example, a plastically deformable material may dissipate energy by deforming. In another example, a compliant member may include a brittle material that fractures upon impact exceeding a threshold force, thereby dissipating further energy. A compliant member may include materials or portions that are elastically deformable, plastically deformable, brittle, or combinations thereof.

In some embodiments, the compression displacement of the compliant member between an expanded state and a compressed state when the endcap contacts the housing may be in a range having an upper value, a lower value, or upper and lower values including any of 1.0 millimeter (mm), 2.0 mm, 4.0 mm, 6.0 mm, 8.0 mm, 10.0 mm, 12.0 mm, 12.7 mm, or any values therebetween. For example, the compression displacement may be greater than 1.0 mm. In other examples, the compression displacement may be less than 12.7 mm. In yet other examples, the compression displacement may be between 1.0 mm and 12.7 mm. In further examples, the compression displacement may be between 2.0 mm and 12.0 mm. In yet further examples, the compression displacement may be between 4.0 mm and 10.0 mm. In at least one embodiment, the force applied by the compliant member against the compression force may be less than the breaking strength of the endcap and/or endbell, respectively.

While the illustrated embodiment depicts a compliant member that is positioned completely around the axle, in other embodiments, a compliant member may surround less than 100% of a circumference of the axle. In some embodiments, the compliant member may surround at least 50% of a circumference of the axle such that the compliant member remains on the axle without falling off. In other embodiments, the compliant member may surround 100% of the axle but may include a break in the compliant member through which the axle may pass (by, for example, elastically or plastically deforming) to remove the compliant member. For example, the compliant members may be installed on the axle during shipping and/or installation and selectively removed for operation of the electric motor after installation. In other examples, the compliant members may be configured to remain on the axle during operation.

As described herein, other embodiments of a compliant member may be positioned between at least a portion of the rotor and the endcap or endbell, respectively. For example, a plurality of pistons-and-cylinders may be positioned radially displaced from the axle to provide compliant and/or resilient support in the longitudinal direction.

In some embodiments, a first compliant member and a second compliant member of an electric motor may be substantially identical. In other embodiments, different compliant members as described herein may be utilized in different combinations. For example, an electric motor may have a wave spring compliant member positioned around the axle at a first end of the rotor proximate the endcap and a polystyrene compliant member positioned partially around the axle at a second end of the rotor proximate the endbell. In another example, an electric motor may have a polystyrene compliant member positioned around the axle at a first end of the rotor proximate the endcap and a polymer compliant member positioned partially around the axle at a second end of the rotor proximate the endbell. In yet another example, an electric motor may have a polymer compliant member positioned partially around the axle at a first end of the rotor proximate the endcap and a coil spring compliant member positioned around the axle at a second end of the rotor proximate the endbell.

The illustrated embodiment of an electric motor includes a plurality of tangs on a commutator. The commutator conveys the rotation of the rotor relative to the stator, and the tangs contact brushes as the commutator rotates to create a series of electrical connections. Conventionally, the tangs protrude from the body of the commutator to improve the electrical connection with the brushes. Reducing the radial height of the tangs (e.g., a height relative to the longitudinal axis of the rotor) reduces the risk of damage during longitudinal movement of the endcap. Further, positioning the tangs at a longitudinal position away from the endcap to avoid contact reduces the risk of damage during longitudinal movement of the endcap.

In some embodiments, the tangs may be flush with a surface of the commutator. In other embodiments, the tangs may be flush with an outer sheath of the commutator that may be selectively removable. For example, the commutator may include a non-conductive sheath that may be applied to an outer surface of the commutator with an outer diameter equal to a radial height of the tangs. In such embodiments, the endcap may contact the outer sheath of the commutator as the endcap moves longitudinally, and the outer sheath may provide radial clearance for the tangs such that the tangs to not receive a longitudinal force.

The tangs may be further reinforced from longitudinal deformation by providing tangs of elastically deformable material. Conventional tangs include copper or copper alloys for electrical conductivity. Copper is commonly plastically deformable. Upon plastic deformation, the tangs may fail to contact the brushes and form an electrical contact. An elastically deformable metal, such as a spring steel, an electrically conductive elastic polymer (such as one impregnated with conductive material), or other elastic material may allow the tangs to receive at least a portion of an applied longitudinal force without compromising the electrical contacts provided by the tangs.

As described herein, some embodiments of an electric motor may include a compliant member proximate an elastically deformable endbell. In other embodiments, an electric motor may have the endbell proximate the second end of the axle and/or bearings without a compliant member. In such embodiment, the elastic deformation of the endbell itself may provide compliance to mitigate damage from longitudinal forces.

The endbell may be a flexible member with a spring constant. In some embodiments, the endbell spring constant may be in a range having an upper value, a lower value, or upper and lower values including any of 250 kN/m, 300 kN/m, 350 kN/m, 400 kN/m, 450 kN/m, 500 kN/m, 550 kN/m, 600 kN/m, 650 kN/m, 700 kN/m, 750 kN/m, or any values therebetween. For example, the spring constant may be greater than 250 kN/m. In other examples, the spring constant may be less than 750 kN/m. In yet other examples, the spring constant may be between 250 kN/m and 750 kN/m. In further examples, the spring constant may be between 350 kN/m and 650 kN/m. In yet further examples, the spring constant may be between 450 kN/m and 550 kN/m. In at least one example, the spring constant may be about 500 kN/m.

The cup of the endbell may have a range of depths relative to a length of the housing. In some embodiments, the cup depth of the endbell may be in a range having an upper value, a lower value, or upper and lower values including any of 2%, 4%, 6%, 8%, 10%, 12%, 14%, 16%, 18%, 20%, or any values therebetween. For example, the cup depth may be greater than 2% of the housing length. In other examples, the cup depth may be less than 20% of the housing length. In yet other examples, the cup depth may be between 2% and 20% of the housing length. In further examples, the cup depth may be between 6% and 14% of the housing length. In at least one example, the cup depth may be about 10% of the housing length.

In some embodiments, the compliant member may be a removable wedge. One or more removable wedges may be positioned between a flywheel, fan, endcap, endbell, other components of the motor, or combinations thereof. For example, one or more removable wedges may be positioned between the endbell and the commutator, between the endbell and a fan, between the endbell and a bearing, between the endcap and a flywheel, between the endcap and the armature, between the cap and a bearing, may be otherwise positioned, or combinations thereof.

In some embodiments, one or more wedges may include a tab that may facilitate removal of a wedge prior to operation (e.g., prior to the user using the equipment to which the motor is connected). The tab may be connected to various locations. For example, the tab may be connected to the housing of the motor, to the armature, to a frame positioned relative to the motor, or any other component that facilitates removal of the wedge prior to operation. In other words, as the motor initially moves, the wedge is removed before the motor reaches a predetermined number of revolutions. For example, the tab may be a tether with a length that removes the wedge before the motor turns the axle a full rotation.

In some embodiments of an electric motor, a restraint device may be used to restrain and/or prevent movement of a rotor relative to a stator. For example, the electric motor may be connected to a frame that is held stationary relative to, for example, an axle. The restraint device may limit and/or prevent axial movement of the axle. For example, the axle can include a threaded connection in which a threaded bolt may be positioned. In embodiments with a compliant member, the threaded bolt may be tightened down against the frame, thereby compressing a compliant member (e.g., a spring, wedge, or other compliant member) and putting the threaded bolt and axle under tension. In other embodiments, the threaded bolt may be tightened down against the frame causing the frame to compress and putting the threaded bolt and axle under tension. The tension may limit and/or prevent axial movement of the axle to limit and/or prevent damage to the axle and/or rotor. In some embodiments, the threaded bolt and threaded connection may include a left-hand thread. In some embodiments, the threads may be oriented in rotational direction that allows the rotation of the axle during normal operation to back the threaded bolt out of the threaded connection, releasing the tension on the axle and allowing normal operations to continue.

In some embodiments, a restraint bracket may be used to limit and/or prevent axial movement and/or rotational movement of at least part of the rotor. The restraint bracket may include a single piece or two or more pieces. In embodiments with two or more pieces, a first restraint bracket may restrain axial movement in a first direction and a second restraint bracket may restrain axial movement in a second direction.

The embodiments of an electric motor having one or more compliant members according to the present disclosure may limit and/or prevent damage to the electric motor due to mishandling during shipping, storage, or installation. The durability benefits provided by one or more of the features described herein may reduce cost, time, and stocking requirements for electric motors by helping ensure the operation of electric motors upon delivery and installation.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

By way of example, electric motors according to the present disclosure may be described according to any of the following sections:

1. A system for providing torque, the system comprising:
   a stator having a first end, a second end opposite the first end, and a chamber therein;
   a rotor at least partially positioned in the chamber and rotatable relative to the stator about a longitudinal axis;
   an axle having a first end, a second end opposite the first end, and supporting the rotor;
   an endcap located at a first end of the stator and adjacent to the first end of the axle;
   an endbell located at the second end of the stator and adjacent to the second end of the axle; and
   a first compliant member positioned relative to the axle between a portion of the rotor and one of the endbell and the endcap.
2. The system of section 1, the first compliant member being a resilient member.
3. The system of any of sections 1-2, the first compliant member including a spring.
4. The system of any of sections 1-3, the first compliant member positioned around the axle.
5. The system of any of sections 1-4, the first compliant member having a spring constant of between 250 kilonewtons per meter (kN/m) and 750 kN/m.
6. The system of any of sections 1-5, the first compliant member being positioned around the axle between a portion the rotor and the endcap.
7. The system of any of sections 1-6, wherein the endbell is elastically deformable and has a spring constant of between 250 kN/m and 750 kN/m.
8. The system of any of sections 1-7, further comprising a housing around the stator and a cup in the endbell, the cup projecting in a longitudinal direction and the cup having a cup depth in the longitudinal direction greater than 2% of a longitudinal length of the stator.
9. The system of any of sections 1-8, further comprising:
   a second compliant member positioned at least partially around the axle between a portion of the rotor and the endbell.
10. The system of section 9, the first compliant member having a first spring constant between 250 kN/m and 750 kN/m, and the second compliant member having a second spring constant between 250 kN/m and 750 kN/m.
11. The system of any of sections 9-10, the first spring constant and second spring constant being the same.
12. The system of any of sections 1-11, the first compliant member having an expanded state and a compressed state, the endcap configured to move in a longitudinal direction toward the stator and longitudinally contact a portion of the stator as the first compliant member moves to the compressed state.
13. The system of any of sections 1-12, the first compliant member further having a stacked state, the stacked state having a first stacked length that is less than a first compressed length.
14. The system of any of sections 9-13, the second compliant member having an expanded state and a compressed state, the endbell configured to move in a longitudinal direction toward the stator and longitudinally contact a portion of the stator as the second compliant member moves to the compressed state.
15. The system of any of sections 9-14, the second compliant member further having a stacked state, the stacked state having a second stacked length that is less than a second compressed length.
16. The system of section any of sections 1-15, an endcap gap being between longitudinal ends of the endcap and a housing of the stator, the endcap gap being greater than 1.0 millimeter (mm).
17. The system of section any of sections 1-16, an endbell gap being between longitudinal ends of the endbell and a housing of the stator, the endbell gap being greater than 1.0 millimeter (mm).
18. The system of any of sections 1-17, the wherein the first compliant member includes a tab oriented in a radial direction, the tab configured to move the first compliant member in a radial direction away from the axle.
19. The system of section 18, wherein the tab is a tether connecting the first compliant member to the stator.
20. The system of any of sections 1-19, the rotor further comprising a commutator, the commutator having one or more tangs with a radial height no more than an outer diameter of the commutator.
21. A system for providing torque, the system comprising:
   a stator having a first end, a second end opposite the first end, and a chamber therein;
   a rotor at least partially positioned in the chamber and rotatable relative to the stator about a longitudinal axis;

an axle having a first end, a second end opposite the first end, and supporting the rotor;

an endbell located at a first end of the stator and adjacent to the first end of the axle;

an endcap located at the second end of the stator and adjacent to the second end of the axle; and a first compliant member positioned relative to the axle between a portion of the rotor and one of the endbell and the endcap, wherein the compliant member includes a tab configured to move the compliant member in a radial direction away from the axle.

22. The system of section 21, the tab being connected to the stator, such that the tab tethers the first compliant member to the stator.

23. The system of section 21 or 22, the first compliant member being plastically deformable.

24. The system of section 21 or 22, the first compliant member being brittle.

25. The system of any of sections 21-24, further comprising a second compliant member that is elastically deformable.

26. The system of any of sections 21-24, further comprising a second compliant member that is plastically deformable.

27. The system of any of sections 21-24, further comprising a second compliant member that is brittle.

28. The system of any of sections 21-27, the first compliant member surrounding less than 100% of the axle.

29. A system for providing torque, the system comprising:
a stator having a first end, a second end opposite the first end, and a chamber therein;
a rotor at least partially positioned in the chamber and rotatable relative to the stator about a longitudinal axis;
an axle having a first end, a second end opposite the first end, and supporting the rotor;
a restraint device fixed relative to the stator, the restraint device in contact with the rotor and configured to limit longitudinal movement of the rotor relative to the stator.

30. The system of section 29, further comprising a compliant member positioned relative to the axle.

31. The system of any of sections 29-30, the restraint device contacting the axle.

32. The system of any of sections 29-31, the restraint device contacting a flywheel of the rotor.

33. The system of any of sections 29-32, the restraint device further configured to limit rotational movement of the rotor relative to the stator.

34. The system of any of sections 29-33, the restraint device including a threaded connection with the rotor.

35. The system of any of sections 29-34, the restraint device being connected to the stator with a mechanical fastener.

36. The system of any of sections 29-35, the electric motor being connected to a frame, and the restraint device being connected to the frame.

37. The system of any of sections 29-36, the restraint device formed of a single piece that limits axial movement in both directions.

38. The system of any of sections 29-36, the restraint device formed of a first piece that limits axial movement in a first direction and a second piece that limits axial movement in a second direction.

What is claimed is:

1. A system for providing torque, the system comprising:
a stator having a first end, a second end opposite the first end, and a chamber therein;
a rotor at least partially positioned in the chamber and rotatable relative to the stator about a longitudinal axis;
an axle having a first end, a second end opposite the first end, and supporting the rotor;
an endcap located at a first end of the stator and adjacent to the first end of the axle, wherein an endcap gap is formed between the endcap and a first portion of the rotor, wherein the first portion of the rotor extends radially from the axle at the endcap gap;
an endbell located at the second end of the stator and adjacent to the second end of the axle;
a first compliant member positioned relative to the axle between a second portion of the rotor and the endcap, the first compliant member being deformable along the longitudinal axis;
a tab, the tab connecting the first compliant member to the stator; and
a second compliant member positioned relative to the axle between a third portion of the rotor and the endbell, the second compliant member being deformable along the longitudinal axis.

2. The system of claim 1, at least one of the first compliant member or the second compliant member being a resilient member.

3. The system of claim 1, at least one of the first compliant member or the second compliant member including a spring.

4. The system of claim 1, at least one of the first compliant member or the second compliant member positioned partially around the axle.

5. The system of claim 1, at least one of the first compliant member or the second compliant member having a spring constant of between 250 kilonewtons per meter (kN/m) and 750 kN/m.

6. The system of claim 1, wherein the endbell is elastically deformable and has a spring constant of between 250 kN/m and 750 kN/m.

7. The system of claim 1, further comprising a housing around the stator and a cup in the endbell, the cup projecting in a longitudinal direction and the cup having a cup depth in the longitudinal direction greater than 2% of a longitudinal length of the stator.

8. The system of claim 1, the compliant member being coupled to the rotor and selectively decoupled from the rotor when the one of the endbell or the endcap is installed on the axle.

9. The system of claim 1, wherein the first compliant member is elastically deformable along the longitudinal axis.

10. A system for providing torque, the system comprising:
a stator having a first end, a second end opposite the first end, and a chamber therein;
a rotor at least partially positioned in the chamber and rotatable relative to the stator about a longitudinal axis;
an axle having a first end, a second end opposite the first end, and supporting the rotor;
an endcap located at a first end of the stator and adjacent to the first end of the axle, wherein an endcap gap is formed between the endcap and a shoulder of the rotor;
an endbell located at the second end of the stator and adjacent to the second end of the axle;
a first compliant member positioned at least partially around the axle between a portion of the rotor and the endcap, the first compliant member being deformable along the longitudinal axis;
a tab, the tab connecting the first compliant member to the stator; and a second compliant member positioned at least partially around the axle between a portion of the rotor and the endbell, the second compliant member being deformable along the longitudinal axis.

11. The system of claim 10, the first compliant member having a first spring constant between 250 kN/m and 750 kN/m, and the second compliant member having a second spring constant between 250 kN/m and 750 kN/m.

12. The system of claim 10, the first compliant member having a first spring constant and the second compliant member having a second spring constant, wherein the first spring constant and second spring constant are the same.

13. The system of claim 10, the first compliant member having an expanded state and a compressed state, the endcap configured to move in a longitudinal direction toward the stator and longitudinally contact a portion of the stator as the first compliant member moves to the compressed state.

14. The system of claim 13, the first compliant member further having a stacked state, the stacked state having a first stacked length that is less than a first compressed length.

15. The system of claim 10, the second compliant member having an expanded state and a compressed state, the endbell configured to move in a longitudinal direction toward the stator and longitudinally contact a portion of the stator as the second compliant member moves to the compressed state.

16. The system of claim 15, the second compliant member further having a stacked state, the stacked state having a second stacked length that is less than a second compressed length.

17. A system for providing torque, the system comprising:
a stator having a first end, a second end opposite the first end, and a chamber therein, the stator having at least one permanent magnet positioned in the chamber;
a rotor at least partially positioned in the chamber and rotatable relative to the stator about a longitudinal axis;
an axle having a first end, a second end opposite the first end, and supporting the rotor;
an armature positioned on the axle and configured to rotate with the axle;
an endbell located at a first end of the stator and adjacent to the first end of the axle;
an endcap located at the second end of the stator and adjacent to the second end of the axle, wherein an endcap gap is formed between the endcap and the armature;
a first resilient member positioned at least partially around the axle between a portion of the rotor and the endcap, the first resilient member being deformable along the longitudinal axis;
a tab, the tab connecting the first resilient member to the stator; and
a second resilient member positioned at least partially around the axle between a portion of the rotor and the endbell, the second resilient member being deformable along the longitudinal axis.

18. The system of claim 17, at least one of the first resilient member and the second resilient member being a wave spring.

* * * * *